US012615600B2

(12) United States Patent
Xing et al.

(10) Patent No.: US 12,615,600 B2
(45) Date of Patent: Apr. 28, 2026

(54) RANDOM ACCESS METHOD, APPARATUS, AND STORAGE MEDIUM

(71) Applicant: HUAWEI TECHNOLOGIES CO., LTD., Shenzhen (CN)

(72) Inventors: Shuangshuang Xing, Shenzhen (CN); Yiqun Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 844 days.

(21) Appl. No.: 17/513,009

(22) Filed: Oct. 28, 2021

(65) Prior Publication Data

US 2022/0053568 A1 Feb. 17, 2022

Related U.S. Application Data

(63) Continuation of application No. PCT/CN2020/087609, filed on Apr. 28, 2020.

(30) Foreign Application Priority Data

Apr. 30, 2019 (CN) .......................... 201910365480.4
May 14, 2019 (CN) .......................... 201910399655.3
(Continued)

(51) Int. Cl.
*H04L 1/18* (2023.01)
*H04L 5/00* (2006.01)
(Continued)

(52) U.S. Cl.
CPC ........... *H04L 5/0055* (2013.01); *H04W 52/54* (2013.01); *H04W 72/1273* (2013.01);
(Continued)

(58) Field of Classification Search
None
See application file for complete search history.

(56) References Cited

U.S. PATENT DOCUMENTS 10,299,244 B2 * 5/2019 Griot ................... H04W 68/005
11,337,253 B2 * 5/2022 Zhang ................... H04L 1/0026
(Continued)

FOREIGN PATENT DOCUMENTS

CN          107113200 A          8/2017
CN          108282901 A          7/2018
CN          111278149 A          6/2020

OTHER PUBLICATIONS

Zte et al: "Considerations on 2-Step RACH Procedures", 3GPP Draft; R1-1901627,Feb. 16, 2019, pp. 1-11.
(Continued)

*Primary Examiner* — Sithu Ko
(74) *Attorney, Agent, or Firm* — Rimon PC

(57) ABSTRACT

This application provides a random access method. In the method, a terminal device receives first DCI from a network device. The first DCI includes the first indication information, where the first indication information is used to indicate the type of the response information carried on a PDSCH. The PDSCH carries response information for a random access request initiated by the terminal device. If determining that the type of the response information as indicated by the first indication information matches the random access type of the random access request initiated by the terminal device, the terminal device demodulates the PDSCH indicated by the first DCI. In this way, the terminal device demodulates the PDSCH indicated by the first DCI only when determining, based on the first indication information, that the PDSCH indicated by the received first DCI may belong to the terminal device.

20 Claims, 21 Drawing Sheets

(30) Foreign Application Priority Data

| Aug. 29, 2019 | (CN) | ........................ | 201910810274.X |
|---|---|---|---|
| Sep. 20, 2019 | (CN) | ........................ | 201910894458.9 |

(51) Int. Cl.

| H04W 52/54 | (2009.01) |
|---|---|
| H04W 72/1273 | (2023.01) |
| H04W 72/23 | (2023.01) |
| H04W 74/0833 | (2024.01) |
| H04W 74/0836 | (2024.01) |

(52) U.S. Cl.

CPC ....... *H04W 72/23* (2023.01); *H04W 74/0833* (2013.01); *H04W 74/0836* (2024.01)

(56) References Cited

U.S. PATENT DOCUMENTS

| 11,395,299 | B2 * | 7/2022 | Babaei | .................. | H04W 24/08 |
|---|---|---|---|---|---|
| 11,497,060 | B2 * | 11/2022 | Kunt | ..................... | H04L 1/1671 |
| 11,917,681 | B2 * | 2/2024 | Kusashima | ....... | H04W 74/0816 |
| 2012/0113877 | A1 | 5/2012 | Lee et al. | | |
| 2016/0374048 | A1 * | 12/2016 | Griot | ...................... | H04W 4/70 |
| 2017/0111818 | A1 | 4/2017 | Sebire et al. | | |
| 2019/0253986 | A1 * | 8/2019 | Jeon | ....................... | H04L 5/0048 |
| 2020/0107371 | A1 * | 4/2020 | Kunt | ..................... | H04W 72/23 |
| 2020/0229238 | A1 * | 7/2020 | Zhang | ................... | H04L 5/0055 |
| 2021/0368554 | A1 * | 11/2021 | Ohseki | .............. | H04W 74/0836 |
| 2022/0022259 | A1 * | 1/2022 | Atungsiri | .......... | H04W 72/1268 |
| 2022/0061106 | A1 * | 2/2022 | Zhang | ................ | H04W 74/006 |
| 2022/0070938 | A1 * | 3/2022 | Wu | ........................ | H04L 5/0055 |
| 2022/0124818 | A1 * | 4/2022 | Lee | ....................... | H04L 1/0001 |
| 2022/0124820 | A1 * | 4/2022 | Ko | .................... | H04W 56/0045 |
| 2022/0150973 | A1 * | 5/2022 | Lim | ...................... | H04W 72/23 |

OTHER PUBLICATIONS

Qualcomm Incorporated: "2 step and 4 step RACH", 3GPP Draft; R1-1612033,Nov. 5, 2016, XP051190266.

Catt, "Consideration on 2-step RA", 3GPP TSG RAN WG2 Meeting Ad Hoc R2-1700205, Jan. 19, 2017,total 6 pages.
3GPP TS 38.212 V15.1.1 (Apr. 2018); 3rd Generation Partnership Project; Technical Specification Group Radio Access Network;NR;Multiplexing and channel coding(Release 15);total 94 pages.
Oppo, "Discussion on Remaining Issues of Random Access Procedure", 3GPP TSG RAN WG1 Meeting 91 R1-1719985, Dec. 1, 2017,total 4 pages.
3GPP TS 38.213 V15.5.0 (Mar. 2019), 3rd Generation Partnership Project; Technical Specification Group Radio Access Network; NR; Physical layer procedures for control(Release 15), 104 pages.
Alcatel-Lucent Shanghai Bell, "Common Search Space on SeNB for Dual Connectivity", 3GPP TSG RAN WG1 Meeting #78 R1-143013, Aug. 22, 2014 , total 4 pages.
3GPP TS 38.214 V15.5.0 (Mar. 2019), 3rd Generation Partnership Project; Technical Specification Group Radio Access Network; NR; Physical layer procedures for data(Release 15), 103 pages.
3GPP TS 38.321 V15.5.0:"3rd Generation Partnership Project; Technical Specification Group Radio Access Network; NR; Medium Access Control (MAC) protocol specification (Release 15)",Mar. 2019, total 78 pages.
3GPP TSG-RAN WG1 NR adhoc R1-1700300,NR two-step random access procedure,Ericsson, Spokane, USA, Jan. 16-20, 2017,total 4 pages.
3GPP TSG RAN WG1 #96bis, R1-1904716,On 2-step RACH Procedure, Nokia, Nokia Shanghai Bell,Xi an, China, April 8 12, 2019,total 16 pages.
3GPP TSG RAN WG1 #96bis, R1-1904725,Discussion on procedure for two-step RACH,CMCC,Xi an, China, Apr. 8 12, 2019,total 4 pages.
3GPP TSG RAN WG1 #96bis, R1-1904928,2-step RACH procedure,Motorola Mobility, Lenovo,Xi an, China, April 3 12, 2019, total 3 pages.
3GPP TSG RAN Meeting #82,RP-182894,New work item: 2-step RACH for NR ,ZTE Corporation, Sanechips,Sorrento, Italy, Dec. 10-13, 2018, total 3 pages.

* cited by examiner

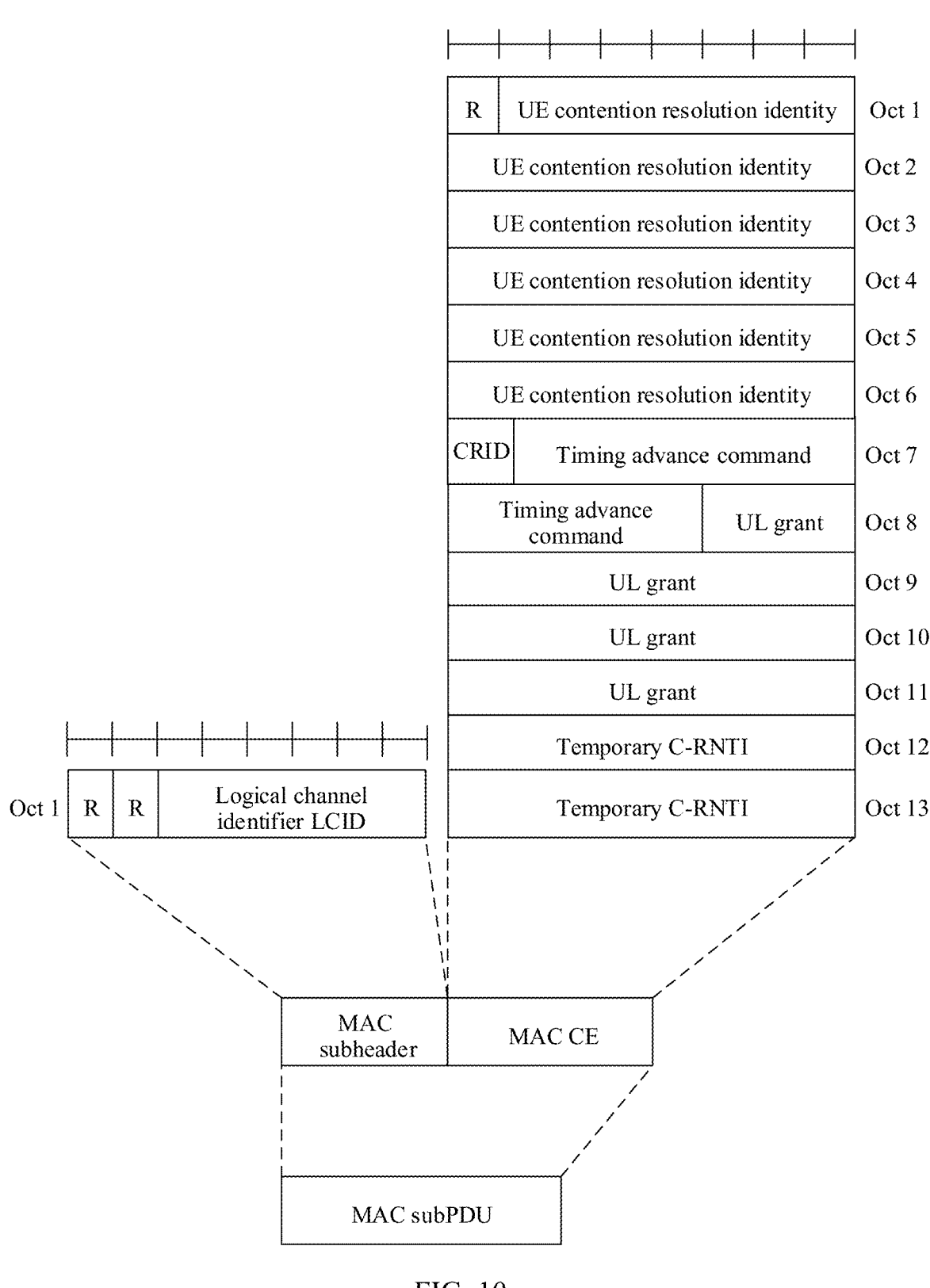

| | |
|---|---|
| R \| UE contention resolution identity | Oct 1 |
| UE contention resolution identity | Oct 2 |
| UE contention resolution identity | Oct 3 |
| UE contention resolution identity | Oct 4 |
| UE contention resolution identity | Oct 5 |
| UE contention resolution identity | Oct 6 |
| CRID \| Timing advance command | Oct 7 |
| Timing advance command \| UL grant | Oct 8 |
| UL grant | Oct 9 |
| UL grant | Oct 10 |
| UL grant | Oct 11 |
| Temporary C-RNTI | Oct 12 |
| Temporary C-RNTI | Oct 13 |

Oct 1 | R | R | Logical channel identifier LCID

MAC subheader | MAC CE

MAC subPDU

FIG. 10c

RANDOM ACCESS METHOD, APPARATUS, AND STORAGE MEDIUM

CROSS-REFERENCE TO RELATED APPLICATIONS

This application is a continuation of International Application No. PCT/CN2020/087609, filed on Apr. 28, 2020, which claims priority to Chinese Patent Application No. 201910365480.4, filed on Apr. 30, 2019, Chinese Patent Application No. 201910399655.3, filed on May 14, 2019, Chinese Patent Application No. 201910810274.X, filed on Aug. 29, 2019, and Chinese Patent Application No. 201910894458.9, filed on Sep. 20, 2019, all of the afore-mentioned patent applications hereby incorporated by reference in their entireties.

TECHNICAL FIELD

This application relates generally to the field of communications technologies, and in particular, to a random access method, an apparatus, and a storage medium.

BACKGROUND

In a radio communications system, to establish a connection to a network device, a terminal device needs to first initiate a random access procedure to the network device.

Currently, in a protocol of long term evolution (LTE) of a 4th generation mobile communications system and a protocol of new radio (NR) of a 5th generation mobile communications system, a terminal device usually performs random access by using a four-step random access (4-step physical random access channel, 4-step RACH) procedure. In the four-step random access procedure, the terminal device initiates a random access request to a network device, the network device sends random access response information to the terminal device, the terminal device initiates uplink data to the network device, and the network device sends contention resolution information to the terminal device. To support a random access request in a low-latency scenario, a two-step random access (2-Step RACH) procedure is proposed. In the two-step random access procedure, a terminal device initiates a random access request to a network device, where the request information includes a preamble and uplink data; and the network device sends response information for the random access request to the terminal. When the terminal device initiating the four-step random access request and the terminal device initiating the two-step random access request use a shared random access time-frequency resource, the network device uses a random access radio network identifier (random access radio network temporary identifier, RA-RNTI) to scramble downlink control information (DCI) carried on a physical downlink control channel (PDCCH). In this case, the terminal devices using the shared random access time-frequency resource can detect the DCI. In addition, the terminal devices descramble the PDCCH by using the RA-RNTI, and cannot determine whether a physical downlink shared channel (PDSCH) indicated by the downlink control information (DCI) belongs to the terminal devices. In other words, each terminal device detecting the DCI needs to demodulate the PDSCH indicated by the DCI, and determines, based on a demodulation result, whether the response information carried on the PDSCH belongs to the terminal device. Consequently, terminal devices have to demodulate unrelated PDSCHs, reducing the efficiency of performing random access by the terminal devices.

SUMMARY

This application provides a random access method, an apparatus, and a storage medium, to improve efficiency of performing random access by a terminal device.

According to a first aspect, this application provides a random access method. The method includes a terminal device, which receives first DCI from a network device. If it is determined that a type that is of response information and that is indicated by first indication information matches a random access type of a random access request initiated by the terminal device, the terminal device demodulates a PDSCH indicated by the first DCI. The first DCI includes the first indication information, the first indication information is used to indicate the type of the response information carried on the PDSCH, and the PDSCH carries response information for the random access request initiated by the terminal device.

Based on this solution, when the terminal device determines that the type that is of the response information and that is indicated by the first indication information matches the random access type of the random access request initiated by the terminal device, it indicates that the PDSCH indicated by the first DCI may belong to the terminal device. In this case, the terminal device demodulates the PDSCH indicated by the received first DCI. In this way, the quantity of times that the terminal device attempts to demodulate a PDSCH that is unrelated to the terminal device is reduced, so that the power consumption of the terminal device is reduced, and the random access efficiency of the terminal device is improved.

In a possible implementation, the type of the response information may be that the response information is for a four-step random access request, the response information is for a two-step random access request and does not include a contention resolution identity, or the response information is for a two-step random access request and includes at least a contention resolution identity.

When the type of the response information is that the response information is for a two-step random access request and includes at least a contention resolution identity, the first DCI further includes second indication information, and the second indication information is used to indicate a first preamble. If determining that the type that is of the response information and that is indicated by the first indication information matches the random access type of the random access request initiated by the terminal device, and determining that the first preamble matches a preamble carried in the random access request initiated by the terminal device, the terminal device demodulates the PDSCH indicated by the first DCI. In other words, the terminal device that needs to demodulate the PDSCH indicated by the first DCI needs to meet two conditions: 1: The type that is of the response information and that is indicated by the first indication information matches the random access type of the random access request initiated by the terminal device. 2: The first preamble matches the preamble carried in the random access request initiated by the terminal device. In this way, whether the PDSCH indicated by the first DCI belongs to the terminal device can be determined more accurately, thereby helping further reduce the power consumption of the terminal device caused by demodulation of a PDSCH unrelated to the terminal device, and further improve the efficiency of performing random access by the terminal device.

After the terminal device determines that contention succeeds, the terminal device needs to feed back an acknowledgement message to the network device. Therefore, the terminal device needs to obtain information indicating a resource used to feed back the acknowledgement message. This application provides the following two implementations:

Implementation 1: When the type of the response information is that the response information is for a two-step random access request and includes at least a contention resolution identity, the first DCI further includes third indication information. The third indication information is used to indicate the resource used by the terminal device to feed back the acknowledgement message, and the terminal device may feedback the acknowledgement message to the network device using the resource indicated by the third indication information.

Implementation 2: The terminal device may obtain, by demodulating the PDSCH indicated by the first DCI, the information indicating the resource used to feedback the acknowledgement message.

When the type of the response information is that the response information is for a two-step random access request and includes at least a contention resolution identity, the response information that is carried on the PDSCH and that is for the random access request initiated by the terminal device includes the following two cases.

Case I: The response information includes a contention resolution identity.

Case II: The response information includes a contention resolution identity and first information. The first information includes at least one of the following content: the information indicating the resource used to feed back the acknowledgement message, a transmit power control command (TPC command), a timing advance command, an uplink data transmission grant, the preamble carried in the random access request initiated by the terminal device, a C-RNTI, radio resource control reconfiguration information, radio resource control connection establishment information, or radio resource control resume information. The transmit power control command indicates a power control parameter used to transmit the acknowledgement message. The first information may further include other RRC information, and details are not described herein.

For the case II, in a possible implementation, the contention resolution identity and the first information are carried in one or more MAC subPDUs of a MAC PDU, where identifier information in a subheader of a MAC subPDU carrying the contention resolution identity and identifier information in a subheader of a MAC subPDU carrying the first information are the same or of a same type. In this case, an existing MAC subPDU carrying a contention identity may be compatible.

In a possible implementation, the MAC subPDUs include a data part and a subheader, and identifier information in the subheader of a MAC subPDU may be a logical channel identifier. A value of the logical channel identifier may indicate that the data part includes at least one of the following content: the information indicating the resource used to feed back the acknowledgement message, the TPC command, the timing advance command, the uplink data transmission grant, an index number of the preamble carried in the random access request initiated by the terminal device, the cell radio network temporary identifier C-RNTI, the radio resource control reconfiguration information, the radio resource control connection establishment information, or the radio resource control resume information.

When response information for a plurality of terminal devices is carried in one MAC PDU, to help the terminal device quickly determine MAC subPDUs belonging to the terminal device, fourth indication information may be added to the subheader of the MAC subPDU, the fourth indication information is used to indicate an association relationship between the MAC subPDU and an adjacent MAC subPDU, and the association relationship is used to determine a start MAC subPDU and an end MAC subPDU that belong to the terminal device.

According to a second aspect, this application provides a random access method. The method includes a terminal device receives first DCI from a network device through a first search space. The terminal device determines that a random access type corresponding to the first search space matches a random access type of a random access request initiated by the terminal device, and demodulates a PDSCH indicated by the first DCI. The PDSCH carries response information for the random access request initiated by the terminal device. The terminal device supports receiving of DCI through at least two types of search spaces. Each of the at least two types of search spaces is corresponding to one random access type, and at least two of the at least two types of search spaces are corresponding to different random access types.

Based on this solution, when the terminal device receives the first DCI from the network device through the first search space, it indicates that the random access type corresponding to the first search space matches the random access type of the random access request initiated by the terminal. In this case, the terminal device demodulates the PDSCH indicated by the received first DCI. In this way, a quantity of times that the terminal device attempts to demodulate a PDSCH that is unrelated to the terminal device is reduced, so that the power consumption of the terminal device is reduced, and the random access efficiency of the terminal device is improved.

To quickly determine whether the terminal device wins contention, in a possible implementation, the first DCI includes fifth indication information, and the fifth indication information is used to indicate a type of the response information carried on the PDSCH. The type of the response information may be that the response information is for a two-step random access request and does not include a contention resolution identity, or may be that the response information is for a two-step random access request and includes at least a contention resolution identity.

When the type of the response information is that the response information is for a two-step random access request and includes at least a contention resolution identity, the first DCI further includes second indication information, and the second indication information is used to indicate a first preamble. If the terminal device receives the first DCI from the network device through the first search space, and the first preamble matches a preamble carried in the random access request initiated by the terminal device, the terminal device demodulates the PDSCH indicated by the first DCI. In other words, the terminal device that needs to demodulate the PDSCH indicated by the first DCI needs to meet two conditions: 1: The first DCI from the network device may be received through the first search space, where the random access type corresponding to the first search space matches the random access type of the random access request initiated by the terminal device. 2: The first preamble matches an index number of the preamble carried in the random access request initiated by the terminal device. In this way, whether the PDSCH indicated by the first DCI belongs to the terminal device can be determined more accurately, thereby helping further reduce the power consumption of the terminal device caused by demodulation of a PDSCH unrelated to the terminal device, and further improve the efficiency of performing random access by the terminal device.

After the terminal device determines that contention succeeds, the terminal device needs to feedback an acknowledgement message to the network device. Therefore, the terminal device needs to obtain information indicating a resource used to feedback the acknowledgement message. This application provides the following two implementations:

Implementation 1: When the type of the response information is that the response information is for a two-step random access request and includes at least a contention resolution identity, the first DCI further includes third indication information. The third indication information is used to indicate the resource used by the terminal device to feedback the acknowledgement message, and the terminal device may feedback the acknowledgement message to the network device using the resource indicated by the third indication information.

Implementation 2: The terminal device may obtain, by demodulating the PDSCH indicated by the first DCI, the information indicating the resource used to feed back the acknowledgement message.

When the type of the response information is that the response information is for a two-step random access request and includes at least a contention resolution identity, the response information that is carried on the PDSCH and that is for the random access request initiated by the terminal device includes the following two cases.

Case I: The response information includes a contention resolution identity:

Case II: The response information includes a contention resolution identity and first information. The first information includes at least one of the following content: the information indicating the resource used to feed back the acknowledgement message, a TPC command, a timing advance command, an uplink data transmission grant, the index number of the preamble carried in the random access request initiated by the terminal device, a cell radio network temporary identifier C-RNTI, radio resource control reconfiguration information, radio resource control connection establishment information, or radio resource control resume information. The first information may further include other RRC information, and details are not described herein.

For the case II, in a possible implementation, the contention resolution identity and the first information are carried in one or more MAC subPDUs of a MAC PDU, where identifier information in a subheader of a MAC subPDU carrying the contention resolution identity and identifier information in a subheader of a MAC subPDU carrying the first information are the same or of a same type. In this case, an existing MAC subPDU carrying a contention identity may be compatible.

In a possible implementation, the MAC subPDUs include a data part and a subheader, and identifier information in the subheader of a MAC subPDU may be a logical channel identifier. A value of the logical channel identifier may indicate that the data part includes at least one of the following content: the information indicating the resource used to feed back the acknowledgement message, the TPC command, the timing advance command, the uplink data transmission grant, an index number of the preamble carried in the random access request initiated by the terminal device, the cell radio network temporary identifier C-RNTI, the radio resource control reconfiguration information, the radio resource control connection establishment information, or the radio resource control resume information.

When response information for a plurality of terminal devices is carried in one MAC PDU, to help the terminal device quickly determine MAC subPDUs belonging to the terminal device, fourth indication information may be added to the subheader of the MAC subPDU, the fourth indication information is used to indicate an association relationship between the MAC subPDU and an adjacent MAC subPDU, and the association relationship is used to determine a start MAC subPDU and an end MAC subPDU that belong to the terminal device.

According to a third aspect, this application provides a random access method. The method includes: A terminal device receives, from a network device, first DCI scrambled by a scrambling code within a first scrambling code range. If the terminal device successfully descrambles the first DCI by using the scrambling code within the first scrambling code range, and determines that a random access type corresponding to the first scrambling code range matches a random access type of a random access request initiated by the terminal device, the terminal device demodulates a PDSCH indicated by the first DCI. The terminal device supports descrambling of the DCI by using scrambling codes in at least two scrambling code ranges, each of the at least two scrambling code ranges is corresponding to one random access type, at least two of the at least two scrambling code ranges are corresponding to different random access types, and the PDSCH carries response information for the random access request initiated by the terminal device.

Based on this solution, when the terminal device determines that the random access type corresponding to the first scrambling code range matches the random access type of the random access request initiated by the terminal device, it indicates that the PDSCH indicated by the first DCI may belong to the terminal device. In this case, the terminal device demodulates the PDSCH indicated by the received first DCI. In this way, a quantity of times that the terminal device attempts to demodulate a PDSCH that is unrelated to the terminal device is reduced, so that power consumption of the terminal device is reduced, and random access efficiency of the terminal device is improved.

To quickly determine whether the terminal device wins contention, in a possible implementation, the first DCI includes fifth indication information, and the fifth indication information is used to indicate a type of the response information carried on the PDSCH. The type of the response information may be that the response information is for a two-step random access request and does not include a contention resolution identity, or may be that the response information is for a two-step random access request and includes at least a contention resolution identity:

When the type of the response information is that the response information is for a two-step random access request and includes at least a contention resolution identity, the first DCI further includes second indication information, and the second indication information is used to indicate a first preamble. If successfully descrambling the first DCI by using the scrambling code within the first scrambling code range, determining that the random access type corresponding to the first scrambling code range matches the random access type of the random access request initiated by the terminal device, and determining that the first preamble matches an index number of a preamble carried in the random access request initiated by the terminal device, the terminal device demodulates the PDSCH indicated by the first DCI. In other words, the terminal device that needs to demodulate the PDSCH indicated by the first DCI needs to meet two conditions: 1: The first DCI scrambled by the scrambling code within the first scrambling code range is received, and the random access type corresponding to the first scrambling code range matches the random access type of the random access request initiated by the terminal device. 2: The first preamble matches the index number of the preamble carried in the random access request initiated by the terminal device. In this way, whether the PDSCH indicated by the first DCI belongs to the terminal device can be determined more accurately, thereby helping further reduce power consumption of the terminal device caused by demodulation of a PDSCH unrelated to the terminal device, and further improve efficiency of performing random access by the terminal device.

After the terminal device determines that contention succeeds, the terminal device needs to feed back an acknowledgement message to the network device. Therefore, the terminal device needs to obtain information indicating a resource used to feed back the acknowledgement message. This application provides the following two implementations:

Implementation 1: When the type of the response information is that the response information is for a two-step random access request and includes at least a contention resolution identity, the first DCI further includes third indication information, and the third indication information is used to indicate the resource used by the terminal device to feed back the acknowledgement message, and the terminal device may feedback the acknowledgement message to the network device using the resource indicated by the third indication information.

Implementation 2: The terminal device may obtain, by demodulating the PDSCH indicated by the first DCI, the information indicating the resource used to feed back the acknowledgement message.

When the type of the response information is that the response information is for a two-step random access request and includes at least a contention resolution identity, the response information that is carried on the PDSCH and that is for the random access request initiated by the terminal device includes the following two cases.

Case I: The response information includes a contention resolution identity.

Case II: The response information includes a contention resolution identity and first information. The first information includes at least one of the following content: the information indicating the resource used to feed back the acknowledgement message, a TPC command, a timing advance command, an uplink data transmission grant, the index number of the preamble carried in the random access request initiated by the terminal device, a cell radio network temporary identifier C-RNTI, radio resource control reconfiguration information, radio resource control connection establishment information, or radio resource control resume information. The first information may further include other RRC information, and details are not described herein.

For the case II, in a possible implementation, the contention resolution identity and the first information are carried in one or more MAC subPDUs of a MAC PDU, where identifier information in a subheader of a MAC subPDU carrying the contention resolution identity and identifier information in a subheader of a MAC subPDU carrying the first information are the same or of a same type. In this case, an existing MAC subPDU carrying a contention identity may be compatible.

In a possible implementation, the MAC subPDUs include a data part and a subheader, and identifier information in the subheader of a MAC subPDU may be a logical channel identifier. A value of the logical channel identifier may indicate that the data part includes at least one of the following content: the information indicating the resource used to feed back the acknowledgement message, the TPC command, the timing advance command, the uplink data transmission grant, an index number of the preamble carried in the random access request initiated by the terminal device, the cell radio network temporary identifier C-RNTI, the radio resource control reconfiguration information, the radio resource control connection establishment information, or the radio resource control resume information.

When response information for a plurality of terminal devices is carried in one MAC PDU, to help the terminal device quickly determine MAC subPDUs belonging to the terminal device, fourth indication information may be added to the subheader of the MAC subPDU, the fourth indication information is used to indicate an association relationship between the MAC subPDU and an adjacent MAC subPDU, and the association relationship is used to determine a start MAC subPDU and an end MAC subPDU that belong to the terminal device.

According to a fourth aspect, this application provides a random access method. The method includes: A network device receives a random access request from a terminal device. The random access request includes a preamble and uplink data. After successfully decoding the uplink data in the random access request, the network device sends response information for the random access request to the terminal device. The response information includes a contention resolution identity, the response message includes a contention resolution identity and first information, or the response message includes first information. The first information includes at least one of the following content: information indicating a resource used to feed back an acknowledgement message, a TPC command, a timing advance command, an uplink data transmission grant, an index number of the preamble carried in the random access request of the terminal device, a cell radio network temporary identifier C-RNTI, radio resource control reconfiguration information, radio resource control connection establishment information, or radio resource control resume information.

Based on this solution, because the network device sends the contention resolution identity and the first information to the terminal device together, signaling overheads of interaction between the network device and the terminal device are reduced.

In a possible implementation, the contention resolution identity and the first information are carried in one or more MAC subPDUs of a MAC PDU, where identifier information in a subheader of a MAC subPDU carrying the contention resolution identity and identifier information in a subheader of a MAC subPDU carrying the first information are the same or of a same type. In this case, an existing MAC subPDU carrying a contention identity may be compatible.

In a possible implementation, the MAC subPDUs include a data part and a subheader, and identifier information in the subheader of a MAC subPDU is a logical channel identifier. A value of the logical channel identifier may be used to indicate information of the data part. The information of the data part includes at least one of the following content: the contention resolution identity, the information indicating the resource used to feed back the acknowledgement message, the TPC command, the timing advance command, the uplink data transmission grant, the index number of the preamble carried in the random access request of the terminal device, the cell radio network temporary identifier C-RNTI, the radio resource control reconfiguration information, the radio resource control connection establishment information, or the radio resource control resume information.

When response information for a plurality of terminal devices is carried in one MAC PDU, to help the terminal device quickly determine MAC subPDUs belonging to the terminal device, fourth indication information may be added to the subheader of the MAC subPDU, the fourth indication information is used to indicate an association relationship between the MAC subPDU and an adjacent MAC subPDU, and the association relationship is used to determine a start MAC subPDU and an end MAC subPDU that belong to the terminal device.

According to a fifth aspect, this application provides a random access method. The method includes: A network device receives a random access request from a terminal device, and determines first DCI based on a random access type corresponding to the random access request. The first DCI includes first indication information, the first indication information is used to indicate a type of response information carried on a PDSCH, and the PDSCH carries response information for the random access request initiated by the terminal device. The network device sends the first DCI to the terminal device.

Based on this solution, the network device adds the first indication information to the first DCI, so that when receiving the first DCI, the terminal device can determine whether the PDSCH indicated by the first DCI belongs to the terminal device, and demodulate the PDSCH indicated by the received first DCI only when the PDSCH belongs to the terminal device. In this way, a quantity of times that the terminal device attempts to demodulate a PDSCH that is unrelated to the terminal device is reduced, so that power consumption of the terminal device is reduced, and random access efficiency of the terminal device is improved.

For a possible implementation and effect analysis of the fifth aspect, refer to the descriptions in the first aspect. Details are not described herein again.

According to a sixth aspect, this application provides a random access method. The method includes: A network device receives a random access request from a terminal device, and determines first DCI based on a random access type corresponding to the random access request. The first DCI is used to indicate a PDSCH. The network device supports scheduling of PDSCHs carrying different response information by using formats of at least two types of different DCI, or supports scheduling of PDSCHs carrying different response information by using content of at least two types of different DCI. The at least two types of different DCI are corresponding to at least two types of different search spaces. The at least two types of different DCI include different DCI formats, or different DCI content, or a same DCI format and different content. Each of at least two types of search spaces is corresponding to one random access type, and at least two of the at least two types of search spaces are corresponding to different random access types. The PDSCH carries response information for the random access request initiated by the terminal device. It may also be understood that the network device may determine the first DCI based on a type of the response information for the random access request.

Based on this solution, different search spaces are corresponding to different random access types. Only the terminal device initiating the random access request whose random access type matches a random access type corresponding to a first search space can detect the first DCI through the first search space. Therefore, the terminal device detecting the first DCI through the first search space needs to demodulate the PDSCH indicated by the first DCI. Another terminal device cannot receive the first DCI, and therefore, does not need to demodulate the PDSCH indicated by the first DCI either. In this way, a quantity of times that the terminal device attempts to demodulate a PDSCH that is unrelated to the terminal device is reduced, so that power consumption of the terminal device is reduced, and random access efficiency of the terminal device is improved.

For a possible implementation and effect analysis of the sixth aspect, refer to the descriptions in the second aspect. Details are not described herein again.

According to a seventh aspect, this application provides a random access method. The method includes: A network device receives a random access request from a terminal device. The network device determines a first scrambling code range based on a random access type corresponding to the random access request. The network device sends first DCI scrambled by a scrambling code within the first scrambling code range to the terminal device. The first scrambling code range is corresponding to the random access type corresponding to the random access request. The network device supports scrambling of downlink control information DCI by using scrambling codes in at least two scrambling code ranges. Each of the at least two scrambling code ranges is corresponding to one random access type, and at least two of the at least two scrambling code ranges are corresponding to different random access types. The first DCI is used to indicate a PDSCH, and the PDSCH carries response information for the random access request initiated by the terminal device.

Based on this solution, different scrambling code ranges are corresponding to different random access types. The network device scrambles the first DCI by using the scrambling code within the first scrambling code range. In this way, only the terminal device initiating the random access request whose random access type matches the random access type corresponding to the first scrambling code range needs to demodulate the PDSCH indicated by the first DCI. Another terminal device does not demodulate the PDSCH indicated by the first DCI. In this way, a quantity of times that the terminal device attempts to demodulate a PDSCH that is unrelated to the terminal device is reduced, so that power consumption of the terminal device is reduced, and random access efficiency of the terminal device is improved.

For a possible implementation and effect analysis of the seventh aspect, refer to the descriptions in the third aspect. Details are not described herein again.

According to an eighth aspect, an embodiment of this application provides a communications apparatus. The communications apparatus has a function of implementing the terminal device or the network device in the foregoing embodiments. The function may be implemented by hardware, or may be implemented by hardware executing corresponding software. The hardware or software includes one or more units or modules corresponding to the foregoing functions.

In a possible implementation, the communications apparatus may be a terminal device, or a component that may be used in a terminal device, for example, a chip, a chip system, or a circuit. In this case, the communications apparatus may include a transceiver and a processor. Further, the processor may be configured to support the communications apparatus in performing a corresponding function of the terminal device described above. The transceiver is configured to support the communications apparatus in communicating with a network device, another terminal device, and the like. Optionally, the communications apparatus may further include a memory. The memory may be coupled to the processor, and the memory stores a program instruction and/or data that are/is utilized by the communications apparatus. The transceiver may be an independent receiver, an independent transmitter, a transceiver having both a sending function and a receiving function, or an interface circuit.

In another possible implementation, the communications apparatus may be a network device, or a component that may be used in a network device, for example, a chip, a chip system, or a circuit. The communications apparatus may include a processor and a transceiver. The processor may be configured to support the communications apparatus in performing a corresponding function of the terminal device described above. The transceiver is configured to support the communications apparatus in communicating with another network device, a terminal device, or the like. Optionally, the communications apparatus may further include a memory. The memory stores a program instruction and/or data that are/is utilized by the communications apparatus. The transceiver may be an independent receiver, an independent transmitter, a transceiver having both a sending function and a receiving function, or an interface circuit.

According to a ninth aspect, an embodiment of this application provides a communications apparatus, configured to implement the first aspect or any method in the first aspect, configured to implement the second aspect or any method in the second aspect, configured to implement the third aspect or any method in the third aspect, configured to implement the fourth aspect or any method in the fourth aspect, configured to implement the fifth aspect or any method in the fifth aspect, configured to implement the sixth aspect or any method in the sixth aspect, or configured to implement the seventh aspect or any method in the seventh aspect, and including corresponding functional modules configured to implement the steps in the foregoing methods. A function may be implemented by hardware, or may be implemented by hardware executing corresponding software. The hardware or software includes one or more modules corresponding to the function.

In a possible implementation, when the communications apparatus is a terminal device, the communications apparatus may include a processing unit and a transceiver unit. These units may perform corresponding functions of the terminal device in the foregoing method examples. For details, refer to the detailed descriptions in the method examples. Details are not described herein again.

In another possible implementation, the communications apparatus may alternatively be a network device, and may include a processing unit and a transceiver unit. These units may perform corresponding functions of the network device in the foregoing method examples. For details, refer to the detailed descriptions in the method examples. Details are not described herein again.

According to a tenth aspect, an embodiment of this application provides a communications system. The communications system includes a terminal device and a network device. The terminal device may be configured to perform the first aspect or any method in the first aspect. Correspondingly, the network device may be configured to perform the fifth aspect or any method in the fifth aspect.

Alternatively, the terminal device may be configured to perform the second aspect or any method in the second aspect. Correspondingly, the network device may be configured to perform the sixth aspect or any method in the sixth aspect. Alternatively, the terminal device may be configured to perform the third aspect or any method in the third aspect. Correspondingly, the network device may be configured to perform the seventh aspect or any method in the seventh aspect.

According to an eleventh aspect, this application provides a chip system, including a processor. Optionally, the chip system may further include a memory. The memory is configured to store a computer program, and the processor is configured to invoke a computer program from the memory and run the computer program, so that a communications apparatus on which the chip system is mounted is enabled to perform the first aspect, any method in the first aspect, the second aspect, any method in the second aspect, the third aspect, any method in the third aspect, the fourth aspect, any method in the fourth aspect, the fifth aspect, any method in the fifth aspect, the sixth aspect, any method in the sixth aspect, the seventh aspect, or any method in the seventh aspect.

According to a twelfth aspect, an embodiment of this application provides a computer storage medium. The computer storage medium stores instructions. When the instructions are run on a communications apparatus, the communications apparatus is enabled to perform the method according to any one of the first aspect or the possible implementations of the first aspect, the communications apparatus is enabled to perform the method according to any one of the second aspect or the possible implementations of the second aspect, the communications apparatus is enabled to perform the method according to any one of the third aspect or the possible implementations of the third aspect, the communications apparatus is enabled to perform the method according to any one of the fourth aspect or the possible implementations of the fourth aspect, the communications apparatus is enabled to perform the method according to any one of the fifth aspect or the possible implementations of the fifth aspect, the communications apparatus is enabled to perform the method according to any one of the sixth aspect or the possible implementations of the sixth aspect, or the communications apparatus is enabled to perform the method according to any one of the seventh aspect or the possible implementations of the seventh aspect.

According to a thirteenth aspect, an embodiment of this application provides a computer program product including instructions. When the computer program product runs on a communications apparatus, the communications apparatus is enabled to perform the method according to any one of the first aspect or the possible implementations of the first aspect, the communications apparatus is enabled to perform the method according to any one of the second aspect or the possible implementations of the second aspect, the communications apparatus is enabled to perform the method according to any one of the third aspect or the possible implementations of the third aspect, the communications apparatus is enabled to perform the method according to any one of the fourth aspect or the possible implementations of the fourth aspect, the communications apparatus is enabled to perform the method according to any one of the fifth aspect or the possible implementations of the fifth aspect, the communications apparatus is enabled to perform the method according to any one of the sixth aspect or the possible implementations of the sixth aspect, or the communications apparatus is enabled to perform the method according to any one of the seventh aspect or the possible implementations of the seventh aspect.

BRIEF DESCRIPTION OF DRAWINGS

FIG. 10c is a schematic structural diagram of another MAC subPDU carrying a UE RACH command for MsgB according to embodiments of this application;

DESCRIPTION OF EMBODIMENTS

Figure 1:
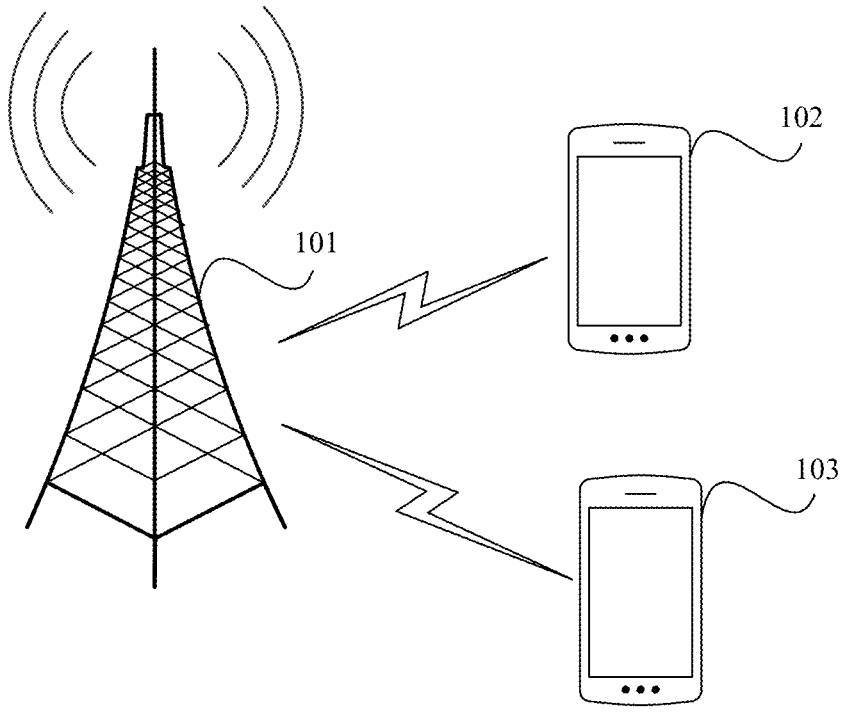
FIG. 1 is a schematic architectural diagram of a communications system according to embodiments of this application.

To make objectives, technical solutions, and advantages of this application clearer, the following further describes this application in detail with reference to the accompanying drawings.

For ease of understanding, basic concepts in this application are described below.

1. Scrambling

Scrambling is a processing method of a digital signal, and an exclusive OR operation is performed on a scrambling code and an original signal, to obtain a new signal. Generally, uplink physical channels are scrambled to distinguish between different terminal devices, and downlinks are scrambled to distinguish between cells and channels. The scrambling code may be used to scramble and descramble the original signal. For example, the scrambling code may be used to scramble DCI, which may also be referred to as scrambling of a PDCCH. Specifically, a cyclic redundancy check (CRC) field of the DCI is scrambled. Correspondingly, the terminal device descrambles the received DCI. Specifically, the terminal device descrambles the CRC field of the DCI by using a scrambling code of a corresponding type, to determine a format, a type, or the like of the DCI.

The scrambling code includes but is not limited to: a cell radio network temporary identifier (C-RNTI), a temporary cell radio network temporary identifier (TC-RNTI), and a random access radio network identifier (random access radio network temporary identifier, RA-RNTI). The scrambling codes are separately described in the following 2, 3, and 4.

2. C-RNTI

If a terminal device is in a radio resource control connected (RRC-connected) mode, it indicates that the terminal device has been allocated with a C-RNTI, and the terminal device is to use the C-RNTI when initiating a random access request to a network device. If the terminal device is in an RRC idle mode or an RRC inactive mode, it indicates that the terminal device is not allocated with a C-RNTI. If the terminal device requests an RRC connection, the network device may allocate a temporary C-RNTI (denoted as a TC-RNTI) to the terminal device in subsequent response information (for example, a Msg2 in a four-step random access procedure). After the terminal determines that contention resolution succeeds, the TC-RNTI is converted into a C-RNTI.

3. TC-RNTI

In a contention resolution mode, a network device allocates a TC-RNTI to a terminal device in a response message (for example, a Msg2 in a four-step random access procedure), to identify the terminal device in a subsequent Msg (for example, a Msg3 and a Msg4 in the four-step random access procedure). After the terminal device successfully performs random access, the TC-RNTI may be converted into a C-RNTI.

4. RA-RNTI

In a random access procedure, generation of an RA-RNTI is related to a time-frequency resource used by a terminal device to send a preamble. For example, when a terminal device A and a terminal device B use a same random access time-frequency resource to initiate random access, corresponding RA-RNTIs are the same. A four-step random access procedure is used as an example. After detecting a random access time-frequency resource for sending a preamble, a network device may calculate an RA-RNTI. The network device performs processing on a PDCCH based on a DCI format, and scrambles DCI by using the RA-RNTI in the processing process. The network device sends response information for the preamble to a terminal device. The terminal device knows information about the time-frequency resource for sending the preamble, and may also calculate an RA-RNTI. The terminal device may detect whether there is the RA-RNTI corresponding to the terminal device on a received PDCCH. If there is the RA-RNTI corresponding to the terminal device on the received PDCCH, it indicates that a random access request is responded by the network device, and the terminal device continues to demodulate a PDSCH indicated by the DCI carried on the PDCCH. If a preamble obtained through demodulation is the same as the preamble sent by the terminal device, the terminal device starts a subsequent procedure, for example, a contention resolution procedure. For example, for a manner of calculating the RA-RNTI, refer to related descriptions in 3GPP 38.321. Details are not described herein again.

5. Physical Channel

A physical channel is used to transmit a specific signal at a physical layer. Physical channels include: (a) a physical downlink shared channel (PDSCH), used to carry downlink service data and the like; (b) a physical downlink control channel (PDCCH), used to carry downlink scheduling information, such as channel allocation and downlink control information (DCI), that is, DCI being carried on the PDCCH; (c) a physical uplink shared channel (PUSCH), used to carry uplink control information and service data; (d) a physical uplink control channel (PUCCH), used to carry uplink control information, such as an ACK/a NACK; and (e) a physical layer random access channel (physical random access channel, PRACH), used by a terminal device to initiate communication with a network device. The terminal device sends a preamble during random access. The network device receives the preamble through the PRACH and determines an identity of the connected terminal device.

6. Preamble

A preamble is a random access preamble, and is used to identify an identity of a terminal device during random access. In LTE and Rel-15 NR communications systems, each cell has 64 preambles. Optionally, a random access request sent by a terminal device to a network device carries a preamble. When sending response information to the terminal device, the network device may send an index of the preamble to reduce a size of the response information.

7. Others

The terms "first", "second", and the like are intended to distinguish between similar objects but do not necessarily indicate a specific order or sequence. In addition, the terms "include", "have", and any variant thereof are intended to cover a non-exclusive inclusion, for example, a series of modules or units. A system, product, or device is not necessarily limited to those modules or units that are clearly listed, but may include other modules or units that are not clearly listed or inherent to these systems, modules, or units.

"At least one" means one or more, and "a plurality of" means two or more.

The term "and/or" is used to describe an association relationship for describing associated objects, and indicates that three relationships may exist. For example, "A and/or B" may represent the following three cases: Only A exists, only B exists, and both A and B exist, where A and B may be singular or plural. The character "/" generally represents an "or" relationship between the associated objects.

FIG. 1 is an example of a schematic architectural diagram of a communications system according to this application. The communications system may include a network device and a terminal device. FIG. 1 is described by using an example in which the communications system includes a network device 101, a terminal device 102, and a terminal device 103. The communications system may be a code division multiple access (CDMA) system, a wideband code division multiple access (WCDMA) system, a worldwide interoperability for microwave access (WiMAX) system, a long term evolution (LTE) radio communications system, a 5G communications system (for example, a new radio (NR) system), a communications system in which a plurality of communication technologies are integrated (for example, a communications system in which an LTE technology and an NR technology are integrated), or another communications system, such as a public land mobile network (PLMN) system or another communications system that may evolve in the future (for example, a 6G system). This is not limited in this application. Forms and quantities of the network device and the terminal devices shown in FIG. 1 are merely used as an example, and do not constitute a limitation on the embodiments of this application.

(1) The network device, also referred to as a radio access network (RAN) device, is a device that connects a terminal device to a wireless network, and includes network devices in various communications standards, for example, including but not limited to a base station, a NodeB (nodeB, NB), an evolved NodeB (evolved Node B, eNB), a transmit node or a transmission reception point (TRP or TP), a radio network controller (RNC), a network device controller (base station controller, BSC), a network device transceiver station (base transceiver station, BTS), a home network device (for example, a home evolved nodeB, or a home node B, HNB), a baseband unit (BBU), a network device or base station (for example, a gNB) in a 5G network, a base station in a future evolved network, or the like.

(2) The terminal device is a device having a wireless communication function, and may be, for example, a hand-held device having a wireless communication function, a vehicle-mounted device, a wearable device (for example, including a smartwatch, a smart band, or a pedometer), a mobile internet device (MID), an unmanned aerial vehicle device, a computing device, another processing device connected to a wireless modem, or a terminal device in a 5G network or future evolved network. In different networks, a terminal device may have different names, for example, a terminal device, an access terminal, a subscriber unit, a subscriber station, a mobile station, a mobile station, a remote station, a remote terminal, a mobile device, a user terminal, a terminal, a wireless communications device, a user agent or user apparatus, a cellular phone, a cordless telephone set, a session initiation protocol (SIP) phone, a wireless local loop (WLL) station, and a personal digital assistant (PDA) station.

Based on the architecture of the foregoing communications system, to establish a connection to a network device (for example, the network device 101 shown in FIG. 1), terminal devices (for example, the terminal device 102 and the terminal device 103 shown in FIG. 1) usually initiate random access procedures to the network device. The terminal device may initiate a random access procedure in the following scenarios:

Scenario 1: The terminal device establishes an initial radio resource control (radio resource control, RRC) connection. When the terminal device changes from an idle mode to a connected mode, the terminal device initiates the random access procedure.

Scenario 2: The terminal device reestablishes an RRC connection. After a radio connection fails, the terminal device initiates a random access procedure when the terminal device needs to reestablish the RRC connection.

Scenario 3: When the terminal device performs a cell handover, the terminal device initiates the random access procedure in a new cell.

Scenario 4: Downlink data arrives, and the terminal device is in a connected mode. If the network device finds that the terminal device is in an uplink out-of-synchronization state when the network device transmits downlink data to the terminal device, the network device triggers the terminal device to initiate the random access procedure.

Scenario 5: Uplink data arrives, and the terminal device is in a connected mode. If the terminal device finds that the terminal device is in an uplink out-of-synchronization state or there is no available uplink control resource for transmission of a scheduling request when the terminal device transmits uplink data to the network device, the terminal device initiates the random access procedure.

The following describes two random access procedures provided in this application: a four-step random access procedure and a two-step random access procedure. A terminal device in the following method shown in FIG. 2a or FIG. 2b may be the terminal device 102 or the terminal device 103 in FIG. 1, and a network device may be the network device 101 in FIG. 1.

Figure 2A:
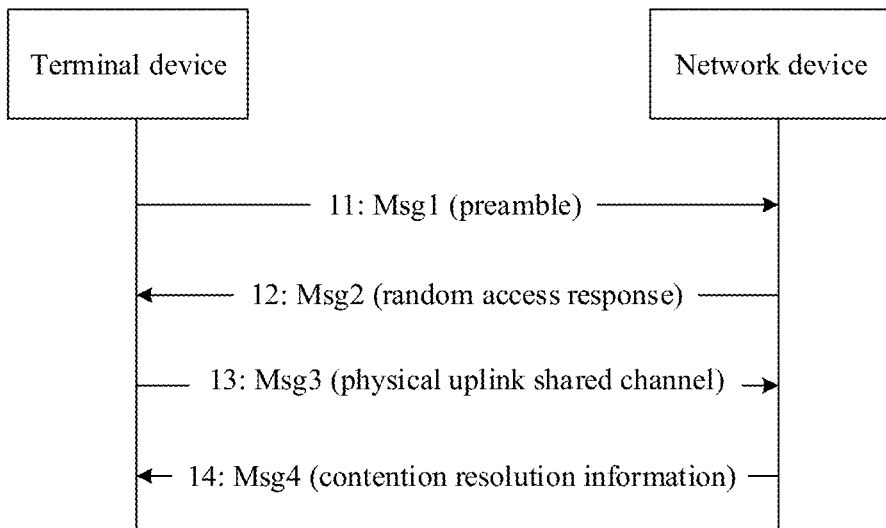
FIG. 2a is a schematic flowchart of a four-step random access method according to embodiments of this application.

FIG. 2a is a schematic flowchart of a four-step random access method according to this application. The four-step random access method includes the following steps.

Step 11: A terminal device sends a Msg1 to a network device.

The Msg1 is a random access request, and includes a preamble. The preamble may be randomly selected by the terminal device. The terminal device sends the Msg1 to the network device on a RACH.

Correspondingly, the network device receives the Msg1 from the terminal device.

Step 12: The network device sends a Msg2 to the terminal device.

Herein, the Msg2 is random access response (RAR) information for the preamble, and includes reserved bits (usually indicated by R), a timing advance (TA) command, an uplink grant, a TC-RNTI, and the like. The uplink grant is indication information of a position of an uplink resource allocated by the network device to the terminal device, and the TC-RNTI is a temporary cell radio network temporary identifier allocated by the network device to the terminal device.

Correspondingly, the terminal device receives the Msg2 from the network device. The terminal device may listen, by using an RA-RNTI on a PDCCH, to DCI for scheduling of a PDSCH carrying the Msg2.

Step 13: The terminal device sends a Msg3 (a PUSCH) to the network device.

Herein, after sending the Msg3, the terminal device immediately starts a contention resolution timer (where the timer is to be restarted each time the Msg3 is retransmitted subsequently). The terminal device listens to a contention resolution message returned by the network device to the terminal device before the timer expires.

Correspondingly, the network device receives the Msg3 from the terminal device.

Step 14: The network device sends a Msg4 (contention resolution information (CRM)) to the terminal device.

Herein, when the network device sends the contention resolution information to the terminal device, when the terminal device is in an RRC idle mode or an RRC inactive mode, the DCI may be scrambled by the TC-RNTI. Before the contention resolution timer expires, if detecting the DCI scrambled by the TC-RNTI, the terminal demodulates response information that is carried on the PDSCH and that is indicated by the DCI, and performs matching between a contention resolution identity (contention resolution identifier, CRID) carried in the PDSCH and a common control channel serving data unit (CCCH SDU) carried in the Msg3 of the terminal device. If the contention resolution identity is the same as the CCCH SDU, the terminal device considers that contention resolution succeeds. If the contention resolution identity does not match the CCCH SDU, the terminal device considers that the random access fails.

Figure 2B:
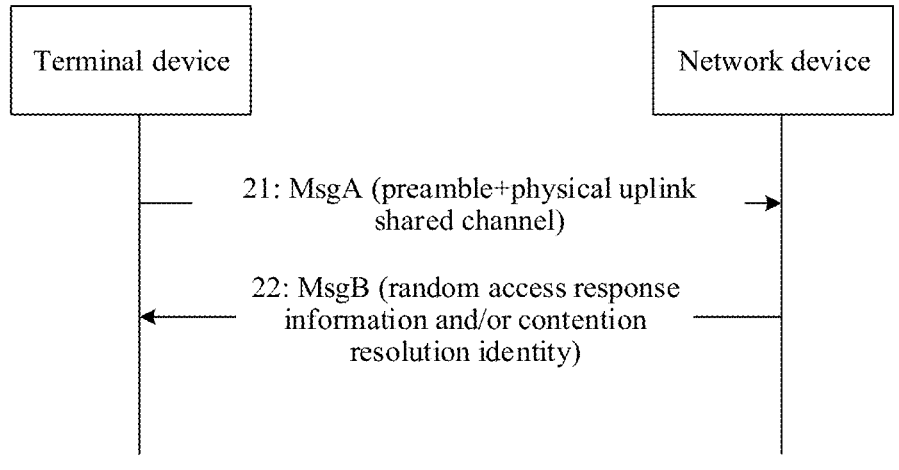
FIG. 2b is a schematic flowchart of a two-step random access method according to embodiments of this application.

FIG. 2b is a schematic flowchart of a two-step random access method according to this application. The two-step random access method includes the following steps.

Step 21: A terminal device sends a MsgA to a network device.

The MsgA is a random access request, includes a random access preamble and a PUSCH, and is equivalent to the Msg1 and the Msg3 in the 4-step RACH in FIG. 2a.

Step 22: The network device sends a MsgB to the terminal device.

Herein, the MsgB is response information for the random access request, and includes at least one of response information for the preamble and response information for the PUSCH. The response information for the random access preamble is random access response information, including a TA command, a TC-RNTI, and a UL grant. The response information for the PUSCH includes contention resolution information, mainly including a CRID.

It should be noted that, in a current 2-step random access procedure, a manner in which a network device sends a contention resolution identity to a terminal device in an RRC idle mode or RRC inactive mode may be that the network device scrambles DCI by using a common RNTI. Based on this manner, the terminal device demodulates a PDSCH indicated by the received DCI, to obtain a CRID carried in response information carried on the PDSCH, and can determine whether contention resolution succeeds only after comparing the CRID with a UE ID or UL CCCH SDU.

When a terminal device initiating two-step random access and a terminal device initiating a four-step random access use a shared random access time-frequency resource (RACH Occasion, RO), that is, the time-frequency resource used by the terminal device initiating the two-step random access is the same as the time-frequency resource used by the terminal device initiating the four-step random access. Because the terminal devices that perform random access by using the same RO use a same RA-RNTI, terminal devices that perform random access by using the same RO can listen to a PDCCH that is from the network device and that is scrambled by an RA-RNT calculated by using the RO. However, these terminal devices cannot determine, based on the RA-RNTI, whether response information from the network device is response information in the two-step random access or response information in the four-step random access. That is, a terminal device receiving DCI cannot determine whether the response information is a MsgB or a Msg2. The terminal device demodulates a PDSCH indicated by the DCI, to determine whether the response information belongs to the terminal device. Consequently, efficiency of a random access procedure of the terminal device is not high.

With reference to the foregoing communications system and an existing technical problem, the following FIG. 3 to FIG. 6 are schematic flowcharts of different random access methods provided by this application, and the random access methods may be used to resolve the problem in the background. In FIG. 3 to FIG. 6, a network device may be the network device 101 in FIG. 1, and a terminal device may be the terminal device 102 or the terminal device 103 in FIG. 1. For ease of description of the solutions, the following embodiments of this application are described by using an example in which random access types include two-step random access and four-step random access. With development of communications technologies, there may be more other random access types in the future, and the random access methods described below are also applicable to the other random access types.

It should be noted that a four-step random access request described in the following embodiments means that a random access type of a random access request is a four-step random access type. Similarly, a two-step random access request indicates that a random access type of a random access request is a two-step random access type. The random access type may also be referred to as a random access manner.

Figure 3:
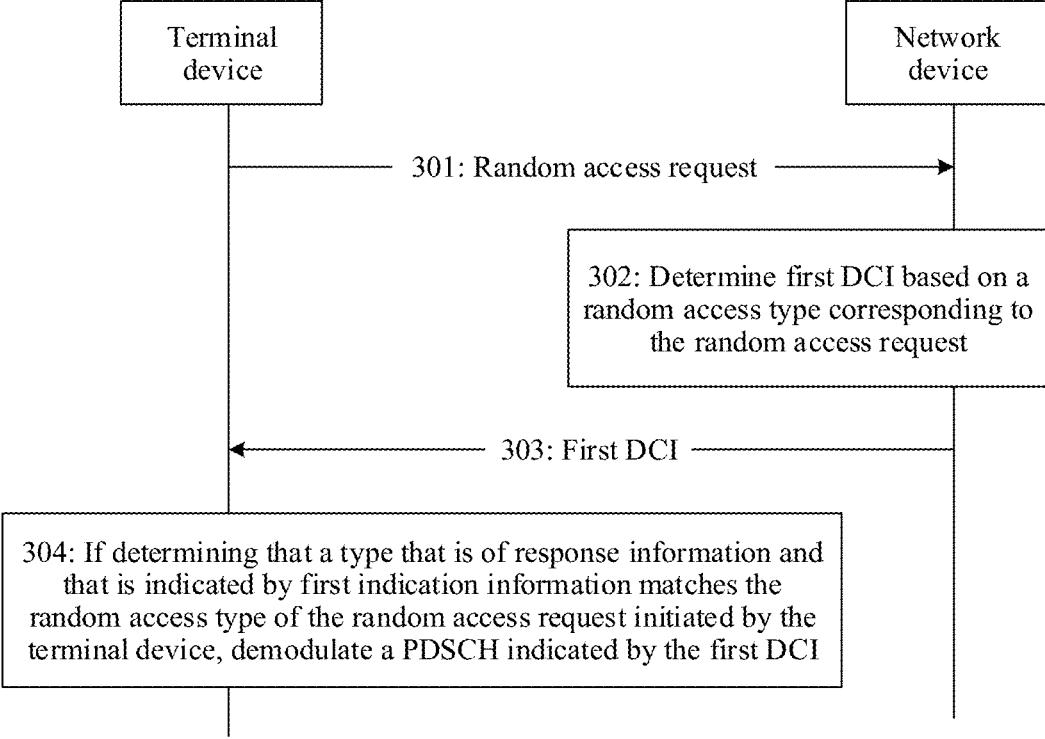
FIG. 3 is a schematic flowchart of a random access method according to embodiments of this application.

FIG. 3 is a schematic flowchart of a random access method according to this application. The random access method includes the following steps.

Step 301: A terminal device sends a random access request to a network device.

Herein, a random access type corresponding to the random access request may be a two-step random access type, a four-step random access type, or another random access type that appears in the future.

When the random access type of the random access request is a two-step random access type, for step 301, refer to the descriptions of step 21 in FIG. 2b. When the random access type of the random access request is a four-step random access type, for step 301, refer to the descriptions of step 11 in FIG. 2a.

Correspondingly, the network device receives the random access request from the terminal device.

Step 302: The network device determines first DCI based on the random access type corresponding to the random access request.

Herein, the first DCI includes first indication information, and the first indication information is used to indicate a type of response information carried on a PDSCH. The network device may scramble the first DCI by using an RA-RNTI.

When the network device determines that the random access type of the random access request is a four-step random access type, the type that is of the response information and that is indicated by the first indication information is that the response information is for a four-step random access request. When the network device determines that the random access type of the random access request is a two-step random access type, the type that is of the response information and that is indicated by the first indication information is that the response information is for a two-step random access request and does not include a contention resolution identity. Alternatively, the type of the response information is that the response information is for a two-step random access request and includes at least a contention resolution identity.

In a possible implementation, the network device may receive random access requests of a plurality of terminal devices. In other words, the plurality of access requests include both a two-step random access request type and a four-step random access request type. In this case, types that are of response information and that are indicated by first indication information may further include: Response information is for a four-step random access request, and response information is for a two-step random access request and does not include a contention resolution identity; response information is for a four-step random access request, and response information is for a two-step random access request and includes at least a contention resolution identity; response information is for a two-step random access request and does not include a contention resolution identity, and response information is for a two-step random access request and includes at least a contention resolution identity; or response information is for a four-step random access request, response information is for a two-step random access request and does not include a contention resolution identity, and response information is for a two-step random access request and includes at least a contention resolution identity.

In another possible implementation, indication information of the first indication information is reserved, that is, has no indication meaning.

For ease of description of the solutions, this application is described by using an example in which the first indication information is a combination of 0 and 1. Table 1 shows a relationship between the first indication information and the type of the response information provided in this application.

TABLE 1

| Relationship between first indication information and a type of response information | |
| --- | --- |
| First indication information | Type of response information |
| 00 | Response information is for a four-step random access request (RAR for 4-step RACH) |
| 01 | Response information is for a two-step random access request and does not include a contention resolution identity (RAR without CRID for 2-step RACH) |

TABLE 1-continued

Relationship between first indication
information and a type of response information

| First indication information | Type of response information |
|---|---|
| 10 | Response information is for a two-step random access request and includes at least a contention resolution identity (At least contain CRID for 2-step RACH) |
| 11 | Option 1: RAR for 4-step RACH and RAR without CRID for 2-step RACH; RAR for 4-step RACH and At least contain CRID for 2-step RACH; RAR without CRID for 2-step RACH and At least contain CRID for 2-step RACH; or RAR for 4-step RACH, RAR without CRID for 2-step RACH, and At least contain CRID for 2-step RACH Option 2: Reserved |

As shown in the table 1, the type that is of the response information and that is indicated by the first indication information being 00 is: The response information is for a four-step random access request. The type that is of the response information and that is indicated by the first indication information being 01 is: The response information is for a two-step random access request, and does not include a contention resolution identity. The type that is of the response information and that is indicated by the first indication information being 10 is: The response information is for a two-step random access request, and includes at least a contention resolution identity.

The first indication information being 11 may be one of the following options: The option 1 indicates that the type that is of the response information and that is indicated by the first indication information being 11 is: Response information is for a four-step random access request, and response information is for a two-step random access request and does not include a contention resolution identity; response information is for a four-step random access request, and response information is for a two-step random access request and includes at least a contention resolution identity; response information is for a two-step random access request and does not include a contention resolution identity, and response information is for a two-step random access request and includes at least a contention resolution identity; or response information is for a four-step random access request, response information is for a two-step random access request and does not include a contention resolution identity, and response information is for a two-step random access request and includes at least a contention resolution identity. It may also be understood that the response information includes not only the response information for a four-step random access request, but also the response information for a two-step random access request. That is, the PDSCH carries response information for a plurality of terminal devices. In addition, some of the plurality of terminal devices may be terminal devices initiating four-step random access requests, and some of the plurality of terminal devices may be terminal devices initiating two-step random access requests. The option 2 indicates reserved when the first indication information is 11. That is, the type of the response information is not defined.

It should be noted that there is no mandatory correspondence between a value that is corresponding to the first indication information and that is listed in the table 1 and the type that is of the response information and that is identified by the value. Any other form of the value of the first indication information can enable the terminal device to distinguish a type of response information. This is not limited in this application.

In a possible implementation, before the terminal device performs random access, the network device may configure, for the terminal device, at least two random access types supported by the network device and a relationship between the first indication information and the type of the response information. That is, the terminal device pre-obtains the relationship that is between the first indication information and the type of the response information and that is configured by the network device.

In another possible implementation, the relationship between the first indication information and the type of the response information may alternatively be pre-specified in a protocol.

When the network device scrambles the DCI by using the RA-RNTI, a type of the first DCI may be a DCI format 1_0, the first DCI of this type includes reserved bits, and the reserved bits occupy 16 bits. The first indication information may be located in a first preset bit in the reserved bits, and the first preset bit may occupy 2 bits. Specifically, the first preset bit may be the first 2 bits, any intermediate 2 bits, or the last 2 bits in the reserved bits of 16 bits. This is not limited in this application.

For example, a form in which the first indication information is located in the reserved bits may be:

first indication information-2 bits; and reserved bits-14 bits.

Values of the reserved bits may be 0, 1, or any possible value. This is not limited in this application.

Step 303: The network device sends the first DCI to the terminal device.

Correspondingly, the terminal device receives the first DCI from the network device. The first DCI is carried on a PDCCH.

Step 304: If determining that the type that is of the response information and that is indicated by the first indication information matches the random access type of the random access request initiated by the terminal device, the terminal device demodulates the PDSCH indicated by the first DCI.

The PDSCH carries response information for the random access request initiated by the terminal device. Optionally, there is a correspondence between the type of the response information and a random access type. For example, a type that is of response information and that matches a four-step random access type is that the response information is for a four-step random access request, and a type that is of response information and that matches a two-step random access type is that the response information is for a two-step random access request.

It may also be understood that after the terminal device receives the first DCI from the network device, the terminal device may determine, based on the first indication information in the first DCI, whether the terminal device demodulates the PDSCH indicated by the DCI.

With reference to FIG. 1, descriptions are provided by using an example in which a random access type of a random access request initiated by the terminal device 102 is two-step random access, a random access type of a random access request initiated by the terminal device 103 is four-step random access, and the terminal device 102 and the terminal device 103 use a shared random access time-frequency resource to initiate the random access requests. In this scenario, both the terminal device 102 and the terminal device 103 may receive first DCI from the network device.

After both the terminal device 102 and the terminal device 103 receive the first DCI from the network device, the terminal device 102 and the terminal device 103 each determine whether a type that is of response information carried on a PDSCH and that is indicated by first indication information included in the received first DCI matches a random access type of a random access request initiated by the terminal device. With reference to the foregoing table 1, the following four cases may occur.

Case 1: The first indication information in the first DCI is 00.

When the first indication information is 00, the terminal device 102 and the terminal device 103 determine that the type that is of the response information carried on the PDSCH and that is indicated by the first indication information is: The response information is for a four-step random access request. The terminal device 103 determines that the type that is of the response information and that is indicated by the first indication information matches the random access type of the random access request initiated by the terminal device 103. The terminal device 103 demodulates the PDSCH indicated by the first DCI. The terminal device 102 determines that the type that is of the response information and that is indicated by the first indication information does not match the random access type of the random access request initiated by the terminal device 102. The terminal device 102 does not need to process the PDSCH indicated by the first DCI. In this way, power consumption of the terminal device 102 may be reduced, and the terminal device 102 may directly wait for (continue to listen to) subsequent DCI from the network device.

Further, the terminal device 103 may demodulate the PDSCH indicated by the first DCI to obtain a preamble, and the terminal device 103 may obtain corresponding random response information based on an index number of the preamble obtained through demodulation.

Case 2: The first indication information in the first DCI is 01.

When the first indication information is 01, the terminal device 102 and the terminal device 103 determine that the type that is of the response information carried on the PDSCH and that is indicated by the first indication information is: The response information is for a two-step random access request, and does not include a contention resolution identity. The terminal device 102 determines that the type that is of the response information and that is indicated by the first indication information matches the random access type of the random access request initiated by the terminal device 102. The terminal device 102 demodulates the PDSCH indicated by the first DCI. The terminal device 103 determines that the type that is of the response information and that is indicated by the first indication information does not match the random access type of the random access request initiated by the terminal device 103. The terminal device 103 does not need to process the PDSCH indicated by the first DCI. In this way, power consumption of the terminal device 103 may be reduced, and the terminal device 103 may directly wait for subsequent DCI from the network device.

Further, the terminal device 102 demodulates the PDSCH indicated by the first DCI to obtain an index number of a preamble, obtains random access response information of the two-step random access request based on the index number of the preamble, and performs a corresponding operation according to an indication of the random access response, for example, a retransmission operation.

Case 3: The first indication information in the first DCI is 10.

When the first indication information is 10, the terminal device 102 and the terminal device 103 determine that the type that is of the response information carried on the PDSCH and that is indicated by the first indication information is: The response information is for a two-step random access request, and includes at least a contention resolution identity. The terminal device 102 determines that the type that is of the response information and that is indicated by the first indication information matches the random access type of the random access request initiated by the terminal device 102. In this case, the terminal device 102 is to demodulate the PDSCH indicated by the first DCI. The terminal device 103 determines that the type that is of the response information and that is indicated by the first indication information matches the random access type of the random access request initiated by the terminal device 103. The terminal device 103 does not need to demodulate the PDSCH indicated by the first DCI.

Further, the terminal device 102 demodulates the PDSCH indicated by the first DCI to obtain the contention resolution identity. If the terminal device 102 determines that the contention resolution identity obtained through demodulation is consistent with a UE ID or CCCH SDU carried in the random access request initiated by the terminal device, the terminal device 102 considers that contention succeeds.

Case 4: The first indication information in the first DCI is 11.

When first indication information is 11, the terminal device 102 and the terminal device 103 determine that the type that is of the response information carried on the PDSCH and that is indicated by the first indication information is: Response information is for a four-step random access request, and response information is for a two-step random access request and does not include a contention resolution identity; response information is for a four-step random access request, and response information is for a two-step random access request and includes at least a contention resolution identity; response information is for a two-step random access request and does not include a contention resolution identity, and response information is for a two-step random access request and includes at least a contention resolution identity; or response information is for a four-step random access request, response information is for a two-step random access request and does not include a contention resolution identity, and response information is for a two-step random access request and includes at least a contention resolution identity. In the case 4, both the terminal device 102 and the terminal device 103 need to demodulate the PDSCH indicated by the first DCI. The terminal device 102 and the terminal device 103 separately determine respective response information based on index numbers of preambles and/or the contention resolution identities that are obtained through demodulation.

It may be learned from step 301 to step 304 that when the terminal device determines that the type that is of the response information and that is indicated by the first indication information matches the random access type of the random access request initiated by the terminal device, it indicates that the PDSCH indicated by the first DCI may belong to the terminal device. In this case, the terminal device demodulates the PDSCH indicated by the received first DCI. In this way, a quantity of times that the terminal device attempts to demodulate a PDSCH that is unrelated to the terminal device is reduced, so that power consumption of the terminal device is reduced, and random access efficiency of the terminal device is improved.

In step 302, when determining that the type of the response information is that the response information is for a two-step random access request and includes at least a contention resolution identity, the network device may further extend the reserved bits (reserved bits) in the first DCI. That is, the first DCI further includes second indication information. The second indication information may be used to indicate a first preamble. When the terminal device receives the first DCI from the network device, where the first DCI includes the first indication information and the second indication information, and the terminal device needs to further determine that the first preamble indicated by the second indication information matches an index number of a preamble carried in the random access request initiated by the terminal device when determining that the type that is of the response information carried by the PDSCH and that is indicated by the first indication information matches the random access type of the random access request initiated by the terminal device, the terminal device demodulates the PDSCH indicated by the first DCI. In other words, the terminal device that needs to demodulate the PDSCH indicated by the first DCI needs to meet two conditions: 1: The type that is of the response information and that is indicated by the first indication information matches the random access type of the random access request initiated by the terminal device. 2: The first preamble matches the index number of the preamble carried in the random access request initiated by the terminal device. In this way, whether the PDSCH indicated by the first DCI belongs to the terminal device can be determined more accurately, thereby helping further reduce power consumption of the terminal device caused by demodulation of a PDSCH unrelated to the terminal device, and further improve efficiency of performing random access by the terminal device.

For example, when random access types of random access requests initiated by a plurality of terminal devices are two-step random access types, only a terminal device initiating a two-step random access request demodulates the PDSCH indicated by the first DCI, where an index number of a preamble carried in the random access request matches the first preamble indicated by the second indication information.

It should be noted that a field corresponding to the second indication information always exists in the first DCI. When the network device determines that the type of the response information is that the response information is for a four-step random access request, or the response information is for a two-step random access request and does not include a contention resolution identity, the field corresponding to the second indication information is not used to indicate the first preamble. In this case, it may also be understood that when receiving the first DCI, the terminal device does not read the field corresponding to the second indication information. When the network device determines that the type of the response information is that the response information is for a two-step random access request and includes at least a contention resolution identity, the field corresponding to the second indication information is used to indicate the first preamble.

In a possible implementation, the second indication information may be located in a second preset bit in the reserved bits of the first DCI, and the second preset bit may occupy 6 bits. Specifically, the second preset bit may occupy the first 6 bits, any intermediate 6 bits, or the last 6 bits other than bits occupied by the first indication information in the reserved bits. This is not limited in this application.

For example, a form in which the first indication information and the second indication information are located in the reserved bits may be:
first indication information-2 bits;
second indication information-6 bits, where the type of the response information is that the response information is for a two-step random access request, and includes at least a contention resolution identity; and
reserved bits-8 bits.

Values of the reserved bits may be 0, 1, or any possible value. This is not limited in this application.

Further, after the terminal device contends successfully, the terminal device needs to feed back an acknowledgement (ACK-feedback) message to the network device. The terminal device needs to obtain information about a resource of a physical uplink control channel (PUCCH) for feeding back the acknowledgement message to the network device. This application provides the following two implementations for the terminal device to obtain information indicating the resource used to feed back the acknowledgement message.

Implementation 1: Third indication information is added to the first DCI.

When determining that the type of the response information is that the response information is for a two-step random access request and includes at least a contention resolution identity, the network device may further extend the reserved bits in the first DCI. That is, the first DCI further includes the third indication information. The third indication information may be used to indicate to the terminal device to indicate, to the network device, the information about the resource used to feedback the acknowledgement message. The information about the resource includes but is not limited to a frequency domain position of the resource of the PUCCH for sending the ACK and a time domain position of the resource of the PUCCH for sending the ACK. The terminal device feeds back the acknowledgement message to the network device according to the third indication information.

For example, the third indication information may be located in a third preset bit in the reserved bits of the first DCI, and the third preset bit may occupy 6 bits. Specifically, the third preset bit may occupy the first 6 bits, any intermediate 6 bits, or the last 6 bits other than bits occupied by the first indication information and second indication information in the reserved bits.

This is not limited in this application.

For example, that the first indication information, the second indication information, and the third indication information are located in the reserved bits includes but is not limited to the following two forms.
Form 1:
first indication information-2 bits;
second indication information-6 bits, where the type of the response information is that the response information is for a two-step random access request, and includes at least a contention resolution identity;
third indication information-6 bits, where the type of the response information is that the response information is for a two-step random access request, and includes at least a contention resolution identity; and
reserved bits-2 bits.

Optionally, content of the third indication information is an uplink control channel resource indicator (PUCCH resource indicator) and a PDSCH-to-HARQ_feedback timing indicator (PDSCH-to-HARQ_feedback timing indicator), which respectively occupy 3 bits. Values of the PUCCH resource indicator and the PDSCH-to-HARQ_feedback timing indicator may inherit definitions of the two fields in the existing Rel-15 NR protocol. The PUCCH resource indicator indicates the frequency domain position of the resource of the PUCCH for sending the ACK, and the PDSCH-to-HARQ_feedback timing indicator indicates a length of an interval slot between the time domain position of the resource of the PUCCH for sending the ACK and the last slot in which the PDSCH is received.

Form 2:

first indication information-2 bits;

second indication information-6 bits, where the type of the response information is that the response information is for a two-step random access request, and includes at least a contention resolution identity;

PUCCH resource indicator-3 bits, where the type of the response information is that the response information is for a two-step random access request, and includes at least a contention resolution identity;

PDSCH-to-HARQ_feedback timing indicator-3 bits, where the type of the response information is that the response information is for a two-step random access request, and includes at least a contention resolution identity; and reserved bits-2 bits.

Values of the reserved bits in the form 1 and form 2 may be 0, 1, or any possible value. This is not limited in this application.

It should be noted that the first DCI may include the first indication information, may include the first indication information and the second indication information, may include the first indication information and the third indication information, or may include the first indication information, the second indication information, and the third indication information.

Implementation 2: The information about the resource for feeding back the acknowledgement message is obtained through demodulation of the PDSCH indicated by the first DCI.

Based on the implementation 2, the terminal device may feedback the acknowledgement message to the network device based on the information that is used to indicate the resource for feeding back the acknowledgement message and that is obtained by demodulating the PDSCH.

Figures 4, 5:
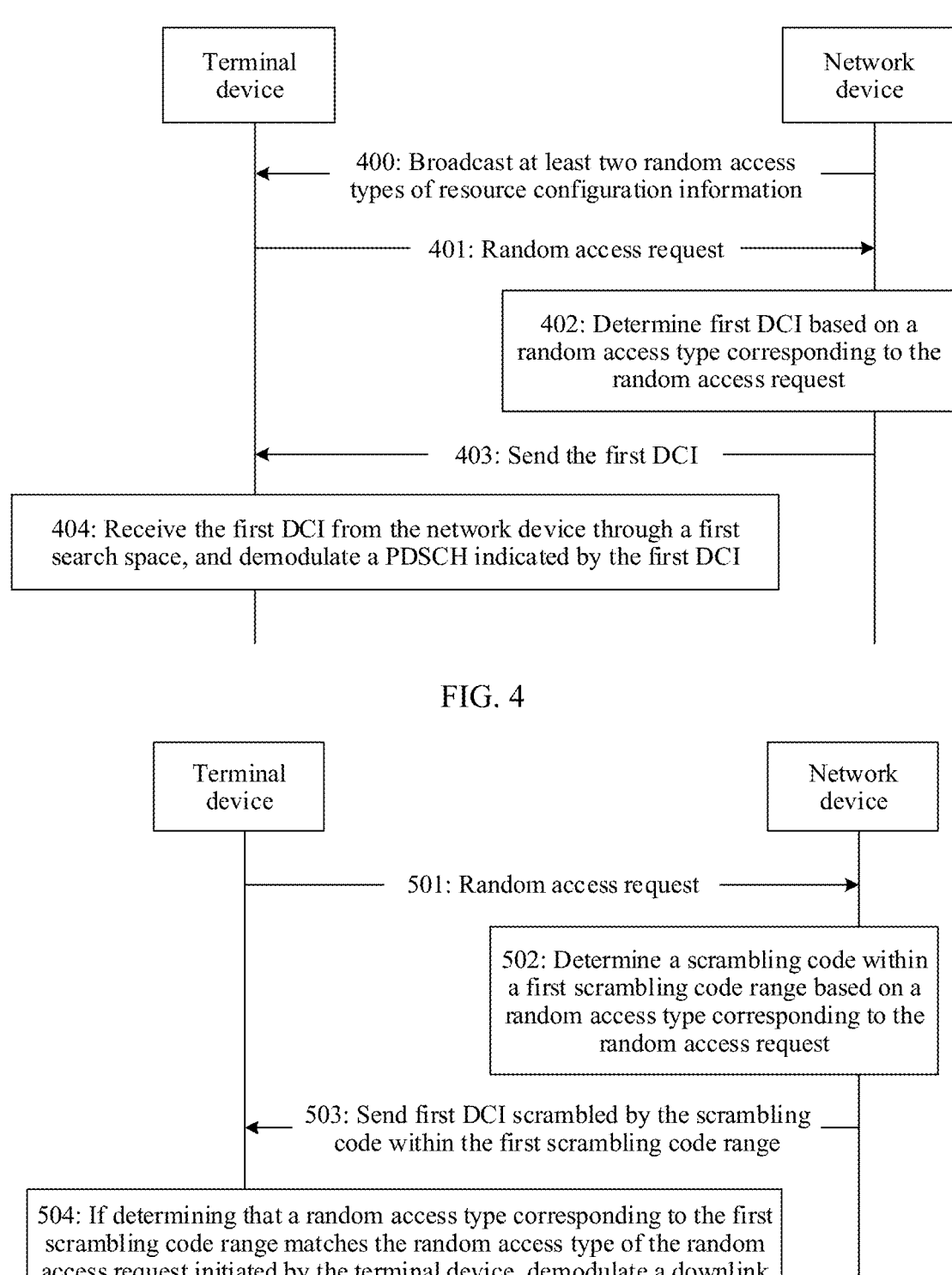
FIG. 4 is a schematic flowchart of another random access method according to embodiments of this application.
FIG. 5 is a schematic flowchart of still another random access method according to embodiments of this application.

FIG. 4 is a schematic flowchart of an example of another random access method according to this application. The method includes the following steps.

Step 400: A network device broadcasts at least two random access types of resource configuration information to a terminal.

Resource configuration information of a random access type includes a control channel resource set used to listen to a common PDCCH. For example, the at least two random access types are a two-step random access type and a four-step random access type. When a same random access resource is used for both the two-step random access type and the four-step random access type, the network device may configure different search spaces respectively for the two-step random access type and the four-step random access type. For example, the two-step random access type is corresponding to a search space A, and a four-step random access type is corresponding to a search space B. The search space A and the search space B completely do not overlap or partially overlap. Resource information of the two-step random access type includes a control channel resource set A for listening to a common PDCCH, and the control channel resource set A is corresponding to the search space A. Resource configuration information of the four-step random access type includes a control channel resource set B for listening to a common PDCCH, and the control channel resource set B is corresponding to the search space B. The terminal device monitors the search space A to receive a common PDCCH that is of the two-step random access type and that is sent by the network device, and the terminal device monitors the search space B to receive a common PDCCH that is of the four-step random access type and that is sent by the network device.

Step 401: The terminal device sends a random access request to the network device.

For step 401, refer to the descriptions of step 301. Details are not described herein again.

Correspondingly, the network device receives the random access request from the terminal device.

Step 402: The network device determines first DCI based on a random access type corresponding to the random access request.

Herein, the network device may alternatively determine the first DCI based on a type of response information for the random access request. The network device supports scheduling of a PDSCH carrying different response information by using formats of at least two types of different DCI, or supports scheduling of a PDSCH carrying different response information by using content of at least two types of different DCI. The at least two types of different DCI are corresponding to at least two types of different search spaces. The at least two types of different DCI include different DCI formats, different DCI content, or a same DCI format and different content.

Step 403: The network device sends the first DCI to the terminal device.

Correspondingly, the terminal device receives the first DCI from the network device through a first search space.

The terminal device supports receiving of DCI through at least two types of search spaces. The first search space may be a search space corresponding to the two-step random access type, or a space corresponding to the four-step random access type.

Step 404: The terminal device receives the first DCI from the network device through the first search space, and demodulates the PDSCH indicated by the first DCI.

The PDSCH carries response information for the random access request initiated by the terminal device. The "match" may be understood as that a random access type corresponding to the first search space is the four-step random access type, and response information received by the terminal is response information for four-step random access; a random access type corresponding to the first search space is the two-step random access type, and response information received by the terminal is response information for two-step random access.

It may be understood that a search space through which a terminal device initiating a four-step random access request listens to the DCI is different from a search space through which a terminal device initiating a two-step random access request listens to the DCI. For example, the two-step random access type is corresponding to the search space A, and the four-step random access type is corresponding to the search space B. In this case, the terminal device initiating the two-step random access request may receive the DCI from the network device through the search space A, and the terminal device initiating the four-step random access request may receive the DCI from the network device through the search space B. That is, the first search space used by the terminal device initiating the two-step random access request is the search space A, and the first search space used by the terminal device initiating the four-step random access request is the search space B. It may also be understood that the terminal device sending the two-step random access request cannot receive the first DCI from the network device through the search space B. and the terminal device initiating the four-step random access request cannot receive the first DCI from the network device through the search space A. In this case, the terminal device may determine, by using different search spaces, whether response information from the network device belongs to the terminal device.

With reference to FIG. 1, an example in which a random access type of a random access request initiated by the terminal device 102 is two-step random access, a random access type of a random access request initiated by the terminal device 103 is four-step random access, the two-step random access type is corresponding to a search space A, and the four-step random access type is corresponding to a search space B is still used for description. The terminal device 102 may receive first DCI from the network device through the search space A, and demodulates the PDSCH indicated by the first DCI. The terminal device 102 fails to receive the first DCI from the network device through the search space B. Similarly, the terminal device 103 may receive the first DCI from the network device through the search space B, and demodulates the PDSCH indicated by the first DCI. The terminal device 103 fails to receive the first DCI from the network device through the search space A.

It may be learned from step 401 to step 404 that when the terminal device receives the first DCI from the network device through the first search space, it indicates that the random access type corresponding to the first search space matches the random access type of the random access request initiated by the terminal. In this case, the terminal device demodulates the PDSCH indicated by the received first DCI. In this way, a quantity of times that the terminal device attempts to demodulate a PDSCH that is unrelated to the terminal device is reduced, so that power consumption of the terminal device is reduced, and random access efficiency of the terminal device is improved.

To further improve efficiency of random access of the terminal device initiating the two-step random access request, the reserved bits in the first DCI may be extended. The first DCI includes fifth indication information, and the fifth indication information is used to indicate a type of the response information carried on the PDSCH. For different definitions of the type of the response information, this application provides an embodiment 1, an embodiment 2, an embodiment 3, and an embodiment 5.

Embodiment 1

The type of the response information includes one of the following content: The response information is for a two-step random access request and does not include a contention resolution identity; or the response information is for a two-step random access request and includes at least a contention resolution identity. It may also be understood that, when the network device determines that the random access type of the random access request is a two-step random access type, the type that is of the response information and that is indicated by the fifth indication information is that the response information is for a two-step random access request and does not include a contention resolution identity, or the type of the response information is that the response information is for a two-step random access request and includes at least a contention resolution identity. For ease of description of this solution, this application is described by using an example in which the fifth indication information is 0 or 1. Table 2 shows a relationship between the fifth indication information and the type of the response information provided in this application.

TABLE 2

| Relationship between fifth indication information and a type of response information | |
| --- | --- |
| Fifth indication information | Type of response information |
| 0 | Response information is for a two-step random access request and does not include a contention resolution identity (RAR without CRID for 2-step RACH) |
| 1 | Response information is for a two-step random access request and includes at least a contention resolution identity (At least contain CRID for 2-step RACH) |

As shown in the table 2, the type that is of the response information and that is indicated by the fifth indication information being 0 is: The response information is for a two-step random access request, and does not include a contention resolution identity. The type that is of the response information and that is indicated by the fifth indication information being 1 is: The response information is for a two-step random access request, and includes at least a contention resolution identity.

It should be noted that there is no mandatory correspondence between a value that is corresponding to the fifth indication information and that is listed in the table 2 and the type that is of the response information and that is identified by the value. Any other form of the value of the fifth indication information can enable the terminal device to distinguish a type of response information. This is not limited in this application.

In a possible implementation, before the terminal device performs random access, the network device may configure a correspondence between the fifth indication information and the type of the response information for the terminal device. In another possible implementation, the relationship between the fifth indication information and the type of the response information may alternatively be pre-specified in a protocol.

For example, the fifth indication information may be located in a fifth preset bit in reserved bits of the first DCI, and the fifth preset bit may occupy 1 bit. Specifically, the fifth preset bit may be the first 1 bit, any intermediate 1 bit, or the last 1 bit in the reserved bits of 16 bits. This is not limited in this application.

For example, a form in which the fifth indication information is located in the reserved bits may be:
fifth indication information-1 bit; and
reserved bits-15 bits.

Values of the reserved bits may be 0, 1, or any possible value. This is not limited in this application. The terminal device may further determine whether the response information indicated by the fifth indication information included in the first DCI includes a contention resolution identity.

With reference to the table 2, for the terminal device initiating the two-step random access request, after the terminal device receives the first DCI from the network device through the search space corresponding to the two-step random access type, if determining that the fifth indication information in the received first DCI is 0), the terminal device demodulates the PDSCH indicated by the first DCI, and obtains an index of a second preamble. If the index of the second preamble matches a preamble carried in step 401, the terminal device obtains corresponding response information based on the index of the second preamble, and performs a subsequent operation such as retransmission based on the corresponding response information. If determining that the fifth indication information in the received first DCI is 1, the terminal device demodulates the PDSCH indicated by the first DCI, and obtains a contention resolution identity. If determining that the contention resolution identity obtained through demodulation matches a CCCH SDU carried in step 401, the terminal device considers that contention succeeds.

When determining that the type of the response information is that the response information is for a two-step random access request and includes at least a contention resolution identity, the network device may further extend the reserved bits in the first DCI. That is, the first DCI further includes second indication information. The second indication information may be used to indicate a first preamble. When the terminal device receives the first DCI from the network device through the first search space, and determines that the first preamble matches an index number of a preamble carried in the random access request initiated by the terminal device, the terminal device demodulates the PDSCH indicated by the first DCI. In this way, a quantity of times that the terminal device attempts to demodulate a PDSCH is further reduced.

For example, a plurality of terminal devices may receive the first DCI from the network device through the first search space, and only a terminal device initiating a random access request demodulates the PDSCH indicated by the first DCI, where an index number of a preamble carried in the random access request matches the first preamble indicated by the second indication information.

For detailed descriptions of the second indication information, refer to the descriptions of the second indication information in FIG. 3. Details are not described herein again.

The reserved bits in the first DCI in some embodiments may be further extended. Third indication information is added to the first DCI. The third indication information may be used to indicate a resource used by the terminal device to feedback an acknowledgement message. The terminal device feedbacks the acknowledgement message to the network device using a resource according to the third indication information.

It should be noted that, for detailed descriptions of the third indication information and of obtaining, by the terminal device, information indicating the resource used to feed back the acknowledgement message, refer to the detailed descriptions of the third indication information in FIG. 3. Details are not described herein again.

Embodiment 2

A difference between this embodiment and the embodiment 1 lies in different definitions of the type of the response information. Others may be the same as or similar to the solution in the embodiment 1, and details are not described herein again.

The type of the response information includes the following four types, and the fifth indication information may indicate one of the four types.

First type: The response information carried on the PDSCH is fallback random access response (fallback RAR) information. The fallback RAR information is response information sent by the network device when the network device successfully detects a preamble in a MsgA but fails to decode a PUSCH in the MsgA. In this type, the fallback RAR information carried on the PDSCH may be for one terminal device or for a plurality of terminal devices, or the PDSCH carries one or more pieces of fallback RAR information.

Second type: The response information carried on the PDSCH includes both fallback RAR information and success RAR information. The success RAR information is response information sent by the network device after the network device successfully receives a MsgA. Successful reception of the MsgA means that a preamble in the MsgA is successfully detected and a PUSCH in the MsgA is successfully decoded. In this type, the PDSCH may carry fallback RAR information for one or more terminal devices and success RAR information for one or more terminal devices. It should be noted that the second type does not mean that the PDSCH needs to include fallback RAR information and success RAR information, but means that the second type supports sharing of fallback RAR information and success RAR information on a same PDSCH. In some examples, when the network device needs to respond to a random access request of only one terminal device, the network device may still choose to send response information of this type.

Third type: The response information carried on the PDSCH is success RAR information for one terminal device.

Fourth type: The response information carried on the PDSCH is success RAR information for a plurality of terminal devices.

For ease of description of this solution, this application is described by using an example in which the fifth indication information occupies 2 bits. Table 2A shows a relationship between the fifth indication information and the type of the response information provided in this application. It may be understood that, in addition to indicating the type of the response message by using a value combination in the table 2A, the type of the response message may also be indicated by using another value combination. This is not limited in this application.

TABLE 2A

| Relationship between fifth indication information and a type of response information | |
| --- | --- |
| Fifth indication information | Type of response information |
| 00 | The PDSCH carries fallback RAR information |
| 01 | Option 1: The PDSCH carries fallback RAR information and success RAR information that are shared together; or Option 2: Reserved |
| 10 | The PDSCH carries success RAR information for one terminal device |
| 11 | The PDSCH carries success RAR information for a plurality of terminal devices |

Generally, the fallback RAR information does not include a contention resolution identity. The fallback RAR information may include at least one of the following information: a backoff indicator, a timing advance command (TA Command), a TC-RNTI, or a UL grant. In an implementation, fallback RAR information for each terminal device may be included in a payload of a MAC subPDU that is corresponding to the terminal device and that is included in the PDSCH. For a structure of the MAC subPDU, refer to related descriptions below.

The success RAR information may include a contention resolution identity. Further, the success RAR information may further include at least one of the following information: a TA command, a C-RNTI, a UL grant, an index number of a preamble in a random access request initiated by the terminal device, a PUCCH resource indicator, RRC state indication information, RRC reconfiguration information, RRC reestablishment information, or RRC resume information. In an implementation, success RAR information for each terminal device may be included in a payload of a MAC subPDU that is corresponding to the terminal device and that is included in the PDSCH. For a structure of the MAC subPDU, refer to related descriptions below:

In another implementation, in the response message of the third type, success RAR information may exclude a PUCCH resource indicator and a preamble index, and an extension field is used in the DCI or an existing field is shared to indicate the foregoing two types of information. For a manner of indicating the preamble index in the DCI, the terminal device may further determine, based on the indicated preamble index, whether response information carried on a PDSCH scheduled by using the DCI is for the terminal device. If the response information carried on the PDSCH scheduled by using the DCI is not for the terminal device, the terminal device may ignore or discard the PDSCH, so that a quantity of times that the terminal device decodes a PDSCH can be reduced. If the network device sends the response information of the third type and does not receive an acknowledgement message for the response information, the network device may resend the response information, and the terminal device may increase a probability of successful reception of the response information by using a HARQ combination receiving technology.

For the response information of the fourth type, if correctly decoding a PDSCH that carries the response information of the fourth type, the terminal may send an acknowledgement message to the network device; or if failing to correctly decode a PDSCH that carries the response information of the fourth type, the terminal does not send an acknowledgement message to the network device. During actual application, there is a case in which some terminal devices send acknowledgement messages, but some devices send no acknowledgement message. In this case, the network device may resend the response information of the fourth type, but the response information may not include success RAR information corresponding to the terminal device that sends the acknowledgement messages.

In a possible implementation, before the terminal device performs random access, the network device may configure a correspondence between the fifth indication information and the type of the response information for the terminal device. In another possible implementation, the relationship between the fifth indication information and the type of the response information may alternatively be pre-specified in a protocol.

For example, the fifth indication information may be located in a fifth preset bit in reserved bits of the first DCI, and the fifth preset bit may occupy 2 bit. Specifically, the fifth preset bit may be the first 2 bits, any intermediate 2 bits, or the last 2 bits in the reserved bits of 16 bits. This is not limited in this application.

In an implementation, an existing DCI format used for a random access procedure may be extended and used as a format of the first DCI. For example, a 16-bit reserved field in a DCI Format 1_0 that is used for a random access procedure and that is in 3GPP TS 38.212 is extended, and an extended DCI format has the following fields:

Frequency domain resource assignment;
Time domain resource assignment;
VRB-to-PRB mapping;
Modulation and coding scheme;
TB scaling;
fifth indication information-2 bits; and
reserved bits-14 bits.

For definitions and lengths of other fields than a field occupied by the fifth indication information, refer to 3GPP TS 38.212. Details are not described herein.

In the foregoing embodiment 1 and embodiment 2, the terminal device determines, based on different control channel resource sets or search spaces used for listening to the PDCCH, whether the PDSCH scheduled by using the first DCI carries response information for a four-step random access request or response information for a two-step random access request. For example, if the terminal device sends a random access request for four-step random access in step 401, in step 404, the terminal device listens to the PDCCH carrying the first DCI in a control channel resource set or search space corresponding to the four-step random access. If the terminal device sends a random access request for two-step random access in step 401, in step 404, the terminal device listens to the PDCCH carrying the first DCI in a control channel resource set or search space corresponding to the two-step random access. After detecting the first DCI in the control channel resource set or search space corresponding to the two-step random access, the terminal device may determine, based on the fifth indication information of the first DCI described in the embodiment 1 or the embodiment 2, whether to decode the PDSCH scheduled by using the first DCI.

In another embodiment, the terminal device may determine, based on different PDCCH candidates (PDCCH candidate) of a same search space, whether the PDSCH scheduled by using the first DCI carries response information for a four-step random access request (a Msg1) or response information for a two-step random access request (a MsgA). For example, a first part of PDCCH candidates of the same search space is corresponding to four-step random access, and a second part of PDCCH candidates of the same search space is corresponding to two-step random access. If the terminal device sends a random access request for four-step random access in step 401, in step 404, the terminal device listens to the PDCCH carrying the first DCI on the first part of PDCCH candidates that is corresponding to the four-step random access. If the terminal device sends a random access request for two-step random access in step 401, in step 404, the terminal device listens to the PDCCH carrying the first DCI on the second part of PDCCH candidates that is corresponding to the two-step random access. After detecting the first DCI on the second part of PDCCH candidates that is corresponding to the two-step random access, the terminal device may determine, based on the fifth indication information of the first DCI described in the embodiment 1 or the embodiment 2, whether to decode the PDSCH scheduled by using the first DCI.

In an implementation, the first part of PDCCH candidates and the second part of PDCCH candidates may be configured by the network device. For example, in step 401, the network device may configure a search space, and further configure PDCCH candidates in the search space as PDCCH candidates that are corresponding to the four-step random access and that are used for listening, and PDCCH candidates in the search space as PDCCHs that are corresponding to the two-step random access and that are used for listening.

In an example, the network device may configure the first N PDCCH candidates in a search space as PDCCH candidates corresponding to the four-step random access, and configure remaining (or the last M) PDCCH candidates in the search space as PDCCH candidates corresponding to the two-step random access. In another example, the network device may configure the last N PDCCH candidates in a search space as PDCCH candidates corresponding to the four-step random access, and configure remaining (or the first M) PDCCH candidates in the search space as PDCCH candidates corresponding to the two-step random access.

In a specific example, when configuring PDCCH candidates respectively corresponding to the two random access types, the network device may configure only one of the foregoing parameters N and M. For example, one search space includes N+M PDCCH candidates and only a configuration parameter N. If configuration information delivered by the network device when the network device configures a PDCCH candidate for the four-step random access is a quantity N of PDCCH candidates, it indicates that the first N or last N PDCCH candidates in the configured search space are PDCCH candidates corresponding to the four-step random access. Correspondingly, remaining PDCCH candidates in the search space are PDCCH candidates corresponding to the two-step random access. Because the parameter N can represent only the quantity, the N PDCCH candidates may be determined according to a rule pre-specified in a protocol. The rule may be, for example, N PDCCH candidates that are in the search space and whose numbers are in a head of all numbers, or N PDCCH candidates that are in the search space and whose numbers are in a head of all numbers.

In another example, when configuring PDCCH candidates respectively corresponding to the two random access types, the network device may configure quantities of PDCCH candidates that are respectively corresponding to the two random access types, for example, parameters N and M. For a configuration method, refer to the embodiment in which the parameter N or M is configured, and details are not described herein again.

For ease of understanding of this solution of configuring PDCCH candidates by the network device in this embodiment, this application provides a specific example of configuring different PDCCH candidates for different random access types, as shown in a table 2B. In this example, the network device may configure values in the "Quantity of PDCCH candidates corresponding to four-step random access" column and/or the "Quantity of candidates corresponding to two-step random access" column in the table 2B.

TABLE 2B

| CCE aggregation level | Total quantity of PDCCH candidates | Quantity of PDCCH candidates corresponding to four-step random access | Quantity of candidates corresponding to two-step random access |
|---|---|---|---|
| 4 | 4 | 2 | 2 |
| 8 | 2 | 1 | 1 |
| 16 | 1 | 1 | 0 |

This application further provides an example of configuring a PDCCH candidate in signaling. For example, the network device configures corresponding search spaces for different random access types by using SearchSpace information elements (information element) in RRC signaling. Details are as follows:

| SearchSpace information element |
|---|
| -- ASN1START |
| -- TAG-SEARCHSPACE-START |
| SearchSpace ::=            SEQUENCE { |
| . . . |
|   nrofCandidatesfor4step       SEQUENCE { |
|     aggregationLevel1         INTEGER(0 . . . maxNofPDCCHCandidateunderL1), |
|     aggregationLevel2         INTEGER(0 . . . maxNofPDCCHCandidateunderL2), |
|     aggregationLevel4         INTEGER(0 . . . maxNofPDCCHCandidateunderL4), |
|     aggregationLevel8         INTEGER(0 . . . maxNofPDCCHCandidateunderL8), |
|     aggregationLevel16        INTEGER(0 . . . maxNofPDCCHCandidateunderL16) |
|   } |
| . . . |
| } |
| -- TAG-SEARCHSPACE-STOP |
| -- ASN1STOP | where nrofCandidatesfor4step indicates a quantity of PDCCH candidates used for four-step random access in a corresponding search space; aggregationleveln is a CCE aggregation level n; INTEGER(0 . . . maxNofPDCCHCandidateunderLn) after each aggregationleveln indicates a quantity of PDCCH candidates used for four-step random access in PDCCH candidates of the aggregationLevel n, and a maximum value is axNofPDCCHCandidateunderLn; and maxNofPDCCHCandidateunderLn is a maximum quantity of PDCCH candidates corresponding to the aggregationLevel n in the nrofCandidates. For other parameters in the SearchSpace information element, refer to related descriptions in 3GPP 38.331. Details are not described herein.

A quantity of corresponding PDCCH candidates used for two-step random access is equal to a quantity of PDCCH candidates of aggregationLevel n minus INTEGER(0 . . . maxNofPDCCHCandidateunderLn).

In another embodiment, a manner similar to the foregoing manner may be used to configure only a quantity of PDCCH candidates corresponding two-step access in RRC signaling, or configure both a quantity of PDCCH candidates corresponding to two-step access and a quantity of PDCCH candidates corresponding to four-step access in RRC signaling.

In another implementation, the first part of PDCCH candidates and the second part of PDCCH candidates that are described above may be pre-specified in a protocol. For example, the network device configures only a search space in step 401. PDCCH candidates that are PDCCH candidates corresponding to four-step random access in the search space and that are used for listening, and PDCCH candidates that are PDCCH candidates corresponding to two-step random access in the search space and that are used for listening are pre-specified in a protocol. For example, the table 2B may be pre-specified in a protocol, or the values in the "Quantity of PDCCH candidates corresponding to four-step random access" column and the "Quantity of candidates corresponding to two-step random access" column in the table 2B are predefined.

Embodiment 3

In this embodiment, the terminal device determines, based on different control channel resource sets or search spaces used for listening to the PDCCH, whether the PDSCH scheduled by using the first DCI carries response information for a four-step random access request or response information for a two-step random access request. After detecting the first DCI through a control channel resource set or search space corresponding to two-step random access, the terminal device determines, based on a range of an RNTI value for descrambling the first DCI, whether the first DCI is used to schedule a PDSCH carrying fallback RAR information or used to schedule a PDSCH carrying success RAR information. Further, after determining that the first DCI is used to schedule a PDSCH carrying success RAR information, the terminal device determines, based on the fifth indication information in the first DCI, whether the PDSCH carries success RAR information for one terminal device or success RAR information for a plurality of terminal devices.

In some implementations, the type that is of the response message and that is indicated by the fifth indication information is one of the following two types.

First type: The PDSCH carries success RAR information for one terminal device.

Second type: The PDSCH carries success RAR information for a plurality of terminal devices.

For the success RAR information and the fallback information, refer to the related descriptions in the embodiment 2, and details are not described herein again.

In some examples, because the fifth indication information needs to be indicated in only two types, the fifth indication information may be implemented by using only 1 bit.

Optionally, when the fifth indication information indicates the first type, the first DCI may further include a field indicating a preamble index. The terminal device may determine, based on the preamble index, whether the response information carried on the PDSCH scheduled by using the first DCI is for the terminal device. For example, if a preamble index indicated by a field in the first DCI is an index of a preamble sent by the terminal device, the terminal device considers that the response information carried on the PDSCH scheduled by using the first DCI is a response to the random access request sent by the terminal device, and further receives and decodes the PDSCH scheduled by using the first DCI. If a preamble index indicated by a field in the first DCI is not an index of a preamble sent by the terminal device, the terminal device gives up receiving the PDSCH scheduled by using the first DCI, or ignores (or discards) a received PDSCH. In an implementation, some of the reserved bits of the first DCI may be used to indicate the preamble index. In another embodiment, optionally, the reserved bits of the first DCI may also be used to implement a function of a PUCCH resource indicator.

In an embodiment, some of reserved fields may be further used in the first DCI to indicate a quantity of terminal devices for which success RAR information is carried on the PDSCH.

The network device may configure RNTIs having two different value ranges. An RNTI within one value range is used to scramble DCI for scheduling the PDSCH carrying the fallback RAR information, and an RNTI within the other value range is used to scramble DCI for scheduling the PDSCH carrying the success RAR information. For how to configure RNTIs having different value ranges, refer to related descriptions in the following embodiment in FIG. 5.

Embodiment 4

In this embodiment, the terminal device determines, based on any one of the following (1) to (3), whether the PDSCH scheduled by using the first DCI carries response information for a four-step random access request or response information for a two-step random access request:

different control channel resource sets or search spaces used for listening to the PDCCH;

different value ranges of RNTIs used for scrambling the first DCI; or different PDCCH candidate sets of a search space.

For a specific determining process, refer to corresponding descriptions in other parts of this application, and details are not described herein again.

In some examples, after receiving the first DCI corresponding to two-step random access, the terminal device further determines, based on the fifth indication information in the first DCI, the type of the response information carried on the PDSCH scheduled by using the first DCI.

In some examples, the fifth indication information indicates one of the following two types.

First type: The PDSCH carries success RAR information for one terminal device.

Second type: The PDSCH supports carrying fallback RAR information and success RAR information that are shared together. It should be noted that the second type does not mean that the PDSCH needs to include the fallback RAR information and the success RAR information, but means that the second type supports sharing of the fallback RAR information and the success RAR information on a same PDSCH. In some examples, when the network device needs to respond to a random access request of only one terminal device, the network device may still choose to send response information of this type.

In an optional embodiment, the success RAR information in the response information of the first type includes RRC information, for example, RRC state indication information, RRC reconfiguration information, RRC reestablishment information, or RRC resume information.

In some examples, because the fifth indication information needs to be indicated in only two types, the fifth indication information may be implemented by using only 1 bit.

Optionally, when the fifth indication information indicates the first type, the first DCI may further include a field indicating a preamble index. The terminal device may determine, based on the preamble index, whether the response information carried on the PDSCH scheduled by using the first DCI is for the terminal device. For example, if a preamble index indicated by a field in the first DCI is an index of a preamble sent by the terminal device, the terminal device considers that the response information carried on the PDSCH scheduled by using the first DCI is a response to the random access request sent by the terminal device, and further receives and decodes the PDSCH scheduled by using the first DCI. If a preamble index indicated by a field in the first DCI is not an index of a preamble sent by the terminal device, the terminal device gives up receiving the PDSCH scheduled by using the first DCI, or ignores (or discards) a received PDSCH. In an implementation, some of the reserved bits of the first DCI may be used to indicate the preamble index. In another embodiment, optionally, the reserved bits of the first DCI may also be used to implement a function of a PUCCH resource indicator.

In an embodiment, optionally, because a format of a MAC subPDU including the fallback RAR information is different from a format of a MAC subPDU including the fallback RAR information, the fifth indication information in the first DCI may be used to assist the terminal device in parsing a MAC subPDU carried on the PDSCH scheduled by using the first DCI. For example, the fifth indication information is used by the terminal device to determine whether the PDSCH carries the MAC subPDU including the fallback RAR information or the MAC subPDU including the success RAR information.

For example, FIG. 5 is a schematic flowchart of still another random access method according to this application. As shown in FIG. 5, the random access method includes the following steps.

Step 501: A terminal device sends a random access request to a network device.

For step 501, refer to the descriptions of step 301. Details are not described herein again.

Correspondingly, the network device receives the random access request from the terminal device.

Step 502: The network device determines a first scrambling code range based on a random access type corresponding to the random access request.

The network device supports scrambling of the DCI by using scrambling codes within at least two scrambling code ranges. Each of the at least two scrambling code ranges is corresponding to one random access type, and at least two of the at least two scrambling code ranges are corresponding to different random access types.

In a possible implementation, the network device may configure different RA-RNTI ranges for different random access types. To be specific, an RA-RNTI range configured by the network device for a two-step random access type is different from an RA-RNTI range configured for a four-step random access type, and the RA-RNTI range corresponding to the two-step random access type does not overlap the RA-RNTI range corresponding to the four-step random access type. For example, the network device configures a scrambling code range A for the two-step random access type, and configures a scrambling code range B for the four-step random access type. When the network device determines that a random access type corresponding to a received random access request is the two-step random access type, the network device scrambles the first DCI by using a scrambling code within the scrambling code range A. When the network device determines that a random access type corresponding to a received random access request is the four-step random access type, the network device scrambles the first DCI by using a scrambling code within the scrambling code range B.

In a possible implementation, the RA-RNTI corresponding to the two-step random access type may be calculated by adding an offset value to a calculation formula of the RA-RNTI corresponding to the four-step random access type, or subtracting an offset value from a calculation formula of the RA-RNTI corresponding to the four-step random access type, so that the RA-RNTI range corresponding to the two-step random access type is different from the RA-RNTI range corresponding to the four-step random access type.

Step 503: The network device scrambles the first DCI by using a scrambling code within the first scrambling code range, and sends the first DCI to the terminal device.

The first DCI is used to indicate the PDSCH, and the PDSCH carries response information for the random access request initiated by the terminal device.

Correspondingly, the terminal device receives the first DCI from the network device. The terminal device supports scrambling of the DCI by using scrambling codes within at least two scrambling code ranges. Each of the at least two scrambling code ranges is corresponding to one random access type, and at least two of the at least two scrambling code ranges are corresponding to different random access types.

Step 504: The terminal device successfully descrambles the received first DCI by using the scrambling code within the first scrambling code range, determines that a random access type 30) corresponding to the first scrambling code range matches the random access type of the random access request initiated by the terminal device, and demodulates the PDSCH indicated by the first DCI.

The PDSCH carries the response information for the random access request initiated by the terminal device. The "match" herein may be understood as that a random access type corresponding to the first scrambling code range is the four-step random access type, and the response information carried on the PDSCH is response information for four-step random access; a random access type corresponding to the first scrambling code range is the two-step random access type, and the response information carried on the PDSCH is response information for two-step random access.

It may be understood that a scrambling code range used for scrambling the DCI received by a terminal device initiating a four-step random access request is different from a scrambling code range used for scrambling the DCI received by a terminal device initiating a two-step random access request. For example, the two-step random access type is corresponding to the scrambling code range A, and the four-step random access type is corresponding to the scrambling code range B. In this case, the terminal device initiating the two-step random access request may successfully descramble, by using a scrambling code within the scrambling code range A, the DCI received from the network device, and the terminal device initiating the four-step random access request may successfully descramble, by using a scrambling code within the scrambling code range B, the DCI received from the network device. That is, the first scrambling code range used by the terminal device initiating the two-step random access request to successfully descramble the first DCI is the scrambling code range A, and the first scrambling code range used by the terminal device initiating the four-step random access request to successfully descramble the first DCI is the scrambling code range B. It may also be understood that the terminal device initiating the two-step random access request fails to demodulate the first DCI from the network device by using a scrambling code within the scrambling code range B, and the terminal device initiating the four-step random access request fails to demodulate the first DCI from the network device by using a scrambling code within the scrambling code range A. In this case, the terminal device may determine, by using different scrambling code ranges, whether response information from the network device belongs to the terminal device.

With reference to FIG. 1, an example in which a random access type of a random access request initiated by the terminal device 102 is two-step random access, a random access type of a random access request initiated by the terminal device 103 is four-step random access, the two-step random access type is corresponding to a scrambling code range A, and the four-step random access type is corresponding to a scrambling code range B is used for description. The terminal device 102 may descramble the first DCI from the network device by using a scrambling code within the scrambling code range A, and demodulate the PDSCH indicated by the first DCI. In this case, the terminal device 102 cannot descramble the first DCI from the network device by using a scrambling code within the scrambling code range B. Similarly, the terminal device 103 may descramble the first DCI from the network device by using a scrambling code within the scrambling code range B, and demodulate the PDSCH indicated by the first DCI. In this case, the terminal device 103 cannot descramble the first DCI from the network device by using a scrambling code within the scrambling code range A.

It may be learned from step 501 to step 504 that when the terminal device determines that the random access type corresponding to the first scrambling code range matches the random access type of the random access request initiated by the terminal device, it indicates that the PDSCH indicated by the first DCI may belong to the terminal device. In this case, the terminal device demodulates the PDSCH indicated by the received first DCI. In this way, a quantity of times that the terminal device attempts to demodulate a PDSCH that is unrelated to the terminal device is reduced, so that power consumption of the terminal device is reduced, and random access efficiency of the terminal device is improved.

To further improve efficiency of random access of the terminal device initiating the two-step random access request, reserved bits in the first DCI may be extended. The first DCI includes fifth indication information. For detailed descriptions of the fifth indication information, refer to the descriptions of the fifth indication information in the embodiment 1 and the embodiment 2 that are related to FIG. 4. Details are not described herein again.

The reserved bits in the first DCI in some examples may be further extended. Third indication information is added to the first DCI. The third indication information may be used to indicate a resource used by the terminal device to feedback an acknowledgement message. The terminal device feedbacks the acknowledgement message to the network device according to the third indication information.

It should be noted that, for detailed descriptions of an embodiment of the third indication information and of obtaining, by the terminal device, information indicating the resource used to feed back the acknowledgement message, refer to the detailed descriptions of the third indication information in FIG. 3. Details are not described herein again.

Figure 6:
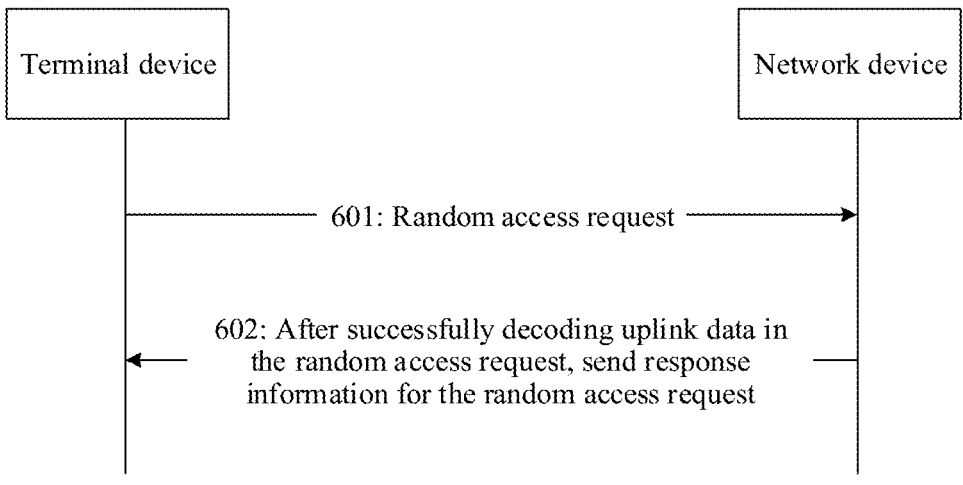
FIG. 6 is a schematic flowchart of yet another random access method according to embodiments of this application.

FIG. 6 is a schematic flowchart of yet another random access method according to this application. The method includes the following steps.

Step 601: A terminal device sends a random access request to a network device.

The random access request in step 601 includes a preamble and uplink data.

Correspondingly, the network device receives the random access request from the terminal device.

Step 602: After successfully decoding the uplink data in the random access request, the network device sends response information for the random access request to the terminal device.

The response information includes a contention resolution identity, or the response message includes a contention resolution identity and first information. The first information includes at least one of the following content: information indicating a resource used to feed back an acknowledgement message, a TPC command, a timing advance command, an uplink data transmission grant, an index number of the preamble carried in the random access request of the terminal device, one of a C-RNTI or a TC-RNTI, RRC reconfiguration information, RRC reestablishment information, or RRC resume information. The transmit power control command TPC command indicates a power control adjustment factor used to transmit the acknowledgement message. The first information may further include other RRC information, and examples are not listed one by one herein.

It may be learned from step 601 and step 602 that, because the network device sends the contention resolution identity and the first information to the terminal device together, signaling overheads of interaction between the network device and the terminal device are reduced.

In a possible implementation, the first information may further include a backoff indicator (BI). After the terminal device stores information about the backoff indicator, if a current random access procedure of the terminal fails, the terminal device may re-initiate new random access based on a value of the backoff indicator. For example, when the value of the backoff indicator stored by the terminal device is B, if the current random access procedure of the terminal device fails, the terminal device randomly selects a time backoff value b. After the time backoff value b, the terminal re-initiates new random access, where the time backoff value b follows a uniform distribution of $\{0, B\}$.

Optionally, when the terminal device receives the response information for the random access request and successfully demodulates the response information, the method in the foregoing embodiments may further include:

If the response information includes a contention resolution identity corresponding to the terminal device, the terminal device sends an acknowledgement (ACK) message to the network device. In an embodiment, the terminal device determines, based on information indicating a resource used to feed back the acknowledgement message, a time-frequency resource of a physical uplink control channel (PUCCH) that carries the acknowledgement message; and determines a transmit power control adjustment factor based on the TPC command, where the transmit power control adjustment factor is used to determine transmit power of the PUCCH.

In an implementation, similar to other first information, the TPC command may also be located on the PDSCH that carries the response information. In another implementation, the TPC command is located on a PDCCH that schedules the PDSCH carrying the response information.

In another embodiment, the TPC command that is described above and that is used to indicate the power control adjustment factor used to transmit the feedback acknowledgement message may also be used to determine the transmit power of the PUSCH. Optionally, when the terminal device sends a random access request message (for example, a MsgA), and the network device correctly detects a preamble in the MsgA but incorrectly decodes a PUSCH in the MsgA, the network device may send a MsgB (for example, carried on a PDSCH) to the terminal. The MsgB includes response information for the preamble. The response information includes at least one of the following content: an index number of the preamble carried in the random access request, a timing advance command, an uplink data transmission grant, or a temporary cell radio network temporary identifier TC-RNTI, where the uplink transmission grant carries a TPC command. In an embodiment, the TPC command carried in the uplink transmission grant may be used to determine transmit power of the PUSCH in the retransmitted MsgA. In another embodiment, the TPC command carried in the uplink transmission grant may also be used by the terminal device to determine transmit power of a PUCCH that carries an acknowledgement (ACK) message. For example, the terminal device sends uplink transmission (for example, the PUSCH) based on the uplink transmission grant. After correctly decoding the PUSCH, the network device sends response information to the terminal device. After correctly receiving the response information, if the terminal device needs to send an ACK message for the response information to the network device, the terminal device may determine, based on the TPC command in the uplink transmission grant, transmit power of a PUCCH that carries the acknowledgement (ACK) message.

Content of the TPC command may be an index number, and a value of the index number is an index number of a value in a predefined value set of the power control adjustment factor.

In an embodiment, a quantity of bits occupied by the TPC command is 2 bits. Table 2C shows a correspondence between a value of the TPC command and a value of the power control adjustment factor $\delta_{PUCCH,b,f,c}$. In this table, the power control adjustment factor $\delta_{PUCCH,b,f,c}$ is in dB.

TABLE 2C

| Correspondence between a TPC command and a value of a power control adjustment factor | |
| --- | --- |
| TPC command | $\delta_{PUCCH,b,f,c}$ (in dB) |
| 0 | −1 |
| 1 | 0 |
| 2 | 1 |
| 3 | 3 |

In another embodiment, a quantity of bits occupied by the TPC command is 3 bits. Table 2D shows a correspondence between a value of the TPC command and a value of the power control adjustment factor $\delta_{PUCCH,b,f,c}$.

TABLE 2D

| Correspondence between a TPC command and a value of a power control adjustment factor | |
| --- | --- |
| TPC command | $\delta_{PUCCH,b,f,c}$ (in dB) |
| 0 | −6 |
| 1 | −4 |
| 2 | −2 |
| 3 | 0 |
| 4 | 2 |
| 5 | 4 |
| 6 | 6 |
| 7 | 8 |

It may be understood that the values of the TPC command shown in the foregoing two tables are merely used to facilitate understanding of solutions in this application. It should not be understood that the value of the TPC command is limited to the values shown in the foregoing tables. The TPC command may be another value. This is not limited in this application.

When determining the transmit power of the PUCCH carrying the ACK message, the terminal device may determine the transmit power of the PUCCH according to the following formula $$P_{PUCCH,b,f,c}(i, q_u, q_d, l) =$$

$$\min\left\{\begin{array}{l} P_{CMAX,f,c}(i), \\ P_{O\_PUCCH,b,f,c}(q_u) + 10\log_{10}\left(2^{\mu} \cdot M_{RB,b,f,c}^{PUCCH}(i)\right) + \\ PL_{b,f,c}(q_d) + \Delta_{F\_PUCCH}(F) + \Delta_{TF,b,f,c}(i) + g_{b,f,c}(i, l) \end{array}\right\},$$

where $P_{PUCCH,b,f,c}$ (i, $q_n$, $q_d$, l) is transmit power of a PUCCH transmit opportunity (time-frequency resource) i of an uplink active BWP b of a carrier f located in a serving cell c;

$P_{CMAX,\ f,c}$(i) is a maximum transmit power;

$P_{O\_PUCCH,b,f,c}$ ($q_u$) is a sum of $P_{O\_NOMINALPUCCH}$ and $P_{O\_UE\_PUCCH}$($q_u$), where $0 \leq q_u < Q_u$, $Q_u$ is a size of a value set of $P_{O\_UE\_PUCCH}$, $q_u$ is an index number of a value in the value set of $P_{O\_UE\_PUCCH}$, and both a value set of $P_{O\_NOMINALPUCCH}$ and the value set of $P_{O\_UE\_PUCCH}$ may be configured by the network device;

$$M_{RB,b,f,c}^{PUCCH}(i)$$

is a quantity of KBs corresponding to the PUCCH transmit opportunity i;

$\mu$ is a subcarrier spacing configuration of the BWP of the PUCCH transmit opportunity i;

$PL_{b,f,c}$ ($q_d$) is a downlink path loss calculated by the terminal device based on a reference signal RS, where $q_d$ is an index number of the reference signal (reference signal, RS);

$\Delta_{F\_PUCCH}$(F) is a power difference between different PUCCH formats;

$\Delta_{TF,b,f,c}$(i) is a power adjustment factor of the PUCCH, where a value of $\Delta_{TF,b,f,c}$(i) is determined based on a PUCCH format, a quantity of OFDM symbols occupied by the PUCCH, content of UCI carried on the PUCCH, and an MCS used for sending the PUCCH; and $g_{b,f,c}$(i,l) is a power adjustment state factor (or a closed-loop power control adjustment factor) of the PUCCH, where a specific expression of $g_{b,f,c}$(i,l) is:

$$g_{b,f,c}(i, l) = g_{b,f,c}(i - i_0, l) + \sum \delta_{PUCCH,b,f,c}(m, l),$$

l indicates an index of a power control adjustment state of the PUCCH, where $l \in \{0, 1\}$ if parameters, two-PUCCH-PC-AdjustmentStates and PUCCH-Spatial-RelationInfo, are configured by the network device through higher layer signaling, or l=0 if a parameter, twoPUCCH-PC-AdjustmentStates or twoPUCCH-PC-AdjustmentStates is not configured;

$\delta_{PUCCH,b,f,c}(i,l)$ is obtained based on a TPC command that indicates a power control adjustment factor used to transmit acknowledgement information; and $$\sum \delta_{PUCCH,b,f,c}(m, l)$$

is a sum of values of power control adjustment factors $\delta_{PUCCH,b,f,c}(m,l)$ that are corresponding to the TPC command and that are in a set $C_i$, where $C_i$ is a set of PUCCH power control adjustment factors received by the terminal device between $K_{PUCCH}(i-i_0)-1$ OFDM symbols before the $(i-i_0)^{th}$ PUCCH transmit opportunity and $K_{PUCCH}(i)$ OFDM symbols before the $(i)^{th}$ PUCCH transmit opportunity, and $i_0$ is an integer greater than 0.

For definitions of the parameters in the foregoing formula, refer to related descriptions in the 3GPP TS 38.213 standard.

In some examples, the terminal device may obtain the values of $\delta_{PUCCH,b,f,c}(m,l)$ by using a TPC command in any one or more of the following manners:

1: a TPC command carried in DCI whose format is a format 1_0 or a format 1_1;

2: a TPC command carried in a DCI format 2_2 in which a CRC is scrambled by a TPC-PUCCH-RNTI;

3: a TPC command carried in response information (for example, response information carried on a PDSCH) for a random access request message (for example, a MsgA); or 4: a TPC command carried in DCI for scheduling a PDSCH carrying response information for a random access request message (a MsgA).

In an embodiment, if the network device configures $P_{O\_PUCCH,b,f,c}(q_u)$ through higher layer signaling, $g_{b,f,c}(k,l)=0,k=0, 1 \ldots , i$; if the network device does not configure $P_{O\_PUCCH,b,f,c}(q_u)$ through higher layer signaling, $g_{b,f,c}(0,l)=\Delta P_{rampup,b,f,c}+\delta_{b,f,c}$, where $$\Delta P_{rampup,b,f,c} = \min\left[\begin{array}{l} \max\left(\begin{array}{l} 0, \\ P_{CMAX,f,c} - (P_{O\_PUCCH,b,f,c} + PL_{b,f,c}(q_d) + \\ \Delta_{F\_PUCCH}(F) + \Delta_{TF,b,f,c} + \delta_{b,f,c}) \end{array}\right) \\ \Delta P_{rampuprequested,b,f,c} \end{array}\right].$$

If a PUCCH format in $\Delta_{F\_PUCCH}(F)$ is a PUCCH format 0 or a PUCCH format 1, $$\Delta P_{rampup,b,f,c} = \min\left[\begin{array}{l} \max\left(\begin{array}{l} 0, \\ P_{CMAX,f,c} - (P_{O\_PUCCH,b,f,c} + PL_{b,f,c}(q_d)) \end{array}\right); \\ \Delta P_{rampuprequested,b,f,c} \end{array}\right].$$

Where $\Delta P_{rampuprequested,b,f,c}$ may be configured by the network device for the terminal device through signaling (for example, higher layer signaling), and indicates a total amount of power increased from the first preamble to the last preamble.

A value of $\delta_{b,f,c}$ may be determined based on any one or more TPC commands (where for example, $\delta_{b,f,c}$ is obtained by accumulating power control adjustment factors indicated by one or more received TPC commands, or a power control adjustment factor indicated by one of the TPC commands is used as $\delta_{b,f,c}$) in the following cases:

1: A TPC command is carried in a scheduling grant in random access response information (for example, random access response information in a four-step random access procedure).

2: A TPC command is in DCI scrambled by a C-RNTI or an MCS-C-RNTI and is used to indicate a power control adjustment factor used to transmit acknowledgment information, where a PUCCH carrying an acknowledgement (ACK) message is a first PUCCH, a search space in which a first PDCCH carrying the DCI is located is indicated by recoverySearchSpaceId, and a preset quantity (for example, 28) of OFDM symbols are spaced between the first PUCCH and the last symbol of the first PDCCH.

3: A TPC command that is in random response information for a random access request message (for example, a MsgA). This application provides the following several implementations for obtaining the TPC command:

3.1 When the network device successfully detects a preamble in the MsgA but incorrectly decodes a PUSCH, the random response information includes one or more of an index number of the preamble carried in the MsgA, a timing advance command (TA Command), an uplink scheduling grant (UL grant), and a temporary cell radio network temporary identifier TC-RNTI. The uplink scheduling grant (UL grant) carries a power control adjustment factor TPC command.

3.2 When the network device successfully detects a preamble in the MsgA and successfully decodes a PUSCH, the random response message includes a contention resolution identity and first information. The first information includes a TPC command, and the first information may further include at least one of the following content: information indicating a resource used to feed back an acknowledgement message, a timing advance command, an uplink data transmission grant, an index number of the preamble carried in the random access request of the terminal device, a cell radio network temporary identifier C-RNTI, radio resource control reconfiguration information, radio resource control connection establishment information, or radio resource control resume information.

3.3 When the network device successfully detects a preamble in the MsgA and successfully decodes a PUSCH, a PDCCH for scheduling a PDSCH carrying the random access response information carries a TPC command. However, the PDSCH does not carry any TPC command, and the PDCCH is scrambled by a MsgB-RNTI. The MsgB-RNTI is a scrambling sequence defined for the response information MsgB, and a name of the scrambling sequence is not limited herein.

3.4 When the network device successfully detects a preamble in the MsgA and successfully decodes a PUSCH, a PDCCH for scheduling a PDSCH carrying the random access response information carries a TPC command, and the PDCCH is scrambled by a C-RNTI or an MCS-C-RNTI. A PUCCH carrying an acknowledgement (ACK) message is a first PUCCH, and a location relationship between a first PDCCH carrying the DCI and the first PUCCH may be the relationship described in 2, or may not be limited herein.

4: The terminal device does not obtain any available TPC command. In this case, $\delta_{b,f,c}=0$.

With reference to FIG. 3 to FIG. 6, the following describes a data format of response information carried on a PDSCH in each of FIG. 7a to FIG. 13b.

In this application, the response information carried on the PDSCH may be carried in a media access control protocol data unit (MAC protocol data unit, MAC PDU). The following describes the MAC PDU.

The MAC PDU may be classified into the following three cases.

Case 1: MAC PDUs of a downlink logical channel and an uplink logical channel other than a transparent media access control and a random access response.

Case 2: A MAC PDU of a transparent media access control (transparent MAC).

Case 3: A MAC PDU of a random access response (RAR).

Figure 7A:
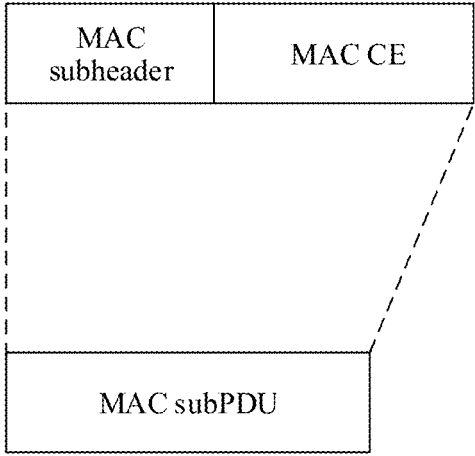
FIG. 7a is a schematic diagram of a MAC subPDU according to embodiments of this application.
Figures 7B, 8A, 8B, 8C:
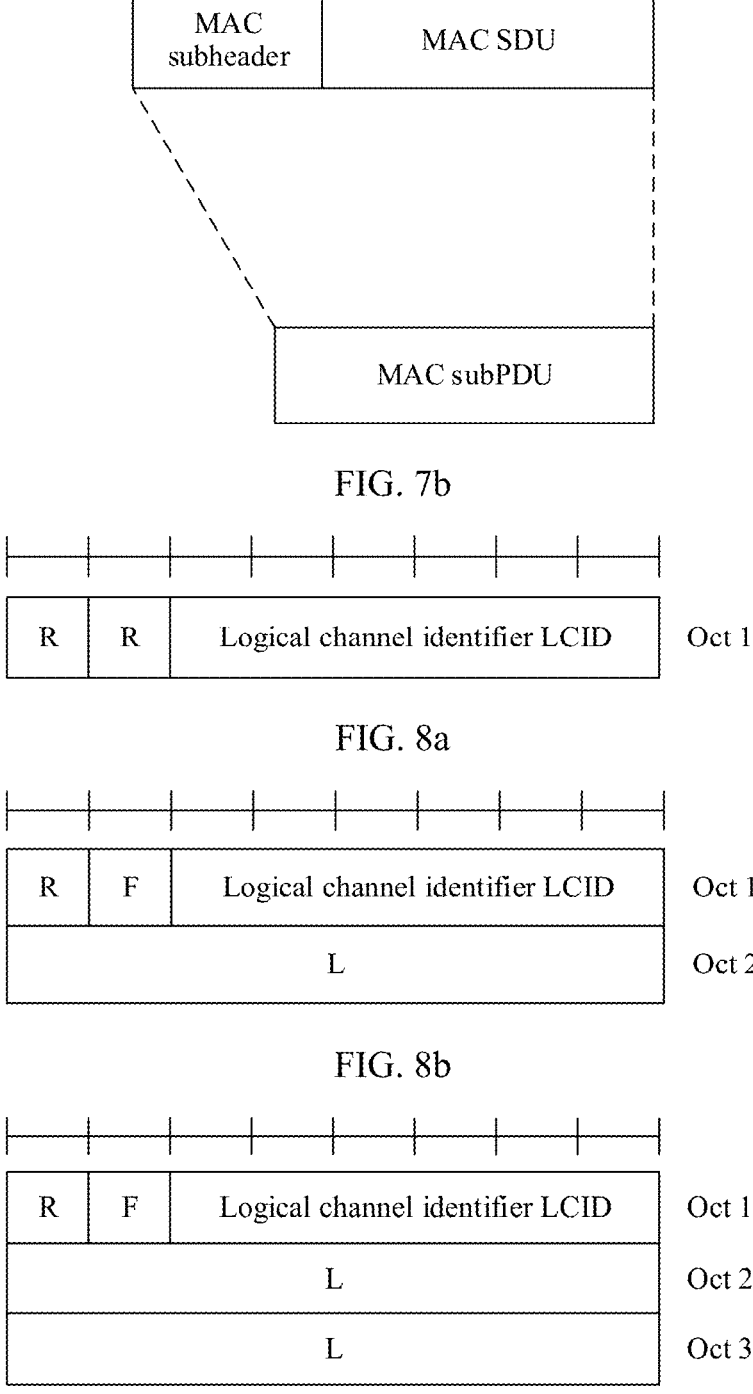
FIG. 7b is a schematic diagram of another MAC subPDU according to embodiments of this application.
FIG. 8a is a schematic diagram of a MAC subheader according to embodiments of this application.
FIG. 8b is a schematic diagram of another MAC subheader according to embodiments of this application.
FIG. 8c is a schematic diagram of still another MAC subheader according to embodiments of this application.

Specifically; the response information may be carried in a sub-protocol data unit (MAC subPDU) of the MAC PDU. One MAC PDU may include one or more sub-protocol data units (MAC subPDU), and MAC subPDUs belonging to different MAC PDUs cannot be shared. For example, if a RAR for four-step random access and a contention resolution identity are carried in different MAC PDUs, MAC subPDUs in the two MAC PDUs cannot be shared. The MAC subPDU has a plurality of formats. The following provides the MAC subPDUs of two formats. FIG. 7a is a schematic diagram of a MAC subPDU according to this application. The MAC subPDU includes a MAC subheader and a MAC control element (MAC CE). FIG. 7b is a schematic diagram of another MAC subPDU according to this application. The MAC subPDU also includes a MAC subheader and a MAC SDU. The MAC CE in FIG. 7a and the MAC SDU in FIG. 7b may be collectively referred to as a data part of the MAC subPDU.

Based on the formats of the MAC subPDUs shown in FIG. 7a and FIG. 7b, the MAC subheader may include the following two formats.

Format 1: A length indication field (L) of the data part is not included.

The MAC subheader is mainly used for a MAC subPDU whose data part has a fixed length, and the data part may be a MAC CE or a MAC SDU. FIG. 8a is a schematic diagram of a MAC subheader according to this application. The MAC subheader may be referred to as an R/LCID MAC subheader, R represents a reserved bit, a value of R may be 0, and a length of the reserved bit is not limited. The reserved bit exists to ensure that a fixed length value of the MAC subheader is an integer multiple of 1 byte. The LCID is a logical channel identifier. A length of the MAC subheader is 8 bits, and a unit of a fixed length of a data part is byte (where 1 byte is equal to 8 bits). A specific length value may be a length shown in the corresponding figure, or may be another determined length. This is not limited in this application.

Format 2: A length indication field (L) of the data part is included.

The MAC subheader is mainly used for a MAC subPDU whose data part has a variable length, and the data part may be a MAC CE or a MAC SDU. FIG. 8b is a schematic diagram of a format of another MAC subheader according to this application. The MAC subheader may be referred to as an R/F/LCID/L MAC subheader with 8-bit L field. R represents a reserved bit, and a value of R may be 0. F is used to indicate a length of the L field. When a value of F is 0, it indicates that the length of the L field is 8 bits. When a value of F is 1, it indicates that the length of the L field is 16 bits. LCID is a logical channel identifier. L is a length indication field. In this schematic diagram, a length indicated by L is 8 bits, that is, a maximum length of a data part may be $2^8=256$ bits. FIG. 8c is a schematic diagram of a format of still another MAC subheader according to this application. The MAC subheader may be referred to as an R/F/LCID/L MAC subheader with 16-bit L field. A difference from FIG. 8b is that a length indicated by L in the MAC subheader is 16 bits, that is, a maximum length of a data part may be $2^{16}=65536$ bits.

In a possible implementation, the response information carried on the PDSCH includes but is not limited to: (A) response information for a preamble in a Msg1 of a four-step random access type: (B) response information that is for a preamble in a MsgA of a two-step random access type and that does not include a contention resolution identity; (C) response information that is for a MsgA of a two-step random access type and that includes at least a contention resolution identity; (D) response information that is for a MsgA of a two-step random access type and that does not include a contention resolution identity. That the response information is (C) may include the following two cases. Case A: The response information includes only a contention resolution identity. Case B: The response information includes at least one of a contention resolution identity and first information. The first information includes at least one of the following content: information indicating a resource used to feed back an acknowledgement message, a timing advance command, an uplink data transmission grant, an index number of a preamble carried in a random access request initiated by the terminal device, one of a C-RNTI or a TC-RNTI, radio resource control reconfiguration information, radio resource control connection establishment information, or radio resource control resume information. In an embodiment, the first information may alternatively exclude information indicating a resource used to feed back an acknowledgement message and an index number of a preamble carried in a random access request initiated by the terminal device. The two pieces of information may be indicated by using some reserved bits in DCI. For example, refer to the foregoing related descriptions. In an embodiment, the fallback RAR information in the foregoing embodiment may be the response information (B) in this embodiment, and the success RAR information in the foregoing embodiment may be the response information (C) in the case B in this embodiment.

When the response information carried on the PDSCH is (D), the response information may include the foregoing first information, but does not include a contention resolution identity. In a possible embodiment, a PDCCH that schedules the PDSCH is scrambled by a C-RNTI. For example, after sending a MsgA to the network device, the UE listens to both a PDCCH scrambled by an RA-RNTI and the PDCCH scrambled by the C-RNTI. After the network device successfully decodes uplink data in the MsgA, the network device sends the PDCCH used to schedule the PDSCH carrying the first information, where the PDCCH is scrambled by the C-RNTI. If successfully detecting only the preamble in the MsgA, the network device sends the PDCCH used to schedule the PDSCH carrying the response information for the preamble, where the PDCCH is scrambled by the RA-RNTI. In an optional implementation, the C-RNTI is considered as a contention resolution identity. In another embodiment, the PDCCH that schedules the PDSCH is scrambled by another RNTI. This is not limited in this application.

The following separately describes the foregoing four types of response information (A), (B), (C), and (D) that are each carried in a MAC PDU.

When the response information is (A), the response information may be carried in each of the MAC PDUs in the foregoing case 1 and case 3. It should be noted that, when the response information (A) is carried in the MAC PDU in the case 1, content and a format of the MAC subPDU need to be redefined, to support RAR response information. In this way, a scenario in which different response information types are shared in one MAC PDU can be implemented.

When the response information is (B), the response information may be carried in each of the MAC PDUs in the foregoing case 1 and case 3. It should be noted that, when the response information (B) is carried in the MAC PDU in the case 3, content and a format of the MAC subPDU may also be redefined, or content and a format of the MAC subPDU in a conventional technology may be used. When the response information (B) is carried in the MAC PDU in the case 1, content and a format of the MAC subPDU need to be redefined, to support the response information for the preamble in two-step random access. In this way, a scenario in which different response information types are shared in one MAC PDU is implemented.

When the response information is the case A in (C), a MAC subPDU carrying the contention resolution identity belongs to a sub-protocol data unit in the MAC PDU in the case 1.

When the response information is the case B in (C), because a MAC subPDU carrying the contention resolution identity belongs to a sub-protocol data unit in the MAC PDU in the case 1, to make a relatively small change to a format and content of a MAC subPDU in a conventional technology, a format and content of a MAC subPDU carrying the first information need to be redefined.

When the response information is (D), a format and content of a MAC subPDU carrying the first information are respectively the same as a format and content of the MAC subPDU that carries the first information when the response information is (C). Details are not described herein again.

The following embodiments are described by using an example in which the response information (A), (B), and (C) is carried in the MAC PDU described in the foregoing case 1. The response information is carried in the MAC PDU in the foregoing case 1, and a structure and content of a MAC subPDU applicable to the MAC PDU in the case 1 may be extended and defined.

In a possible implementation, the contention resolution identity and the first information may be carried in one or more MAC subPDUs of the MAC PDU, where identifier information in a subheader of a MAC subPDU carrying the contention resolution identity and identifier information in a subheader of a MAC subPDU carrying the first information are the same or of a same type. For example, the identifier information in the subheader may be a logical channel identifier. In this case, an existing MAC subPDU carrying a contention identity may be compatible.

An example in which identifier information in a subheader of a MAC subPDU is a logical channel identifier is used below for description. A value of the logical channel identifier may indicate that a data part in the MAC subPDU includes at least one of the following content: information indicating a resource used to feed back an acknowledgement message, a TPC command, a timing advance command, an uplink data transmission grant, an index number of a preamble carried in a random access request initiated by the terminal device, a C-RNTI, radio resource control reconfiguration information, radio resource control connection establishment information, or radio resource control resume information.

Based on a fixed length and variable length of a data part in the extended MAC subPDU, descriptions are separately provided below.
1: MAC CE Having a Fixed Length The network device may allocate different LCIDs to different MAC CEs in the MAC subPDU, and a value of the LCID ranges from 0 to 63 (bits). For ease of description, a relationship, shown in a table 3, between the value of the LCID and the MAC CE indicated by the value of the LCID is used as an example for description. The value of the LCID may also be referred to as an index number of the LCID, and the MAC CE indicated by the value of the LCID may also be referred to as an LCID value.

TABLE 3

Relationship between a value of an LCID and a MAC CE

| Value of an LCID | MAC CE |
|---|---|
| 0 | CCCH |
| 1 to 32 | Identity of the logical channel |
| 33 | Backoff Indicator |
| 34 to 41 | Reserved bits |
| 42 | ACK feedback for MsgB |
| 43 | Preamble index |
| 44 | Time advance command for RACH |
| 45 | UL grant |
| 46 | TC-RNTI |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

As shown in the table 3, a value of the LCID allocated by the network device to the backoff indicator is 33, values of the LCID allocated to the reserved bits are 34-41, a value of the LCID allocated to the feedback acknowledgement message is 42, a value of the LCID allocated to the preamble is 43, a value of the LCID allocated to the TA command is 44, a value of the LCID allocated to the UL grant is 45, an identifier of a logical channel allocated to the TC-RNTI is 46, and a value of the LCID allocated to the contention resolution identity of the terminal device is 62.

With reference to the table 3, a format and content of each type of MAC subPDU that carries the first information are described.

Figure 9A:
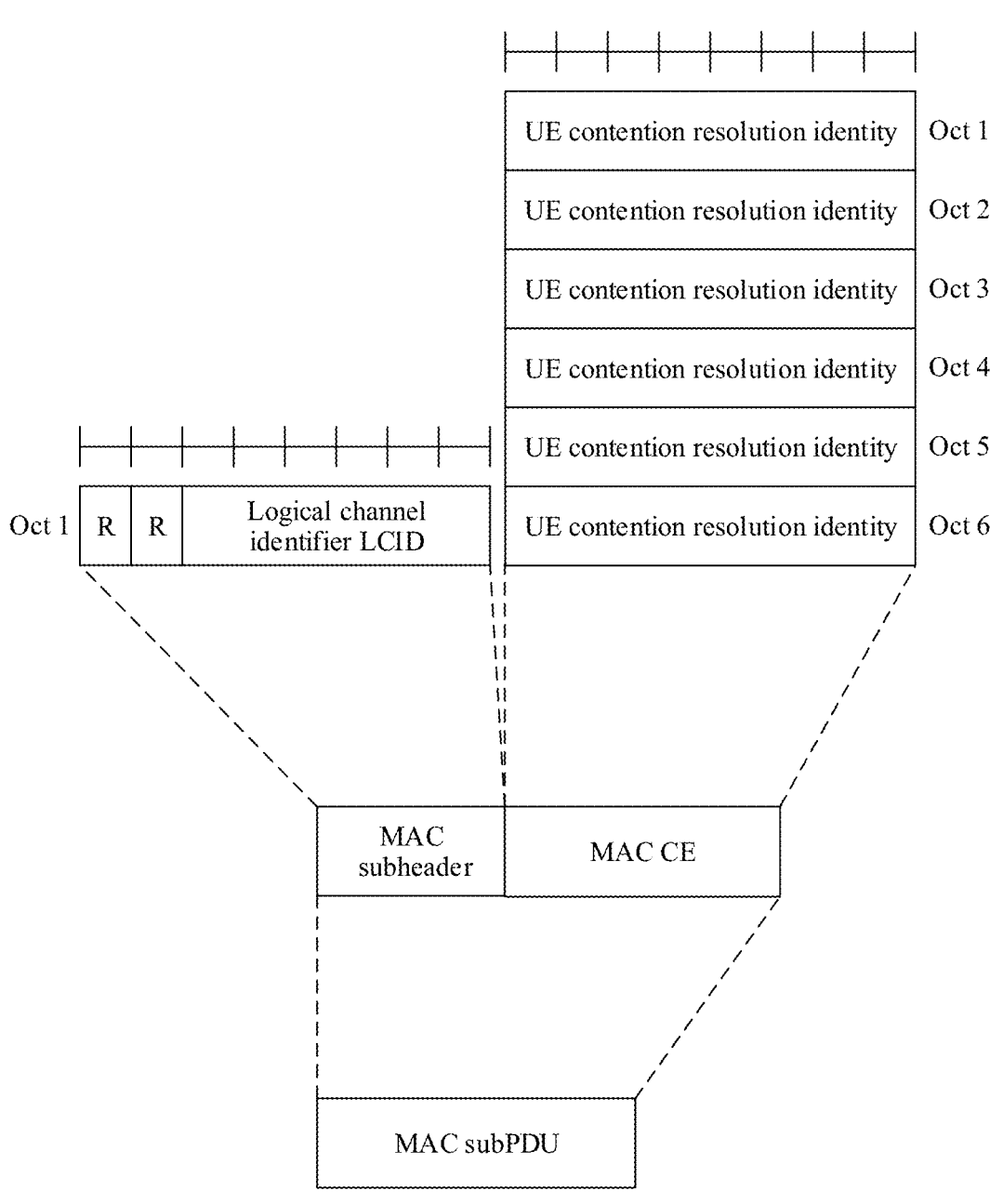
FIG. 9a is a schematic structural diagram of a MAC subPDU carrying a contention resolution identity according to embodiments of this application.

FIG. 9a is a schematic structural diagram of a MAC subPDU carrying a contention resolution identity according to this application. The MAC subPDU carrying the contention resolution identity includes a MAC subheader and a MAC CE. The MAC subheader includes one logical channel identifier and two reserved bits Rs, and a value of the LCID is 62. It can be learned from the table 3 that the MAC CE corresponding to the value 62 of the LCID is the contention resolution identity (UE Contention Resolution Identity). The MAC CE has a fixed length, and occupies 6 bytes (48 bits).

Figure 9B:
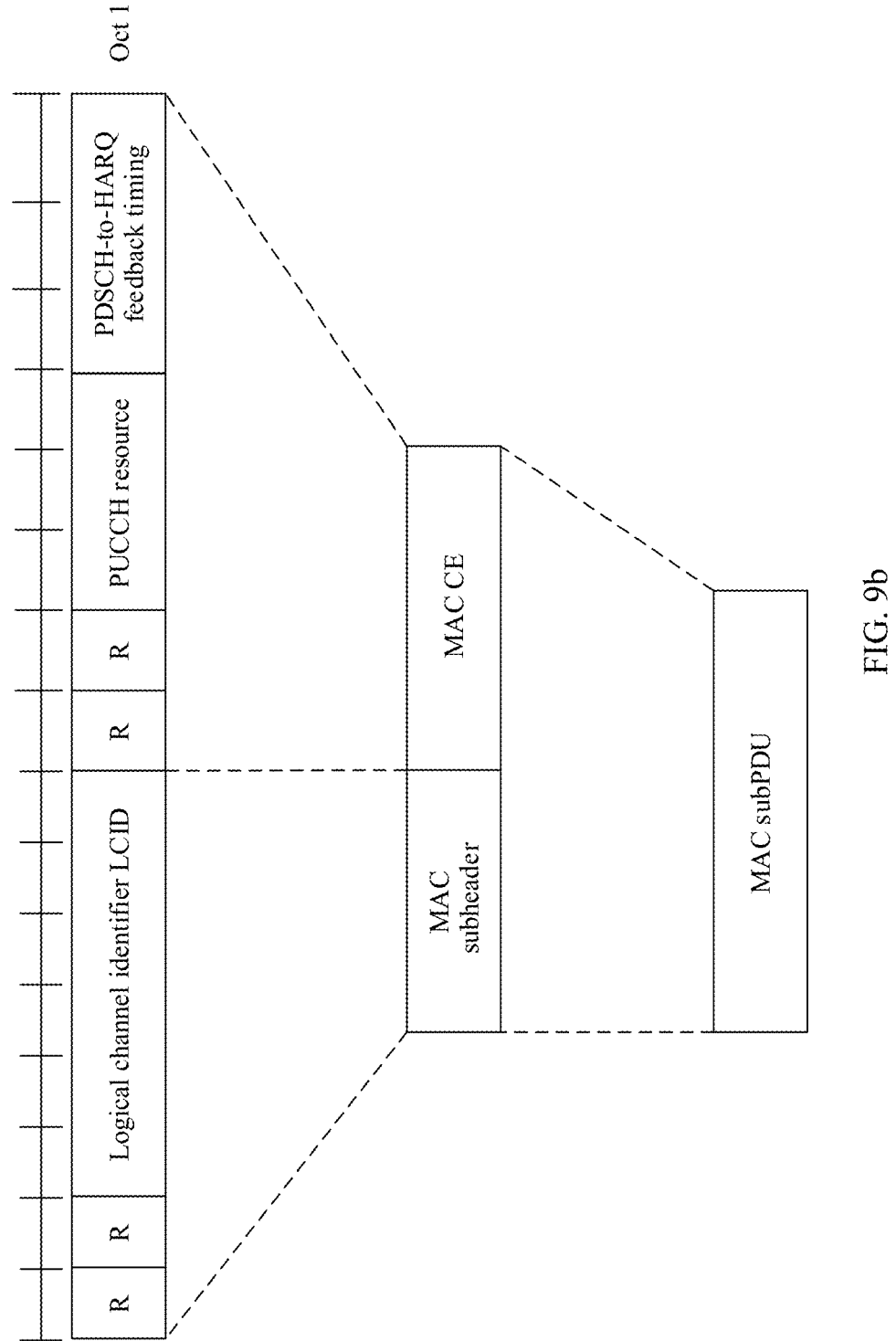
FIG. 9b is a schematic structural diagram of a MAC subPDU carrying an ACK feedback for MsgB according to embodiments of this application.

FIG. 9b is a schematic structural diagram of a MAC subPDU carrying ACK feedback for MsgB according to this application. The MAC subPDU includes a MAC subheader and a MAC CE. The MAC subheader includes one logical channel identifier and two reserved bits Rs. A value of the LCID is 42. It can be learned from the table 3 that the MAC CE corresponding to the value 42 of the LCID is resource information of the ACK-feedback (ACK-feedback) message. A length of the MAC CE is fixed, and the MAC CE occupies 6 bits. To ensure that a length value of the MAC CE having the fixed length is an integer multiple of 1 byte, two reserved bits are added to the MAC CE.

Figure 9C:
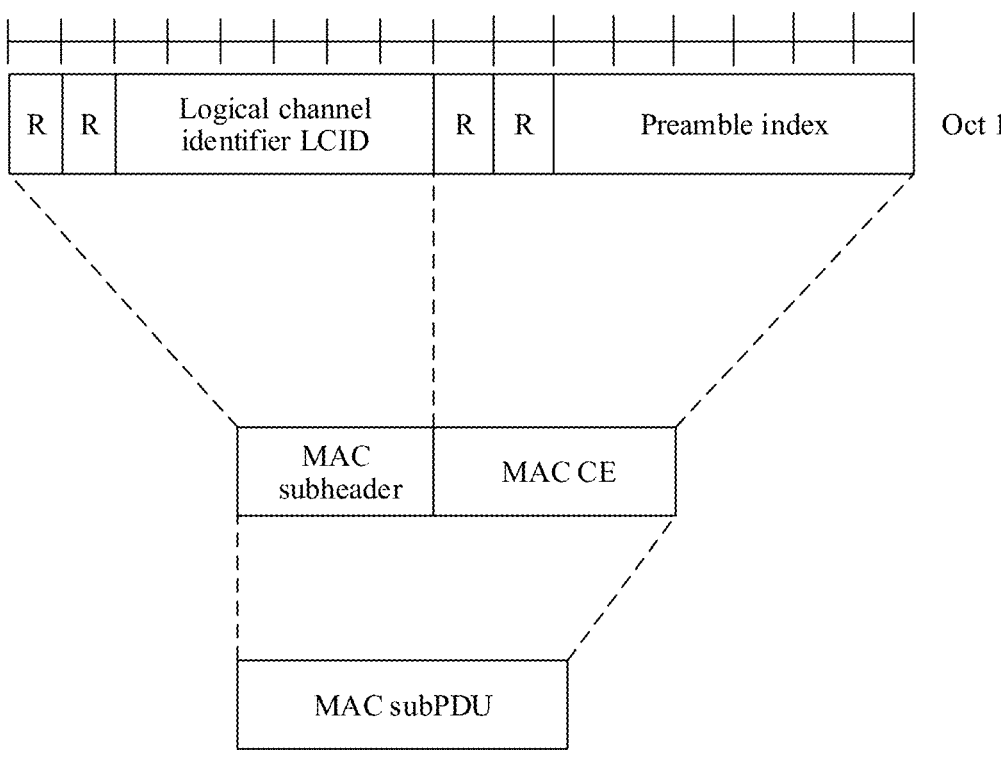
FIG. 9c is a schematic structural diagram of a MAC subPDU carrying a preamble index according to embodiments of this application.

FIG. 9c is a schematic structural diagram of a MAC subPDU carrying a preamble index according to this application. The MAC subPDU includes a MAC subheader and a MAC CE. The MAC subheader includes one logical channel identifier and two reserved bits Rs. A value of the LCID is 43. It can be learned from the table 3 that the MAC CE corresponding to the value 43 of the LCID is the preamble (Preamble index). A length of the MAC CE is fixed to occupy 6 bits. To ensure that a length value of the MAC CE having the fixed length is an integer multiple of 1 byte, two reserved bits are added to the MAC CE.

Figure 9D:
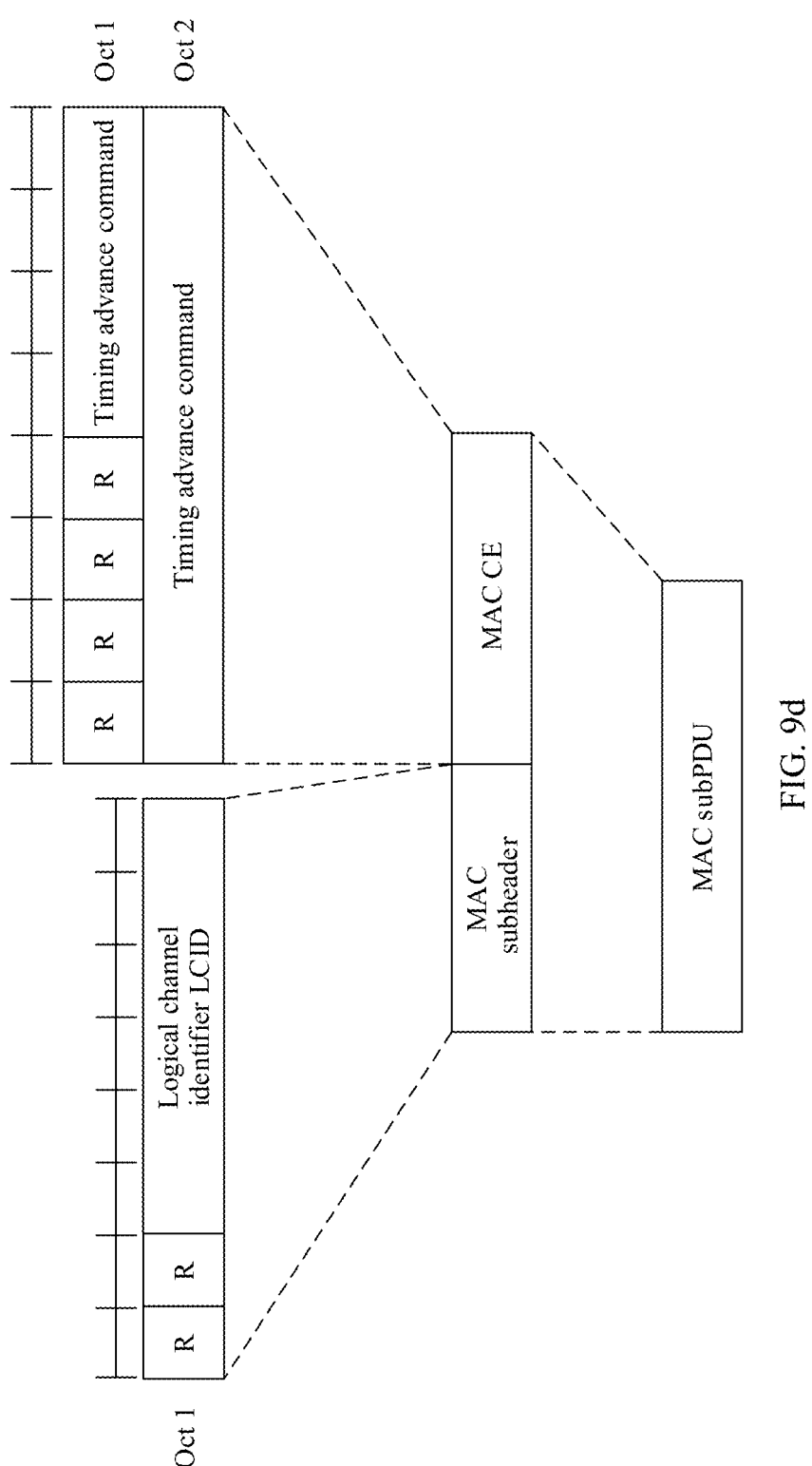
FIG. 9d is a schematic structural diagram of a MAC subPDU carrying a TA command according to embodiments of this application.

FIG. 9d is a schematic structural diagram of a MAC subPDU carrying a TA command according to this application. The MAC subPDU includes a MAC subheader and a MAC CE. The MAC subheader includes one logical channel identifier and two reserved bits Rs. A value of the LCID is 44. It can be learned from the table 3 that the MAC CE corresponding to the value 44 of the LCID is the timing advance (TA) command. A length of the MAC CE is fixed to occupy 12 bits. To ensure that a length value of the MAC CE having the fixed length is an integer multiple of 1 byte, four reserved bits are added to the MAC CE.

Figure 9E:
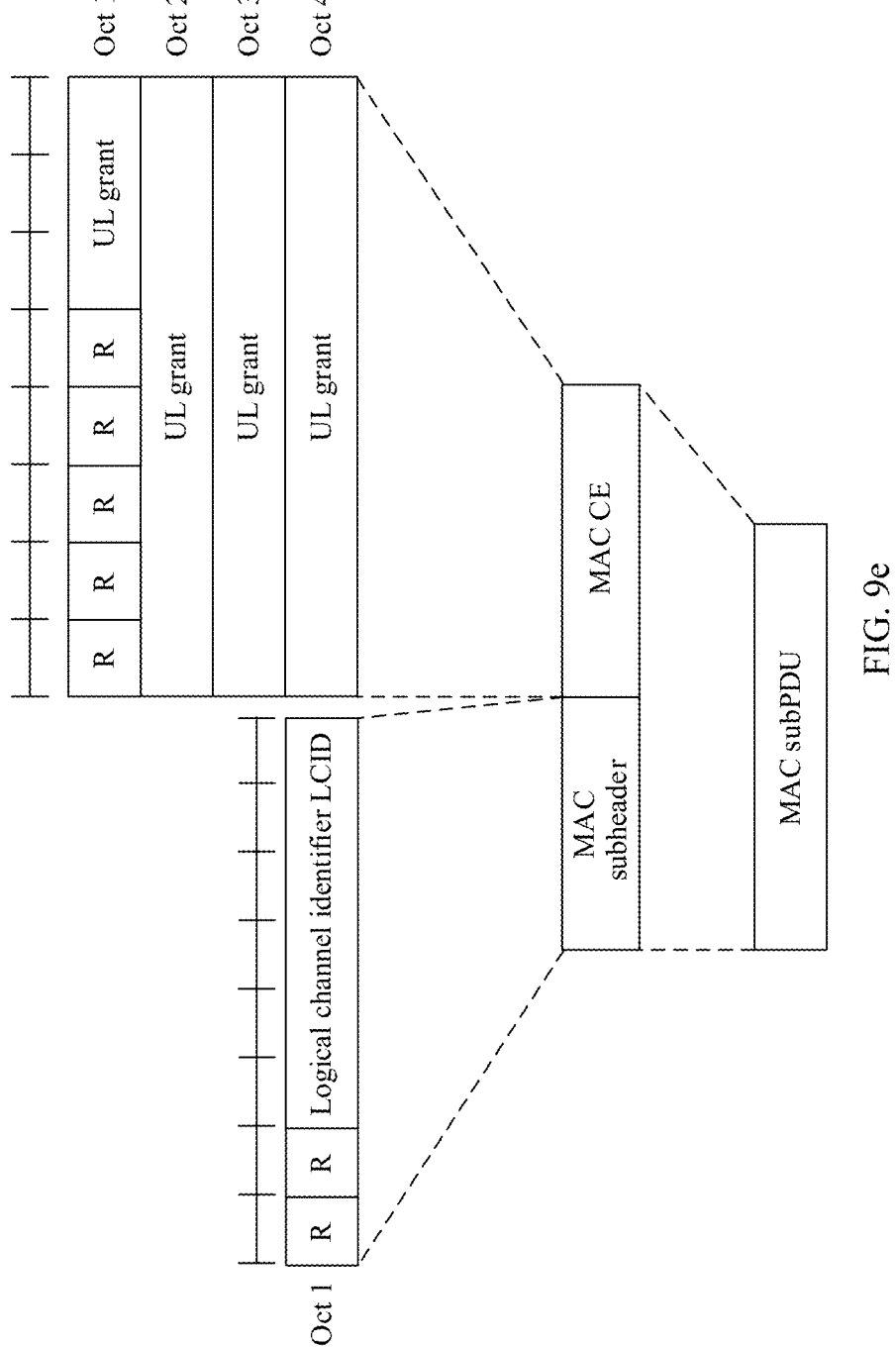
FIG. 9e is a schematic structural diagram of a MAC subPDU carrying a UL grant according to embodiments of this application.

FIG. 9e is a schematic structural diagram of a MAC subPDU carrying a UL grant according to this application. The MAC subPDU includes a MAC subheader and a MAC CE. The MAC subheader includes one logical channel identifier and two reserved bits Rs. A value of the LCID is 45. It can be learned from the table 3 that the MAC CE corresponding to the value 44 of the LCID is the UL grant. The MAC CE occupies 27 bits. To ensure that a length value of the MAC CE having the fixed length is an integer multiple of 1 byte, five reserved bits are added to the MAC CE.

Figures 9F, 9G:
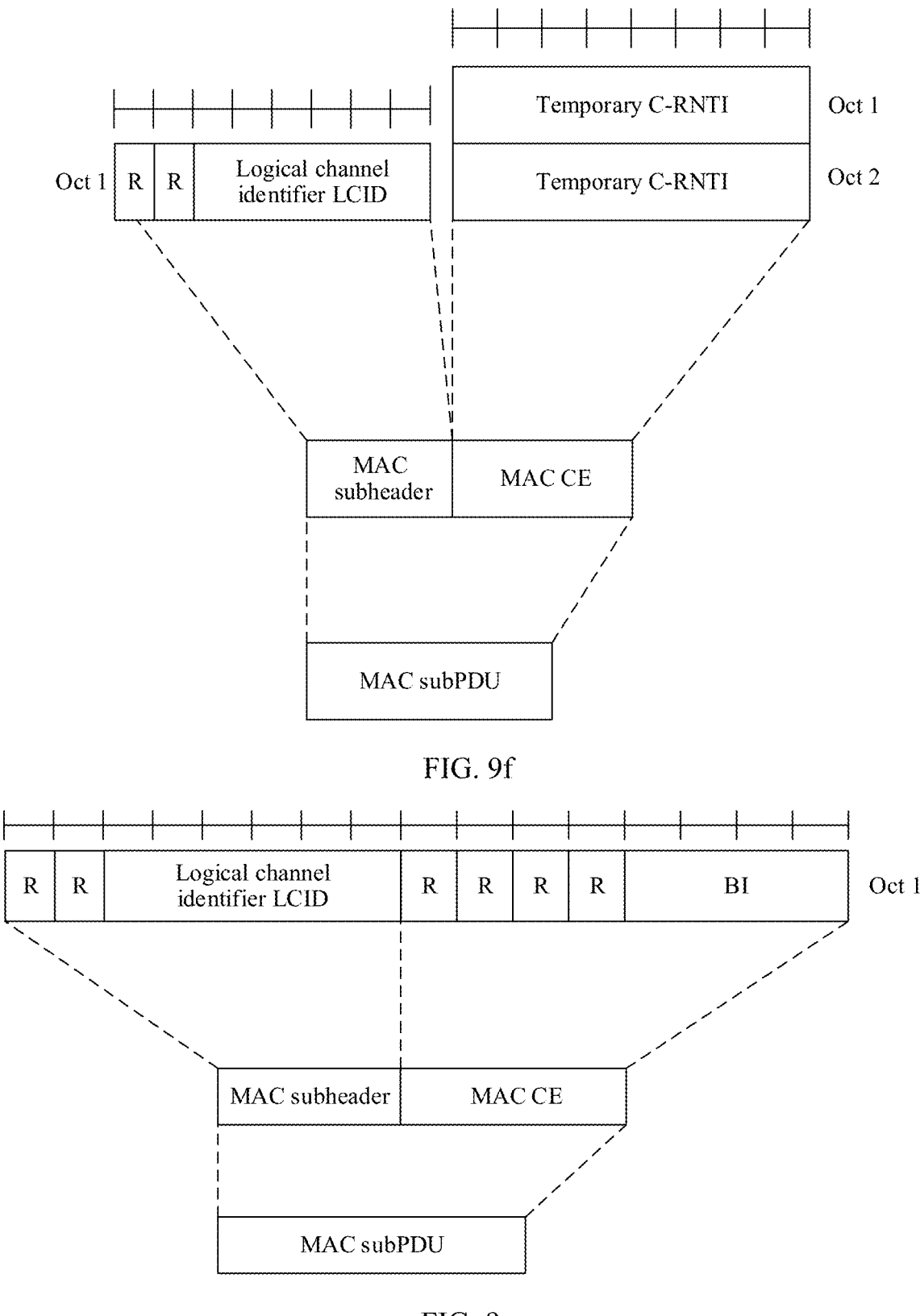
FIG. 9f is a schematic structural diagram of a MAC subPDU carrying a TC-RNTI according to embodiments of this application.
FIG. 9g is a schematic structural diagram of a MAC subPDU carrying a TC-RNTI according to embodiments of this application.

FIG. 9f is a schematic structural diagram of a MAC subPDU carrying a TC-RNTI according to this application. The MAC subPDU includes a MAC subheader and a MAC CE. The MAC subheader includes one logical channel identifier and two reserved bits Rs. A value of the LCID is 46. It can be learned from the table 3 that the MAC CE corresponding to the value 46 of the LCID is the TC-RNTI. The MAC CE occupies 16 bits, and is an integer multiple of 1 byte.

FIG. 9g is a schematic structural diagram of a MAC subPDU carrying a backoff indicator according to this application. The MAC subPDU carrying the contention resolution identity includes a MAC subheader and a MAC CE. The MAC subheader includes one logical channel identifier and two reserved bits Rs, and a value of the LCID is 33. It can be learned from the table 3 and a table 4 that the MAC CE corresponding to the value 33 of the LCID is the backoff indicator. The MAC CE has a fixed length, and occupies 1 byte (8 bits). The first 4 bits are reserved bits, and the backoff indicator occupies the last 4 bits.

Further, to reduce a size of the response information carried on the PDSCH, content of a plurality of MAC CEs may be combined into one MAC CE. As shown in the table 4, a MAC subPDU carrying the TA command, a MAC subPDU carrying the UL grant, and a MAC subPDU carrying the TC-RNTI may be combined into one MAC sub-PDU. A MAC CE in the combined MAC subPDU may be collectively referred to as a response to a random access command of the terminal device (UE RACH command for MsgB), and a value of a corresponding logical channel is 46.

52

TABLE 4

Relationship between a value of an LCID and a MAC CE

| Value of an LCID | MAC CE |
|---|---|
| 0 | CCCH |
| 1 to 32 | Identity of the logical channel |
| 33 | Backoff Indicator |
| 34 to 42 | Reserved |
| 43 | ACK feedback for MsgB |
| 44 | Preamble index |
| 45 | Common RAR |
| 46 | UE RACH Command for MsgB |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octet) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

As shown in the table 4, a value of the LCID allocated by the network device to the backoff indicator is 33, values of the LCID allocated to the reserved bits are 34 to 42, a value of the LCID allocated to the feedback acknowledgement message is 43, a value of the LCID allocated to the preamble is 44, a value of the LCID allocated to the common RAR MAC CE is 45, a value of the LCID allocated to the UE RACH command for MsgB is 46, and a value of the LCID allocated to the contention resolution identity of the terminal device is 62.

A first point that should be noted is that the correspondences between the values of the logical channel identifiers and the MAC CEs in the table 3 and table 4 are not mandatory. That is, the network device does not need to allocate the values that are of the logical channel identifiers and that are shown in the table 3 and table 4 to the MAC CEs. For example, alternatively, the value of the LCID allocated by the network device to the preamble may be 45, the value of the LCID allocated to the TA command may be 43, and the value of the logical channel identifier allocated to the TC-RNTI may be 62. This is not specifically limited in this application.

A second point that should be noted is that MAC CEs included in the table 3 and table 4 may be flexibly defined based on content included in the response information. That is, content of some or all extended MAC CEs in the table 3, and table 4 does not necessarily exist at the same time. The table 3 is used as an example for description. For example, when the response information includes the contention resolution identity, the timing advance command, and the uplink data transmission grant, the MAC CEs in the table 3 include the contention resolution identity, the timing advance command, and the uplink data transmission grant, and the network device may configure values that are of logical channel identifiers and that are respectively corresponding to the contention resolution identity, the timing advance command, and the uplink data transmission grant, where the ACK feedback for MsgB, the preamble index, and the TC-RNTI in the table 3 may not exist. For another example, when the response information includes the contention resolution identity, the MAC CE in the table 3 includes the contention resolution identity, and the network device allocates the value of a corresponding logical channel identifier to the contention resolution identity. Table 3 may exclude an ACK feedback for MsgB, a preamble index, a TC-RNTI, a Time advance command for RACH, and a UL grant.

A third point that should be noted is that when the response information includes information about a resource for feeding back a resource acknowledgement message, there may be no information about a resource for feeding back the resource acknowledgement message in the table 3, and information indicating the resource used to feed back the acknowledgement message may also be indicated by using a field in DCI for scheduling the PDSCH.

A fourth point that should be noted is that, for a terminal device in an idle state or inactive state, when receiving response information that includes at least contention resolution and that is sent by the network device and determining that the contention resolution succeeds, the terminal device converts a received TC-RNTI into a C-RNTI. Therefore, when sending a PDSCH including at least a contention resolution identity to the terminal device, the network device may directly allocate a C-RNTI to a user. Therefore, the TC-RNTIs in the table 3 and table 4 may be replaced with C-RNTIs.

With reference to the table 4, a format of combining a MAC subPDU carrying a TA command, a MAC subPDU carrying a UL grant, and a MAC subPDU carrying a TC-RNTI into one MAC subPDU is described.

Figure 10A:
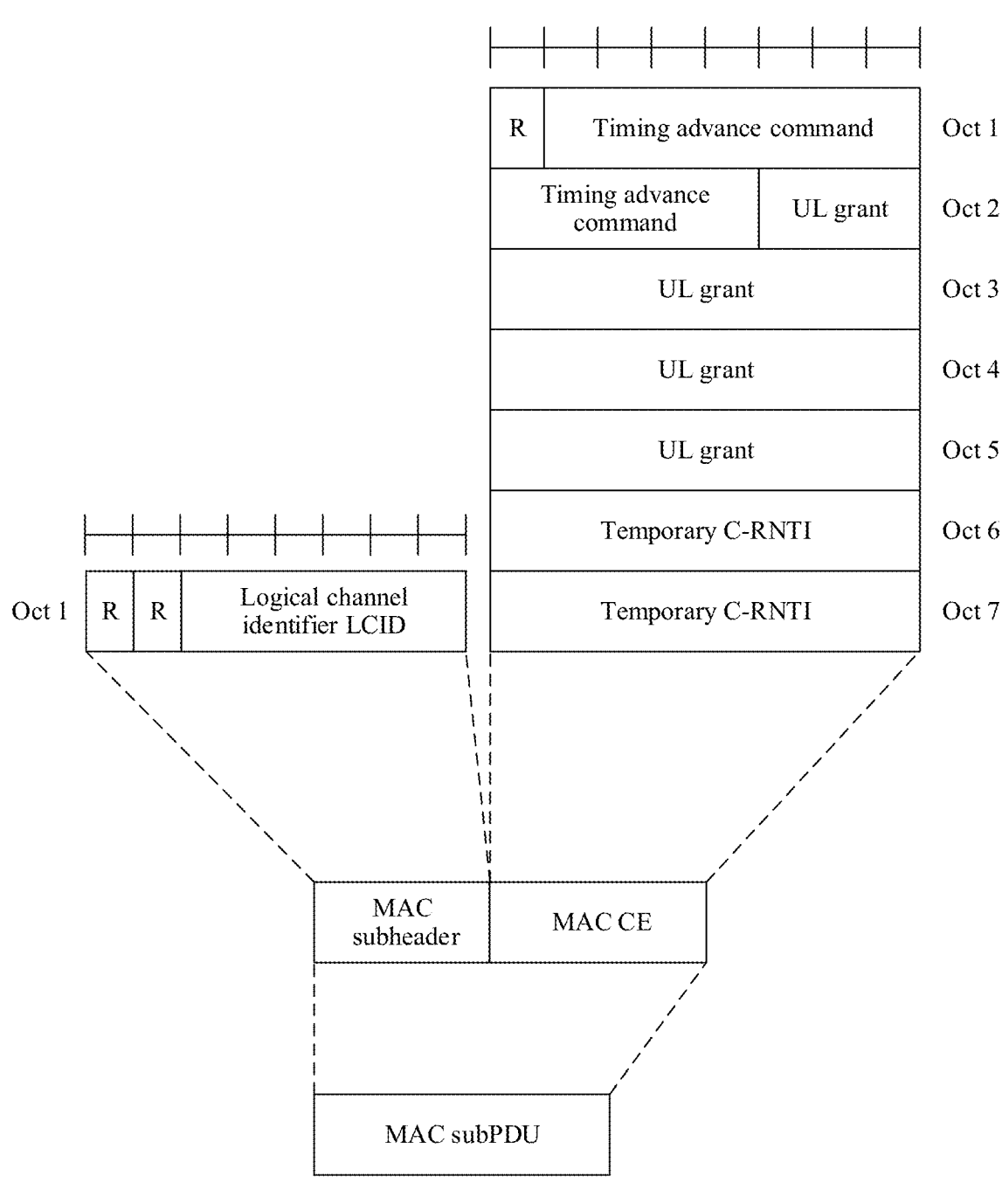
FIG. 10a is a schematic structural diagram of a MAC subPDU carrying a UE RACH command for MsgB according to embodiments of this application.

FIG. 10a is a schematic structural diagram of a MAC subPDU carrying a UE RACH command for MsgB according to this application. In the UE RACH command for MsgB, a TA command, a UL grant, and a TC-RNTI are combined and carried in a MAC subPDU. The MAC subPDU includes a MAC subheader and a MAC CE. The MAC subheader includes one logical channel identifier and two reserved bits Rs. A value of the LCID is 46. It can be learned from the table 4 that the MAC CE corresponding to the value 46 of the LCID is the common RAR MAC CE, which occupies 55 bits and includes the TA command, the UL grant, and the TC-RNTI. The TA command occupies 12 bits, the UL grant occupies 28 bits, and the TC-RNTI occupies 16 bits. To ensure that a length value of the MAC CE having the fixed length is an integer multiple of 1 byte, one reserved bit is added to the MAC CE.

In another embodiment, the logical channel identifier in the MAC subheader in FIG. 10a may be replaced with a preamble index, and the first bit in the MAC subheader is used to indicate whether there is another subPDU after the subPDU. For example, 1 indicates that there is another subPDU after the subPDU, and 0 indicates that there is no subPDU after the subPDU. The second bit in the MAC subheader are used to indicate a header format. For example, 1 indicates that the MAC subheader includes a backoff indicator, and 0 indicates that a remaining field in the MAC subheader is a RAP ID, indicating the preamble index. Correspondingly, the name of the MAC CE in FIG. 10a may also be replaced with a payload, where setting of each field may remain unchanged. If the subheader includes the RAPID, a format of the MAC subPDU may be used to carry the fallback RAR information in the foregoing embodiment.

Figure 10B:
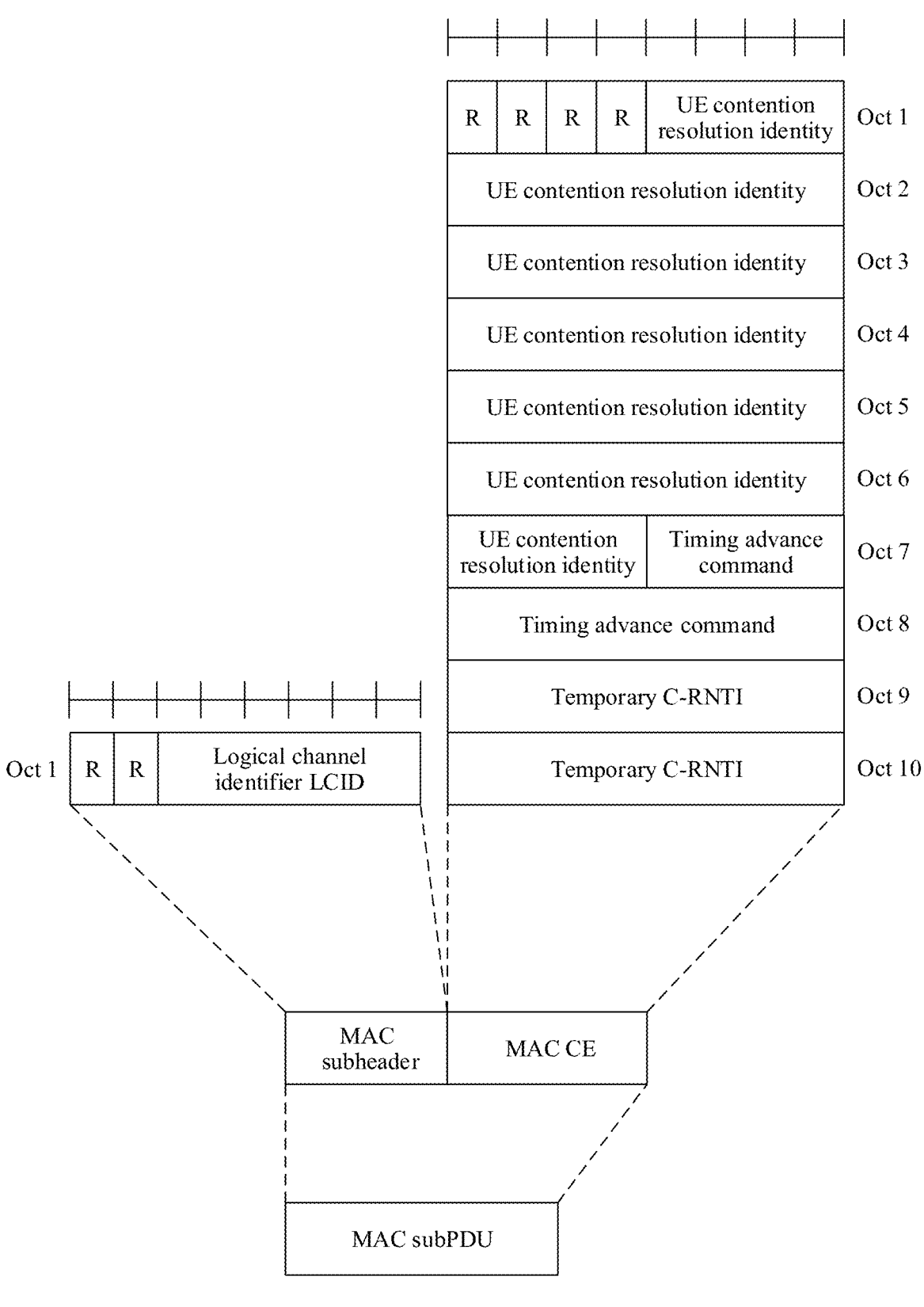
FIG. 10b is a schematic structural diagram of another MAC subPDU carrying a UE RACH command for MsgB according to embodiments of this application.

In an embodiment, to support sharing of a MAC subPDU carrying the fallback RAR information and a MAC subPDU carrying success RAR information on a same PDSCH, optionally, the first bit in the first byte in the MAC subPDU (for example, the "R" bit in an October 1 in the MAC CE in FIG. 10a) may be used to indicate whether the MAC subPDU is the MAC subPDU carrying the fallback RAR information or the MAC subPDU carrying the success RAR information. The MAC CE being content of the UE RACH command for MsgB may alternatively be a combination of other first information. FIG. 10b is a schematic structural diagram of another MAC subPDU carrying a UE RACH command for MsgB according to this application. In the UE RACH command for MsgB, a contention resolution identity, a TA command, and a TC-RNTI are combined and carried in the MAC subPDU. The MAC subPDU includes a MAC subheader and a MAC CE. The MAC subheader includes one logical channel identifier and two reserved bits Rs. A value of the LCID is 46. It can be learned from the table 4 that the MAC CE corresponding to the value 46 of the LCID is the UE RACH command for MsgB, which occupies 76 bits and includes a contention resolution identity, the TA command, and the TC-RNTI. The contention resolution identity occupies 6 bytes (48 bits), the TA command occupies 12 bits, and the TC-RNTI occupies 16 bits. To ensure that a length value of the MAC CE having the fixed length is an integer multiple of 1 byte, four reserved bits are added to the MAC CE.

In another embodiment, the logical channel identifier in the MAC subheader in FIG. 10b may be replaced with a preamble index, and the first bit in the MAC subheader is used to indicate whether there is another subPDU after the subPDU. For example, 1 indicates that there is another subPDU after the subPDU, and 0 indicates that there is no subPDU after the subPDU. The second bit in the MAC subheader are used to indicate a header format. For example, 1 indicates that the MAC subheader includes a backoff indicator, and 0 indicates that a remaining field in the MAC subheader is a RAP ID, indicating the preamble index. Correspondingly, the name of the MAC CE in FIG. 10b may also be replaced with a payload, where setting of each field may remain unchanged. If the subheader includes the RAPID, a format of the MAC subPDU may be used to carry the success RAR information in the foregoing embodiment. In an embodiment, to support sharing of a MAC subPDU carrying fallback RAR information and a MAC subPDU carrying the success RAR information on a same PDSCH, optionally, the first bit in the first byte in the MAC subPDU (for example, the first "R" bit in an October 1 in the MAC CE in FIG. 10b) may be used to indicate whether the MAC subPDU is the MAC subPDU carrying the fallback RAR information or the MAC subPDU carrying the success RAR information. FIG. 10c is a schematic structural diagram of another MAC subPDU carrying a UE RACH command for MsgB according to this application. In the UE RACH command for MsgB, a contention resolution identity, a TA command, a UL grant, and a TC-RNTI are combined and carried in the MAC subPDU. The MAC subPDU includes a MAC subheader and a MAC CE. The MAC subheader includes one logical channel identifier and two reserved bits Rs. A value of the LCID is 46. It can be learned from the table 4 that the MAC CE corresponding to the value 46 of the LCID is the UE RACH command for MsgB, which occupies 104 bits and includes a contention resolution identity, the TA command, the UL grant, and the TC-RNTI. The contention resolution identity occupies 6 bytes (48 bits), the TA command occupies 12 bits, the UL grant occupies 28 bits, and the TC-RNTI occupies 16 bits. To ensure that a length value of the MAC CE having the fixed length is an integer multiple of 1 byte, one reserved bit is added to the MAC CE.

In another embodiment, the logical channel identifier in the MAC subheader in FIG. 10c may be replaced with a preamble index, and the first bit in the MAC subheader is used to indicate whether there is another subPDU after the subPDU. For example, 1 indicates that there is another subPDU after the subPDU, and 0 indicates that there is no subPDU after the subPDU. The second bit in the MAC subheader are used to indicate a header format. For example, 1 indicates that the MAC subheader includes a backoff indicator, and 0 indicates that a remaining field in the MAC subheader is a RAP ID, indicating the preamble index. Correspondingly, the name of the MAC CE in FIG. 10c may also be replaced with a payload, where setting of each field may remain unchanged. If the subheader includes the RAPID, a format of the MAC subPDU may be used to carry the success RAR information in the foregoing embodiment. In an embodiment, to support sharing of a MAC subPDU carrying fallback RAR information and a MAC subPDU carrying the success RAR information on a same PDSCH, optionally, the first bit in the first byte in the MAC subPDU (for example, the first "R" bit in an October 1 in the MAC CE in FIG. 10c) may be used to indicate whether the MAC subPDU is the MAC subPDU carrying the fallback RAR information or the MAC subPDU carrying the success RAR information.

Optionally, a first bit in the first byte of the payload in the subPDU indicates that the subPDU is a success RAR, and a second bit may further be set as an RRC message state indication. For example, if the first bit is 1 and the second bit is 0, it indicates that the subPDU does not carry an RRC message. If the first bit is 1 and the second bit is 1, the subPDU carries an RRC message.

In another embodiment, the subPDU format and/or the RRC message state indication that are/is indicated in the foregoing embodiment may alternatively be indicated in the subheader of the subPDU.

It should be noted that, alternatively, the MAC CE being the UE RACH command for MsgB may alternatively be a combination of other content than the UE RACH command for MsgB in the first information. Details are not described herein again.

Figure 11:
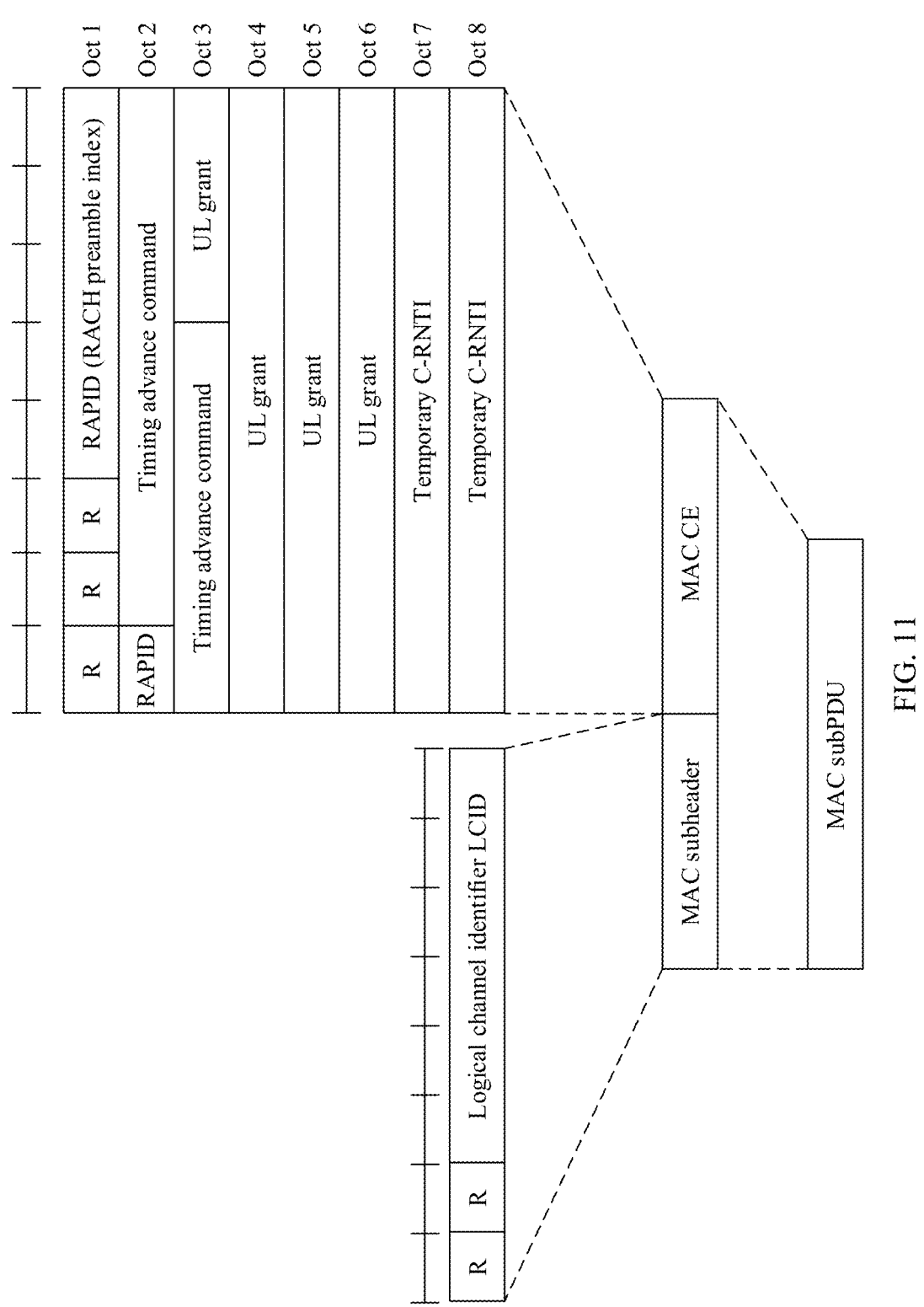
FIG. 11 is a schematic structural diagram of a MAC subPDU carrying a common RAR according to embodiments of this application.

FIG. 11 is a schematic structural diagram of a MAC subPDU carrying a common RAR according to this application. In the common RAR, a contention resolution identity, a TPC command, a TA command, a UL grant, a TC-RNTI, and a preamble index into one MAC subPDU. The MAC subPDU includes a MAC subheader and a MAC CE. The MAC subheader includes one logical channel identifier and two reserved bits Rs. A value of the LCID is 45. It can be learned from the table 4 that the MAC CE corresponding to the value 45 of the LCID is the common RAR, which occupies 110 bits and includes the contention resolution identity, the TA command, the UL grant, the TC-RNTI, and the preamble index. The contention resolution identity occupies 6 bytes (48 bits), the TA command occupies 12 bits, the UL grant occupies 28 bits, the TC-RNTI occupies 16 bits, and the preamble index occupies 6 bits. To ensure that a length value of the MAC CE having the fixed length is an integer multiple of 1 byte, three reserved bits are added to the MAC CE.

2: MAC CE Having a Variable Length

Figures 12, 13A:
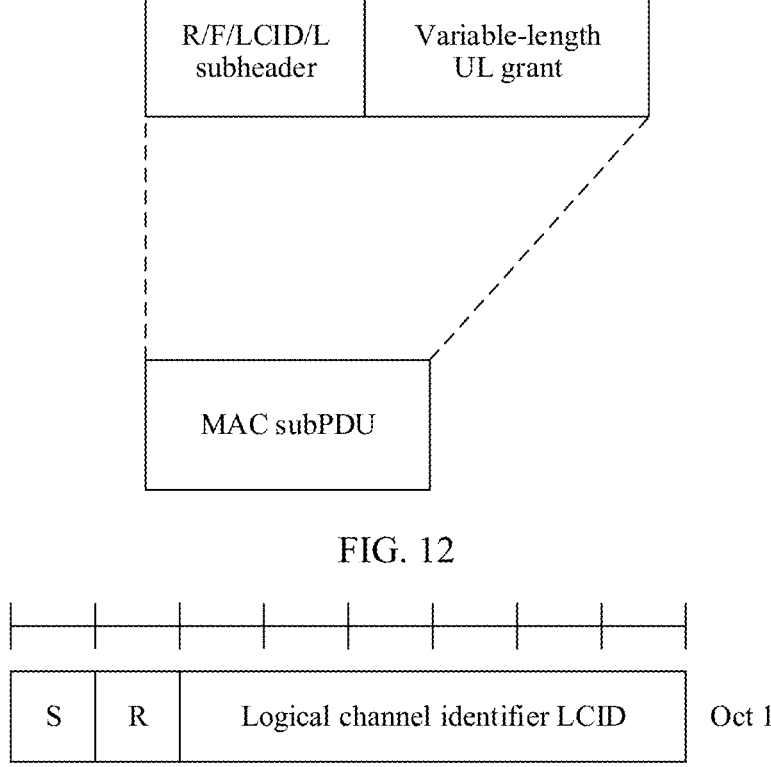
FIG. 12 is a schematic structural diagram of a MAC subPDU carrying a UL grant having a variable length according to embodiments of this application.
FIG. 13a is a schematic diagram of another MAC subheader according to embodiments of this application.

Herein, the length of the MAC CE may be indicated by using an L field in a MAC subheader. The MAC CE having the fixed length that is defined above may also be defined by using a MAC CE having a variable length. For example, an example in which a data part in a MAC subPDU includes a UL grant is used for description. A length of the UL grant may be determined based on an actual transmission state. When the length of the UL grant is variable, a structure of the MAC subPDU that carries the UL grant having the variable length is shown in FIG. 12. The L field in the MAC subheader may indicate an actual length of the UL grant having the variable length. For descriptions of other parts, refer to the descriptions of FIG. 8b and FIG. 8c. Details are not described herein again.

In a possible implementation, a value that is of an LCID and that is corresponding to the UL grant having the variable length may be the same as a value that is of an LCID and that is corresponding to a UL grant having a fixed length, or a value of an LCID may be newly allocated to the UL grant having the variable length.

A PDSCH including a MAC subPDU structure defined in this application may be scheduled by using DCI in another format. The DCI in another format includes but is not limited to the foregoing defined DCI format or content. Alternatively, a CRC scrambling sequence of the DCI may be another RNTI sequence, for example, a C-RNTI, a TC-RNTI, an RA-RNTI, or another common RNTI.

To reduce service latency of a terminal device, the network device may include response information for a plurality of terminal devices in one or more MAC subPDUs in one MAC PDU. It may also be understood that, one MAC PDU may carry response information for a plurality of terminal devices, and the response information for the plurality of terminal devices may be carried in one MAC subPDU in one MAC PDU, or may be carried in a plurality of MAC subPDUs in one MAC PDU. Response information for one terminal device may be carried in one MAC subPDU, or may be carried in a plurality of MAC subPDUs. In other words, a correspondence between the response information for the terminal device and the MAC subPDUs may be one-to-one or one-to-many.

When the response information for the plurality of terminal devices is carried in one MAC PDU, the reserved bits in FIG. 8a, FIG. 8b, and FIG. 8c may be extended. In other words, the reserved bits in FIG. 8a, FIG. 8b, and FIG. 8c may be redefined. For example, a field S is added, and the field may indicate an association relationship between a MAC subPDU and an adjacent MAC subPDU. The field may be referred to as a continuity indication field. A redefined structure of the MAC subheader may be classified into the following two formats based on whether the length of the data part in the MAC subPDU is variable.

Format 3: A length indication field (L) of the data part is not included.

The MAC subheader is mainly used for a MAC subPDU whose data part has a fixed length, and the data part may be a MAC CE or a MAC SDU. FIG. 13a is a schematic diagram of another MAC subheader according to this application. The MAC subheader may be referred to as an S/R/LCID MAC subheader. S represents an association relationship between a MAC subPDU in which S is located and an adjacent MAC subPDU, and a value of S may be 0 or 1. R represents a reserved bit, a value of R may be 0 and a length of the reserved bit is not limited. The reserved bit exists to ensure that a fixed length value of the MAC subheader is an integer multiple of 1 byte. The LCID is a logical channel identifier. A length of the MAC subheader is 8 bits, and a unit of a fixed length of a data part is byte (where 1 byte is equal to 8 bits). A specific length value may be a length shown in the corresponding figure, or may be another determined length. This is not limited in this application.

Format 4: A length indication field (L) of the data part is included.

Figures 13B, 13C:
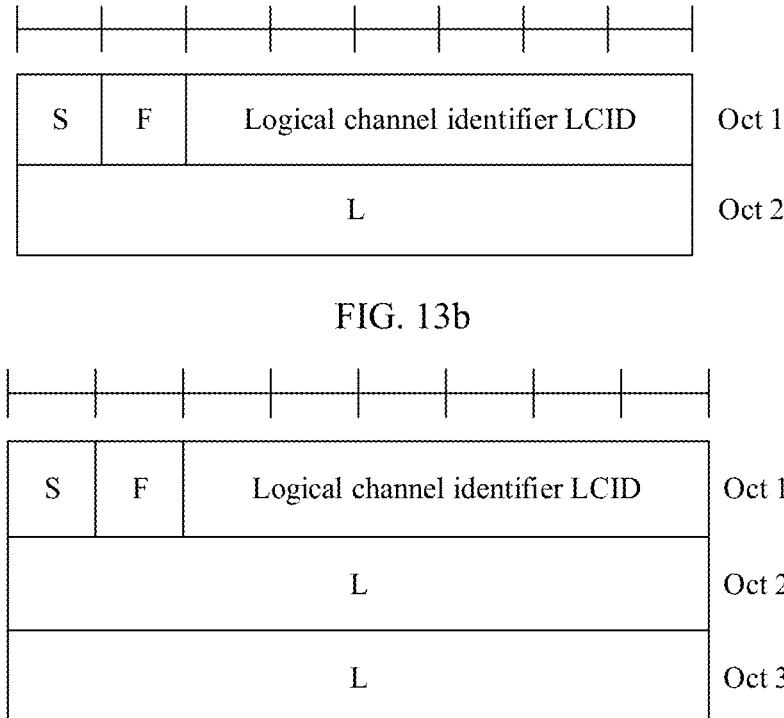
FIG. 13b is a schematic diagram of another MAC subheader according to embodiments of this application.
FIG. 13c is a schematic diagram of still another MAC subheader according to embodiments of this application.

The MAC subheader is mainly used for a MAC subPDU whose data part has a variable length, and the data part may be a MAC CE or a MAC SDU. FIG. 13b is a schematic diagram of a format of another MAC subheader according to this application. The MAC subheader may be referred to as an S/R/F/LCID/L MAC subheader with 8-bit L field. S represents an association relationship between a MAC subPDU in which S is located and an adjacent MAC subPDU, and a value of S may be 0 or 1. R represents a reserved bit, and a value of R may be 0. F is used to indicate a length of the L field. When a value of F is 0, it indicates that the length of the L field is 8 bits. When a value of F is 1, it indicates that the length of the L field is 16 bits. LCID is a logical channel identifier. L is the length indication field. In this schematic diagram, a length indicated by L is 8 bits, that is, a maximum length of the data part may be 2^8=256 bits. FIG. 13c is a schematic diagram of a format of still another MAC subheader according to this application. The MAC subheader may be referred to as an S/R/F/LCID/L MAC subheader with 16-bit L field. A difference from FIG. 13b is that a length indicated by L in the MAC subheader is 16 bits, that is, a maximum length of the data part may be 2^16=65536 bits.

Figure 14A:
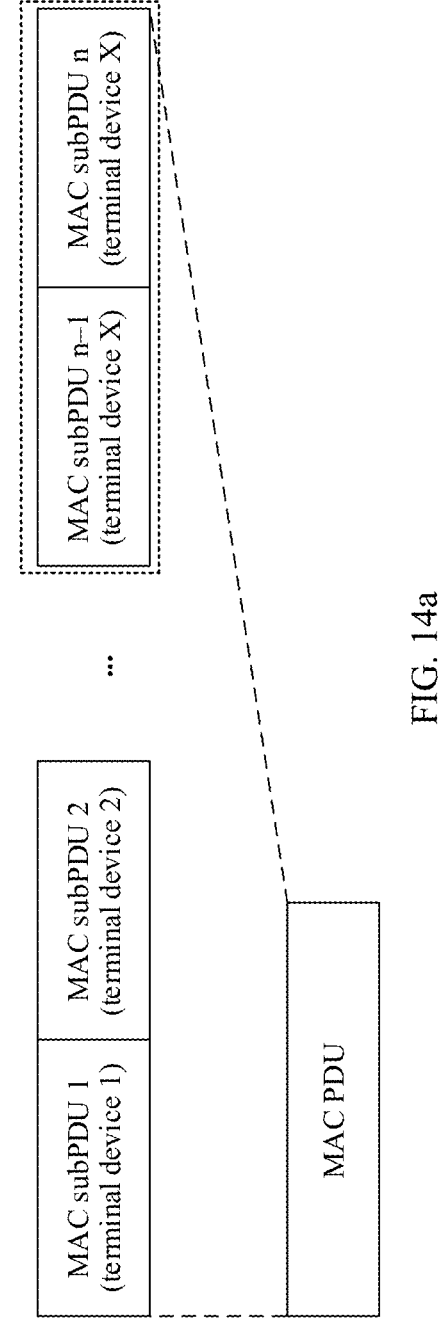
FIG. 14a is a schematic structural diagram of a MAC PDU carrying response information for a plurality of terminal devices according to embodiments of this application.

FIG. 14a is a schematic structural diagram of a MAC PDU carrying response information for a plurality of terminal devices according to this application. The MAC PDU includes response information for X terminal devices, where X is an integer greater than 1. Response information for a terminal device 1 is carried in a MAC subPDU 1, response information for a terminal device 2 is carried in a MAC subPDU 2, and response information for a terminal device X is carried in two MAC subPDUs, a MAC subPDU (n–1) and a MAC subPDU n.

When the response information for the plurality of terminal devices is carried in one MAC PDU, to help each terminal device quickly determine MAC subPDUs belonging to the terminal device, in a possible implementation, a subheader of a MAC subPDU may include fourth indication information, the fourth indication information is used to indicate an association relationship between the MAC subPDU and an adjacent MAC subPDU, and the association relationship is used to determine a start MAC subPDU and an end MAC subPDU that belong to the terminal device.

To help the terminal device further determine whether the MAC subPDU belongs to the terminal device, the fourth indication information may be located in the first bit of the subheader. For example, the first reserved bit in the subheader may be redefined. In other words, the first reserved bit in reserved bits (R) in the subheader of the MAC subPDU may be used to indicate the association relationship between the MAC subPDU and the adjacent MAC subPDU.

In a possible implementation, the fourth indication information may be represented by S, and different values of S may indicate association relationships between the MAC subPDU in which the S field is located and the adjacent MAC subPDU. It may also be understood that S may indicate whether the MAC subPDU in which S is located and the adjacent MAC subPDU belong to a same terminal device.

Manner 1: The fourth indication information is represented by 0 (or 1). The following uses 0 as an example for description.

S=0 indicates that a MAC subPDU in which S=0 is located is a start MAC subPDU of a terminal device A, and a MAC subPDU in which next S=0 is located is a start MAC subPDU of a terminal device B. This indicates that a MAC subPDU before the MAC subPDU in which the next S=0) is located is the last MAC subPDU of the terminal device A.

Manner 2: The fourth indication information is represented by 0 and 1.

S=0 indicates that a MAC subPDU in which S=0 is located is a start MAC subPDU of a terminal device A. S=1 indicates that a MAC subPDU in which S=1 is located is a MAC subPDU of response information for a terminal device. To be specific, the MAC subPDU in which S=1 is located and a previous MAC subPDU adjacent to the MAC subPDU belong to the same terminal device. It may also be understood that S=1 indicates consecutive MAC subPDUs of one terminal device.

It should be noted that the value of S is an example, and the value of S may indicate the association relationship between the MAC subPDU in which S is located and the adjacent MAC subPDU. This is not limited in this application.

Figure 14B:
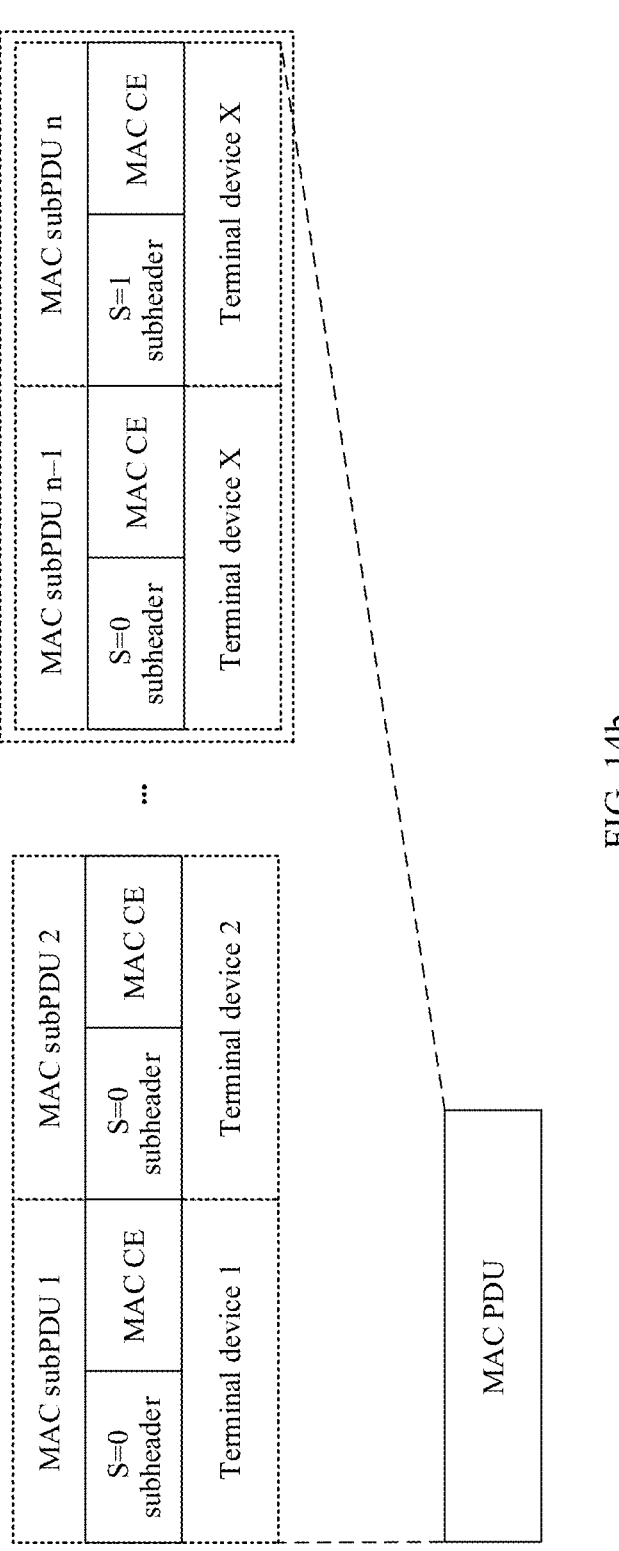
FIG. 14b is a schematic structural diagram of another MAC PDU carrying response information for a plurality of terminal devices according to embodiments of this application.

FIG. 14b is a schematic structural diagram of another MAC PDU carrying response information for a plurality of terminal devices according to this application. The MAC PDU includes response information for X terminal devices. Response information for a terminal device 1 is carried in a MAC subPDU 1, response information for a terminal device 2 is carried in a MAC subPDU 2, and response information for a terminal device X is carried in two MAC subPDUs, a MAC subPDU (n–1) and a MAC subPDU n. A MAC subPDU in which the first S=0 is located is a start MAC subPDU of the terminal device 1. That is, a MAC subPDU before the MAC subPDU in which the first S=0 is located does not belong to the terminal device 1. A MAC subPDU in which the second S=0 is located is a start MAC subPDU of the response information for the terminal device 2. That is, a MAC subPDU before the MAC subPDU in which the second S=0 is located does not belong to the terminal device 2. A MAC subPDU in which the third S=(is located is a start MAC subPDU of a terminal device 3. A MAC subPDU before the MAC subPDU in which the third S=0 is located does not belong to the terminal device 3, and a MAC subPDU in which S=1 is located also belongs to the terminal device 3. It may also be noted that, the MAC subPDU in which S=1 is located and a MAC subPDU previous to the MAC subPDU in which S=1 is located belong to the same terminal device 3.

It should be noted that a plurality of MAC subPDUs that belong to one terminal device are consecutively arranged in a MAC PDU. That is, after a terminal device reads a start MAC subPDU belonging to the terminal device, if a value of S in a subheader of a next adjacent MAC subPDU indicates that the MAC subPDU in which S is located is a new start MAC subPDU, the terminal device stops reading data, and considers that all subsequent MAC subPDUs do not belong to the terminal device.

In a possible implementation, to enable a terminal device to quickly determine whether a start MAC subPDU belongs to the terminal device, the start MAC subPDU includes at least a contention resolution identity and/or a preamble, and the terminal device may determine, by using the contention resolution identity or the preamble, whether the start MAC subPDU is a start MAC subPDU belonging to the terminal device.

It should be noted that a backoff indicator may be specific signaling for a terminal device, or may be common signaling. When the backoff indicator is specific signaling for a terminal device, the backoff indicator may be carried in a MAC subPDU belonging to the terminal device. A specific structure of the MAC subPDU is shown in FIG. 9g.

Figure 14C:
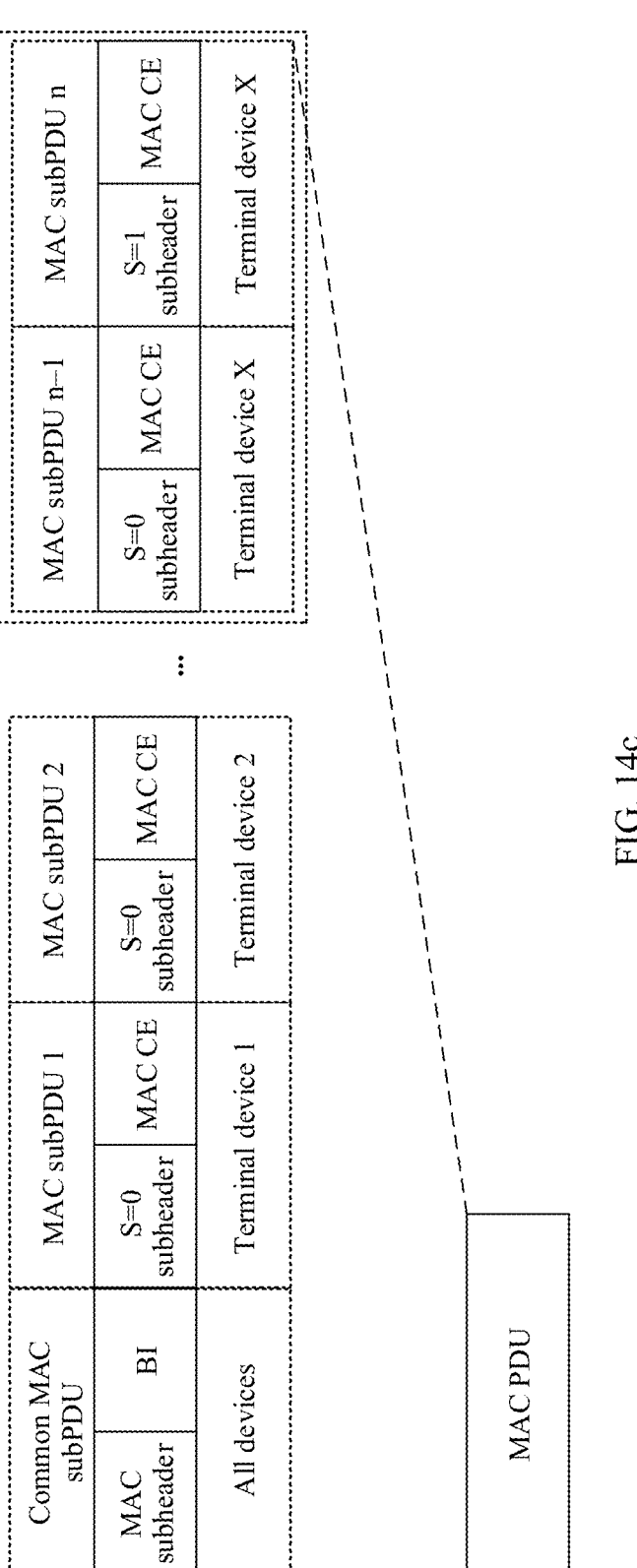
FIG. 14c is a schematic structural diagram of a MAC PDU that carries response information for a plurality of terminal devices and in which a backoff indicator is common signaling according to embodiments of this application.

When the backoff indicator is common signaling, the backoff indicator does not belong to one type of first information, and a MAC subPDU that carries the backoff indicator used to indicate the common signaling may be a common MAC subPDU. The common MAC subPDU is located before other MAC subPDUs. FIG. 14c is a schematic structural diagram of a MAC PDU that carries response information for a plurality of terminal devices and in which a backoff indicator is common signaling according to this application. The MAC PDU includes response information for X terminal devices. Response information for a terminal device 1 is carried in a MAC subPDU 1, response information for a terminal device 2 is carried in a MAC subPDU 2, and response information for a terminal device X is carried in two MAC subPDUs, a MAC subPDU (n–1) and a MAC subPDU n. The backoff indicator is carried in a common MAC subPDU, and is located before the MAC subPDUs of the terminal device 1, the terminal device 2, and the terminal device X. The terminal device 1, the terminal device 2, and the terminal device X need to read the backoff indicator and store a value of the backoff indicator command, to re-initiate a new random access request after determining that current random access fails. A structure of the common MAC subPDU carrying the backoff indicator may be the same as the structure of the MAC subPDU shown in FIG. 9g. Details are not described herein again.

In a possible implementation, the terminal device may determine, based on a value of an LCID, whether the first MAC subPDU is the common MAC subPDU that carries the backoff indicator.

Figure 15:
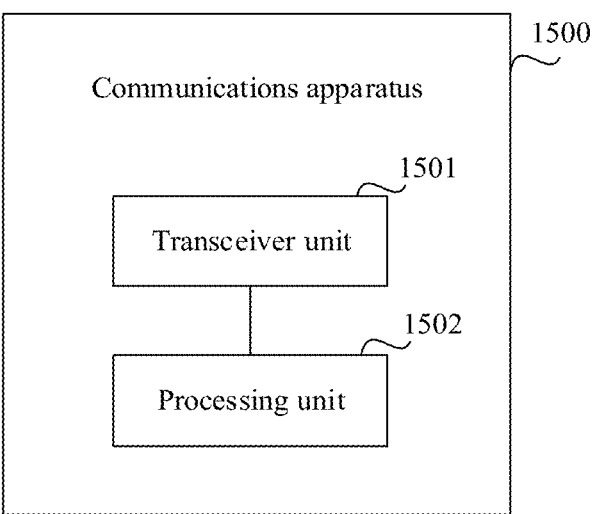
FIG. 15 is a schematic structural diagram of a communications apparatus according to embodiments of this application.

Based on the foregoing content and a same concept, FIG. 15 is a possible block diagram of an example of a communications apparatus according to an embodiment of this application. The communications apparatus 1500 may include a processing unit 1501 and a transceiver unit 1502. The processing unit 1501 is configured to control and manage an action of the communications apparatus 1500, and the transceiver unit 1502 is configured to support the communications apparatus 1500 in communicating with another communications apparatus. A functional unit in the communications apparatus 1500 may be implemented by using software or by using hardware executing software.

The processing unit 1501 may be a processor or a controller, for example, may be a general purpose central processing unit (CPU), a general-purpose processor, a digital signal processor (DSP), an application-specific integrated circuit (application specific integrated circuits, ASIC), a field programmable gate array (FPGA), or another programmable logic device, a transistor logic device, a hardware component, or any combination thereof. The processing unit 1501 may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The transceiver unit 1502 may be a communications interface, a transceiver, a transceiver circuit, or the like. The communications interface is a general name, and may include a plurality of interfaces during specific implementation.

In a possible implementation, the communications apparatus 1500 may further include a storage unit 1503. The storage unit 1503 is configured to store program code and data that are of the communications apparatus 1500. The storage unit 1503 may be a memory.

For example, when the communications apparatus 1500 is a chip in a terminal device, the processing unit 1501 may be, for example, a processor, and the transceiver unit 1502 may be, for example, an input/output interface, a pin, or a circuit. The processing unit 1501 may execute computer execution instructions stored in the storage unit 1503. Optionally, the storage unit 1503 may be a storage unit in the chip, for example, a register or a buffer; or the storage unit 1503 may be a storage unit located outside the chip in the terminal device, for example, a read-only memory (ROM), another type of static storage device capable of storing static information and instructions, or a random access memory (RAM).

In a first application, the communications apparatus 1500 may be the terminal device in the foregoing embodiment, or may be a chip used in the terminal device. The transceiver unit 1502 is configured to receive first DCI from a network device. The first DCI includes first indication information, and the first indication information is used to indicate a type of response information carried on a PDSCH. The processing unit 1501 is configured to: if determining that the type that is of the response information and that is indicated by the first indication information matches a random access type of a random access request initiated by the communications apparatus, demodulate the PDSCH indicated by the first DCI. The PDSCH carries response information for the random access request initiated by the communications apparatus.

Herein, the type of the response information includes: The response information is for a four-step random access request, the response information is for a two-step random access request and does not include a contention resolution identity, or the response information is for a two-step random access request and includes at least a contention resolution identity.

When the type of the response information is that the response information is for a two-step random access request and includes at least a contention resolution identity, the first DCI further includes second indication information, and the second indication information is used to indicate a first preamble. In this case, the processing unit 1501 is configured to: if determining that the type that is of the response information and that is indicated by the first indication information matches the random access type of the random access request initiated by the communications apparatus, and the first preamble matches an index number of a preamble carried in the random access request initiated by the communications apparatus, demodulate the PDSCH indicated by the first DCI.

When the type of the response information is that the response information is for a two-step random access request and includes at least a contention resolution identity, the first DCI further includes third indication information, and the third indication information is used to indicate a resource used by the communications apparatus to feed back an acknowledgement message. The transceiver unit 1502 is configured to feed back the acknowledgement message to the network device according to the third indication information.

When the type of the response information is that the response information is for a two-step random access request and includes at least a contention resolution identity, the response information that is carried on the PDSCH and that is for the random access request initiated by the communications apparatus includes a contention resolution identity, or includes a contention resolution identity and first information. The first information includes at least one of the following content: information indicating a resource used to feed back an acknowledgement message, a TPC command, a timing advance command, an uplink data transmission grant, an index number of a preamble carried in the random access request initiated by the terminal device, a cell radio network temporary identifier C-RNTI, radio resource control reconfiguration information, radio resource control connection establishment information, or radio resource control resume information.

In a possible implementation, the contention resolution identity and the first information are carried in one or more MAC subPDUs of a MAC PDU, where identifier information in a subheader of a MAC subPDU carrying the contention resolution identity and identifier information in a subheader of a MAC subPDU carrying the first information are the same or of a same type.

In a possible implementation, the MAC subPDUs further include a data part, and identifier information in a subheader of a MAC subPDU is a logical channel identifier. A value of the logical channel identifier indicates that the data part includes at least one of the following content: the information indicating the resource used to feed back the acknowledgement message, the timing advance command, the uplink data transmission grant, the index number of the preamble carried in the random access request initiated by the terminal device, the cell radio network temporary identifier C-RNTI, the radio resource control reconfiguration information, the radio resource control connection establishment information, or the radio resource control resume information.

In a possible implementation, a subheader of the MAC subPDUs includes fourth indication information, the fourth indication information is used to indicate an association relationship between the MAC subPDU and an adjacent MAC subPDU, and the association relationship is used to determine a start MAC subPDU and an end MAC subPDU that belong to the terminal device.

In a second application, the communications apparatus 1500 may be the terminal device in any one of the foregoing embodiments, or may be a chip used in the terminal device. The transceiver unit 1502 is configured to receive first downlink control information DCI from a network device through a first search space. The communications apparatus supports receiving of DCI through at least two types of search spaces, each type of the at least two types of search spaces is corresponding to one random access type, and at least two of the at least two types of search spaces are corresponding to different random access types. The processing unit 1501 is configured to demodulate a PDSCH indicated by the first DCI. The PDSCH carries response information for a random access request initiated by the communications apparatus.

In a possible implementation, the first DCI includes fifth indication information, and the fifth indication information is used to indicate a type of response information carried on the PDSCH. The type of the response information includes any one of the following content: The response information is for a two-step random access request and does not include a contention resolution identity, or the response information is for a two-step random access request and includes at least a contention resolution identity.

When the type of the response information is that the response information is for a two-step random access request and includes at least a contention resolution identity, the first DCI further includes second indication information, and the second indication information is used to indicate a first preamble. The processing unit 1501 is configured to: when the transceiver unit 1502 receives the first DCI through a first search space and it is determined that the first preamble matches an index number of a preamble carried in the random access request initiated by communications apparatus, demodulate the PDSCH indicated by the first DCI.

In a third application, the communications apparatus 1500 may be the terminal device in the foregoing embodiment, or may be a chip used in the terminal device. The transceiver unit 1502 is configured to receive, from a network device, first DCI scrambled by a scrambling code within a first scrambling code range, where the communications apparatus supports descrambling of the DCI by using scrambling codes of at least two scrambling code ranges, and each of the at least two scrambling code ranges is corresponding to one random access type, at least two of the at least two scrambling code ranges are corresponding to different random access types. The processing unit 1501 is configured to: if the first DCI is successfully descrambled by the scrambling code with the first scrambling code range, determine that a random access type corresponding to the first scrambling code range matches a random access type of a random access request initiated by the communications apparatus, and demodulate a PDSCH indicated by the first DCI, where the PDSCH carries response information for the random access request initiated by the communications apparatus.

In a possible implementation, the first DCI includes fifth indication information, and the fifth indication information is used to indicate a type of response information carried on the PDSCH. The type of the response information includes any one of the following content: The response information is for a two-step random access request and does not include a contention resolution identity, or the response information is for a two-step random access request and includes at least a contention resolution identity.

When the type of the response information is that the response information is for a two-step random access request and includes at least a contention resolution identity, the first DCI further includes second indication information, and the second indication information is used to indicate a first preamble. The processing unit 1501 is configured to: if successfully descrambling the first DCI by using the scrambling code within the first scrambling code range, determine that the random access type corresponding to the first scrambling code range matches the random access type of the random access request initiated by the communications apparatus, and determine that the first preamble matches an index number of a preamble carried in the random access request initiated by the communications apparatus, demodulate the PDSCH indicated by the first DCI.

In a fourth application, the communications apparatus 1500 may be the network device in the foregoing embodiment, or may be a chip used in the network device. The transceiver unit 1502 is configured to receive a random access request from a terminal device. The processing unit 1501 determines first downlink control information DCI based on a random access type corresponding to the random access request. The first DCI includes first indication information, the first indication information is used to indicate a type of response information carried on a PDSCH, and the PDSCH carries response information for the random access request initiated by the terminal device. The transceiver unit 1502 is further configured to send the first DCI to the terminal device.

In a possible implementation, the type of the response information may include one of the following content: The response information is for a four-step random access request, the response information is for a two-step random access request and does not include a contention resolution identity, or the response information is for a two-step random access request and includes at least a contention resolution identity:

When the type of the response information is that the response information is for a two-step random access request and includes at least a contention resolution identity, the first DCI further includes second indication information, and the second indication information is used to indicate a first preamble.

When the type of the response information is that the response information is for a two-step random access request and includes at least a contention resolution identity, the first DCI further includes third indication information, and the third indication information is used to indicate a resource used by the communications apparatus to feed back an acknowledgement message.

When the type of the response information is that the response information is for a two-step random access request and includes at least a contention resolution identity, the response information that is carried on the PDSCH and that is for the random access request initiated by the terminal device includes a contention resolution identity, or includes a contention resolution identity and first information. The first information includes at least one of the following content: information indicating a resource used to feed back an acknowledgement message, a TPC command, a timing advance command, an uplink data transmission grant, an index number of a preamble carried in the random access request of the terminal device, a cell radio network temporary identifier C-RNTI, radio resource control reconfiguration information, radio resource control connection establishment information, or radio resource control resume information.

In a possible implementation, the contention resolution identity and the first information are carried in one or more MAC subPDUs of a MAC PDU, where identifier information in a subheader of a MAC subPDU carrying the contention resolution identity and identifier information in a subheader of a MAC subPDU carrying the first information are the same or of a same type.

In a possible implementation, the MAC subPDUs further include a data part, and identifier information in a subheader of a MAC subPDU is a logical channel identifier. A value of the logical channel identifier is used to indicate information of the data part. The information of the data part includes at least one of the following content: the contention resolution identity, the information indicating the resource used to feed back the acknowledgement message, the timing advance command, the uplink data transmission grant, the index number of the preamble carried in the random access request of the terminal device, the cell radio network temporary identifier C-RNTI, or the radio resource control reconfiguration information.

In a possible implementation, the subheader of the MAC subPDUs includes fourth indication information, the fourth indication information is used to indicate an association relationship between the MAC subPDU and an adjacent MAC subPDU, and the association relationship is used to determine a start MAC subPDU and an end MAC subPDU that belong to the terminal device.

In a fifth application, the communications apparatus 1500 may be the network device in the foregoing embodiment.

The transceiver unit 1502 is configured to receive a random access request from a terminal device. The processing unit 1501 is configured to determine first DCI based on a random access type corresponding to the random access request. The network device supports scheduling of PDSCHs carrying different response information by using formats of at least two types of different DCI, or supports scheduling of PDSCHs carrying different response information by using content of at least two types of different DCI. The at least two types of different DCI are corresponding to at least two types of different search spaces. The at least two types of different DCI include different DCI formats, or different DCI content, or a same DCI format and different content. Each of the at least two types of search spaces is corresponding to one random access type, and at least two of the at least two types of search spaces are corresponding to different random access types. The transceiver unit 1502 is further configured to send the first DCI to the terminal device through a first search space, where the first DCI is used to indicate a PDSCH, and the PDSCH carries response information for the random access request initiated by the terminal device.

In a possible implementation, the processing unit 1501 is further configured to determine, based on the random access type corresponding to the random access request, the first DCI including fifth indication information. The fifth indication information is used to indicate a type of response information carried on the PDSCH. The type of the response information includes any one of the following content: The response information is for a two-step random access request and does not include a contention resolution identity, or the response information is for a two-step random access request and includes at least a contention resolution identity.

When the type of the response information is that the response information is for a two-step random access request and includes at least a contention resolution identity, the first DCI further includes second indication information, and the second indication information is used to indicate a first preamble.

When the type of the response information is that the response information is for a two-step random access request and includes at least a contention resolution identity, the first DCI further includes third indication information, and the third indication information is used to indicate a resource used by the communications apparatus to feed back an acknowledgement message.

In a sixth application, the communications apparatus 1500 may be the network device in the foregoing embodiment. The transceiver unit 1502 is configured to receive a random access request from a terminal device. The processing unit 1501 is configured to determine a first scrambling code range based on a random access type corresponding to the random access request, where the first scrambling code range is corresponding to the random access type corresponding to the random access request, the communications apparatus supports scrambling of downlink control information DCI by using scrambling codes of at least two scrambling code ranges, each of the at least two scrambling code ranges is corresponding to one random access type, and at least two of the at least two scrambling code ranges are corresponding to different random access types. The transceiver unit 1502 is further configured to send, to the terminal device, the first DCI scrambled by a scrambling code of the first scrambling range, where the first DCI is used to indicate a PDSCH, and the PDSCH carries response information for the random access request initiated by the terminal device.

For a possible implementation in the sixth application, refer to the possible implementation in the fifth application. Details are not described herein again.

In a seventh application, the communications apparatus 1500 may be the network device in the foregoing embodiment. The transceiver unit 1502 receives a random access request from a terminal device, where the random access request includes a preamble and uplink data. The transceiver unit 1502 is further configured to: after the processing unit 1501 successfully decodes the uplink data in the random access request, send response information for the random access request to the terminal device, where the response information includes a contention resolution identity or the response message includes a contention resolution identity and first information. The first information includes at least one of the following content: information indicating a resource used to feed back an acknowledgement message, a TPC command, a timing advance command, an uplink data transmission grant, an index number of the preamble carried in the random access request of the terminal device, a cell radio network temporary identifier C-RNTI, radio resource control reconfiguration information, radio resource control connection establishment information, or radio resource control resume information.

In a possible implementation, the contention resolution identity and the first information are carried in one or more MAC subPDUs of a MAC PDU, where identifier information in a subheader of a MAC subPDU carrying the contention resolution identity and identifier information in a subheader of a MAC subPDU carrying the first information are the same or of a same type. In this case, an existing MAC subPDU carrying a contention identity may be compatible.

In a possible implementation, the MAC subPDUs include a data part and a subheader, and identifier information in the subheader of a MAC subPDU is a logical channel identifier. A value of the logical channel identifier may be used to indicate information of the data part. The information of the data part includes at least one of the following content: the contention resolution identity, the information indicating the resource used to feed back the acknowledgement message, the timing advance command, the uplink data transmission grant, the index number of the preamble carried in the random access request of the terminal device, the cell radio network temporary identifier C-RNTI, the radio resource control reconfiguration information, the radio resource control connection establishment information, or the radio resource control resume information.

When response information for a plurality of terminal devices is carried in one MAC PDU, to help the terminal device quickly determine MAC subPDUs belonging to the terminal device, fourth indication information may be added to the subheader of the MAC subPDU, the fourth indication information is used to indicate an association relationship between the MAC subPDU and an adjacent MAC subPDU, and the association relationship is used to determine a start MAC subPDU and an end MAC subPDU that belong to the terminal device.

Based on the foregoing content and a same idea, this application provides a communications system. The communications system may include one or more of the foregoing terminal devices, and one or more of the foregoing network devices. A terminal device can perform any method on a terminal device side, and a network device can perform any method on a network device side. For possible implementations of the network device and the terminal device, refer to the foregoing descriptions. Details are not described herein again.

All or some of the foregoing embodiments may be implemented by using software, hardware, or any combination thereof. When being implemented by using a software program, all or some of the embodiments may be implemented in a form of a computer program product. The computer program product includes one or more instructions. When the computer program instructions are loaded and executed on a computer, the procedures or functions according to the embodiments of this application are completely or partially generated. The computer may be a general-purpose computer, a dedicated computer, a computer network, or another programmable apparatus. The instruction may be stored in a computer storage medium or may be transmitted from a computer storage medium to another computer storage medium. For example, the instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible to the computer, or a data storage device, such as a server or a data center, integrating one or more usable media. The usable medium may be a magnetic medium (for example, a floppy disk, a hard disk, a tape, or a magnetic optical disk (MO)), an optical medium (for example, a CD, a DVD, a BD, or an HVD), a semiconductor medium (for example, a ROM, an EPROM, an EEPROM, a nonvolatile memory (NAND FLASH), or a solid-state drive (SSD)), or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that instructions may be used to implement each procedure and/or each block in the flowcharts and/or the block diagrams and a combination of a procedure and/or a block in the flowcharts and/or the block diagrams. These instructions may be provided for a general-purpose computer, a special-purpose computer, an embedded processor, or a processor of any other programmable data processing device to generate a machine, so that the instructions executed by the computer or the processor of any other programmable data processing device generate an apparatus for implementing a specific function in one or more procedures in the flowcharts and/or in one or more blocks in the block diagrams.

These instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specified function in one or more processes in the flowcharts and/or in one or more blocks in the block diagrams.

These instructions may be loaded into the computer or the another programmable data processing device, so that a series of operations and steps are performed on the computer or the another programmable device, to generate computer-implemented processing. Therefore, the instructions executed on the computer or the other programmable device provide steps for implementing a specified function in one or more procedures in the flowcharts and/or in one or more blocks in the block diagrams.

It is clear that a person skilled in the art can make various modifications and variations to the embodiments of this application without departing from the spirit and scope of this application. In this case, this application is intended to cover these modifications and variations in the embodiments of this application, provided that they fall within the scope of the following claims and their equivalent technologies.

What is claimed is:

1. A random access method, comprising:

sending, by a communications apparatus, a random access request to a network device, wherein the random access request comprises a preamble and uplink data;

receiving, by the communications apparatus, first down-link control information (DCI), wherein the first DCI comprises first indication information that indicates a type of response that a physical downlink shared chan-nel (PDSCH) carries;

receiving, by the communications apparatus, a message comprising response information for the random access request, wherein the response information is carried on the PDSCH; and when the type of the response indicated by the first indication information in the DCI matches a type of the random access request, demodulating, by the commu-nication apparatus, the PDSCH, wherein:

the response information is sent after the uplink data is successfully decoded by the network device, the response information comprises a contention reso-lution identity and first information, and the first information comprises information indicating a resource used to feed back an acknowledgement message and a transmit power control (TPC) com-mand, wherein the information indicating the resource used to feed back the acknowledgement message is for determining a time-frequency resource of a physical uplink control channel (PUCCH) that carries the acknowledgement mes-sage, and the TPC command indicates a power control adjustment factor for determining transmit power of the PUCCH.

2. The method according to claim 1, wherein the response information further comprises at least one of a cell radio network temporary identifier (C-RNTI) or a timing advance command.

3. The method according to claim 1, wherein the method further comprises:

sending, by the communications apparatus to the network device, the PUCCH carrying the acknowledgement message, wherein the transmit power of the PUCCH is determined based on the power control adjustment factor indicated by the TPC command.

4. The method according to claim 3, wherein the TPC command is an index value of a power control factor, and a correspondence between an index value of each power control factor and the power control adjustment factor is as follows:

| TPC command | $\delta_{PUCCH,b,f,c}$ (in dB) |
|---|---|
| 0 | −1 |
| 1 | 0 |
| 2 | 1 |
| 3 | 3 | wherein $\delta_{PUCCH,b,f,c}$ is the power control adjustment fac-tor.

5. The method according to claim 3, wherein the TPC command is an index value of a power control factor, and a correspondence between an index value of each power control factor and the power control adjustment factor is as follows:

| TPC command | $\delta_{PUCCH,b,f,c}$ (in dB) |
|---|---|
| 0 | −6 |
| 1 | −4 |
| 2 | −2 |
| 3 | 0 |
| 4 | 2 |
| 5 | 4 |
| 6 | 6 |
| 7 | 8 | wherein $\delta_{PUCCH,b,f,c}$ is the power control adjustment fac-tor.

6. The method according to claim 1, wherein a random access time-frequency resource used for sending the pre-amble is a random access time-frequency resource shared by two-step random access and four-step random access.

7. The method according to claim 1, wherein the method further comprises:

sending the first DCI scrambled by a first random access radio network temporary identifier (RA-RNTI), wherein the first DCI is used to schedule the PDSCH carrying the response information, and a calculation formula used to calculate the first RA-RNTI has one more preset offset value than a calculation formula of a radio network temporary identifier (RNTI) corre-sponding to four-step random access.

8. The method according to claim 1, wherein the method further comprises:

listening to the first DCI by using a first RA-RNTI, wherein the first DCI is used to schedule the PDSCH carrying the response information, and a calculation formula used to calculate the first RA-RNTI has one more preset offset value than a calculation formula of an RNTI corresponding to four-step random access.

9. The method according to claim 1, wherein the type of the response that the PDSCH carries, indicated by the first indication information in the first DCI, comprises:

that the response information is for a four-step random access request or that the response information is for a two-step random access request.

10. The method according to claim 1, wherein the type of the response that the PDSCH carries, indicated by the first indication information in the first DCI, comprises:

that the response information is for a two-step random access request and includes the contention resolution identity.

11. A communications apparatus, comprising:

a transmitter, configured to:

send a random access request, wherein the random access request comprises a preamble and uplink data; and a receiver, configured to:

receive first downlink control information (DCI), wherein the first DCI comprises first indication information that indicates a type of response that a physical downlink shared channel (PDSCH) carries;

receive a message comprising response information for the random access request, wherein the response information is carried on the PDSCH, and when the type of the response indicated by the first indication information in the DCI matches a type of the random access request, demodulating the PDSCH, the response information is sent after the uplink data is successfully decoded by a network device, the response information comprises a contention resolution identity and first information, and the first information comprises information indicating a resource used to feed back an acknowledgement message and a transmit power control (TPC) command, wherein the information indicating the resource used to feed back the acknowledgement message is for determining a time-frequency resource of a physical uplink control channel (PUCCH) that carries the acknowledgement message, and the TPC command indicates a power control adjustment factor for determining transmit power of the PUCCH.

12. The apparatus according to claim 11, wherein the response information further comprises at least one of a cell radio network temporary identifier (C-RNTI) or a timing advance command.

13. The apparatus according to claim 11, wherein the transmitter is further configured to:

send the PUCCH carrying the acknowledgement message, wherein the transmit power of the PUCCH is determined based on the power control adjustment factor indicated by the TPC command.

14. The apparatus according to claim 13, wherein the TPC command is an index value of a power control factor, and a correspondence between an index value of each power control factor and the power control adjustment factor is as follows:

| TPC command | $\delta_{PUCCH,b,f,c}$ (in dB) |
| --- | --- |
| 0 | −1 |
| 1 | 0 |
| 2 | 1 |
| 3 | 3 | wherein $\delta_{PUCCH,b,f,c}$ is the power control adjustment factor.

15. The apparatus according to claim 13, wherein the TPC command is an index value of a power control factor, and a correspondence between an index value of each power control factor and the power control adjustment factor is as follows:

| TPC command | $\delta_{PUCCH,b,f,c}$ (in dB) |
| --- | --- |
| 0 | −6 |
| 1 | −4 |
| 2 | −2 |
| 3 | 0 |
| 4 | 2 |
| 5 | 4 |

-continued

| TPC command | $\delta_{PUCCH,b,f,c}$ (in dB) |
| --- | --- |
| 6 | 6 |
| 7 | 8 | wherein $\delta_{PUCCH,b,f,c}$ is the power control adjustment factor.

16. The apparatus according to claim 11, wherein the type of the response that the PDSCH carries, indicated by the first indication information in the first DCI, comprises:

that the response information is for a four-step random access request or that the response information is for a two-step random access request.

17. The apparatus according to claim 11, wherein the type of the response that the PDSCH carries, indicated by the first indication information in the first DCI, comprises:

that the response information is for a two-step random access request and includes the contention resolution identity.

18. A non-transitory computer-readable storage medium, storing a program, wherein when the program is read and executed by a communications apparatus, the communications apparatus is enabled to implement operations comprising:

sending a random access request to a network device, wherein the random access request comprises a preamble and uplink data;

receiving first downlink control information (DCI), wherein the first DCI comprises first indication information that indicates a type of response that a physical downlink shared channel (PDSCH) carries;

receiving a message comprising response information for the random access request, wherein the response information is carried on the PDSCH; and when the type of the response indicated by the first indication information in the DCI matches a type of the random access request, demodulating the PDSCH, wherein:

the response information is sent after the uplink data is successfully decoded by the network device, the response information comprises a contention resolution identity and first information, and the first information comprises information indicating a resource used to feed back an acknowledgement message and a transmit power control (TPC) command, wherein the information indicating the resource used to feed back the acknowledgement message is for determining a time-frequency resource of a physical uplink control channel (PUCCH) that carries the acknowledgement message, and the TPC command indicates a power control adjustment factor for determining transmit power of the PUCCH.

19. The non-transitory computer-readable storage medium according to claim 18, wherein the response information further comprises at least one of a C-RNTI or a timing advance command.

20. The non-transitory computer-readable storage medium according to claim 18, wherein the type of the response that the PDSCH carries, indicated by the first indication information in the first DCI, comprises:

that the response information is for a four-step random access request or that the response information is for a two-step random access request.

* * * * *